United States Patent [19]
Nakahara et al.

[11] Patent Number: 5,982,470
[45] Date of Patent: Nov. 9, 1999

[54] LIQUID CRYSTAL DISPLAY DEVICE HAVING DUMMY ELECTRODES WITH INTERLEAVE RATIO SAME ON ALL SIDES

[75] Inventors: Makoto Nakahara, Nara; Kyouhei Isohata, Yamatokoriyama; Daisuke Ikesugi, Joyo; Kazuya Yoshimura, Kitakatsuragi-gun; Tokio Kiguchi, Nara; Manabu Ano; Masayuki Yamanaka, both of Yamatokoriyama, all of Japan

[73] Assignee: Sharp Kabushiki Kaisha, Osaka, Japan

[21] Appl. No.: 08/912,187

[22] Filed: Aug. 15, 1997

[30] Foreign Application Priority Data

Aug. 29, 1996 [JP] Japan .................................. 8-229039
Feb. 14, 1997 [JP] Japan .................................. 9-030964

[51] Int. Cl.$^6$ ...................... G02F 1/1339; G02F 1/1343
[52] U.S. Cl. ...................... 349/153; 349/143; 349/139; 349/152
[58] Field of Search .................................. 349/143, 153, 349/139, 152

[56] References Cited

U.S. PATENT DOCUMENTS

| | | | |
|---|---|---|---|
| 5,396,356 | 3/1995 | Fukuchi et al. | 349/153 |
| 5,406,398 | 4/1995 | Suzuki et al. | 349/154 |
| 5,406,561 | 4/1995 | Suzuki et al. | 349/143 |
| 5,488,498 | 1/1996 | Fujii et al. | 349/149 |
| 5,619,358 | 4/1997 | Tanaka et al. | 349/153 |
| 5,757,450 | 5/1998 | Fujii et al. | 349/106 |

OTHER PUBLICATIONS

Published unexamined patent application, Tokukaisho 62-229234 Oct. 8, 1987.
Published unexamined patent application, Tokukaihei 3-211524, Sep. 17, 1991.
Published unexamined patent application, Tokukaihei 6-51332, Feb. 25, 1994.
Published unexamined utility model application, Jitsukaihei 1-85779, Jun. 7, 1989.

*Primary Examiner*—William L. Sikes
*Assistant Examiner*—Kenneth Parker
*Attorney, Agent, or Firm*—David G. Conlin; William J. Daley, Jr.; Dike, Bronstein, Roberts & Cushman, LLP

[57] ABSTRACT

A liquid crystal display device includes a pair of substrates having a plurality of display-use electrodes formed thereon, a seal for connecting the pair of substrates in such a manner that respective electrode forming surfaces face each other, a liquid crystal layer formed by sealing a liquid crystal in a space surrounded by the pair of substrates and the seal, and dummy electrodes for achieving a uniform thickness of the liquid crystal layer in the display area. The display-use electrodes and the dummy electrodes are interleaved on four sides of the seal, and an absolute value for variations in interleaved ratio in the four sides, indicative of a ratio of an area occupied by the display-use electrodes and the dummy electrodes on the seal is not more than a predetermined value. As this permits a uniform thickness of the seal on the four sides, a difference in brightness between a central portion and a portion in a vicinity of the seal in the display area can be eliminated, thereby improving a display quality.

15 Claims, 27 Drawing Sheets

F I G. 12
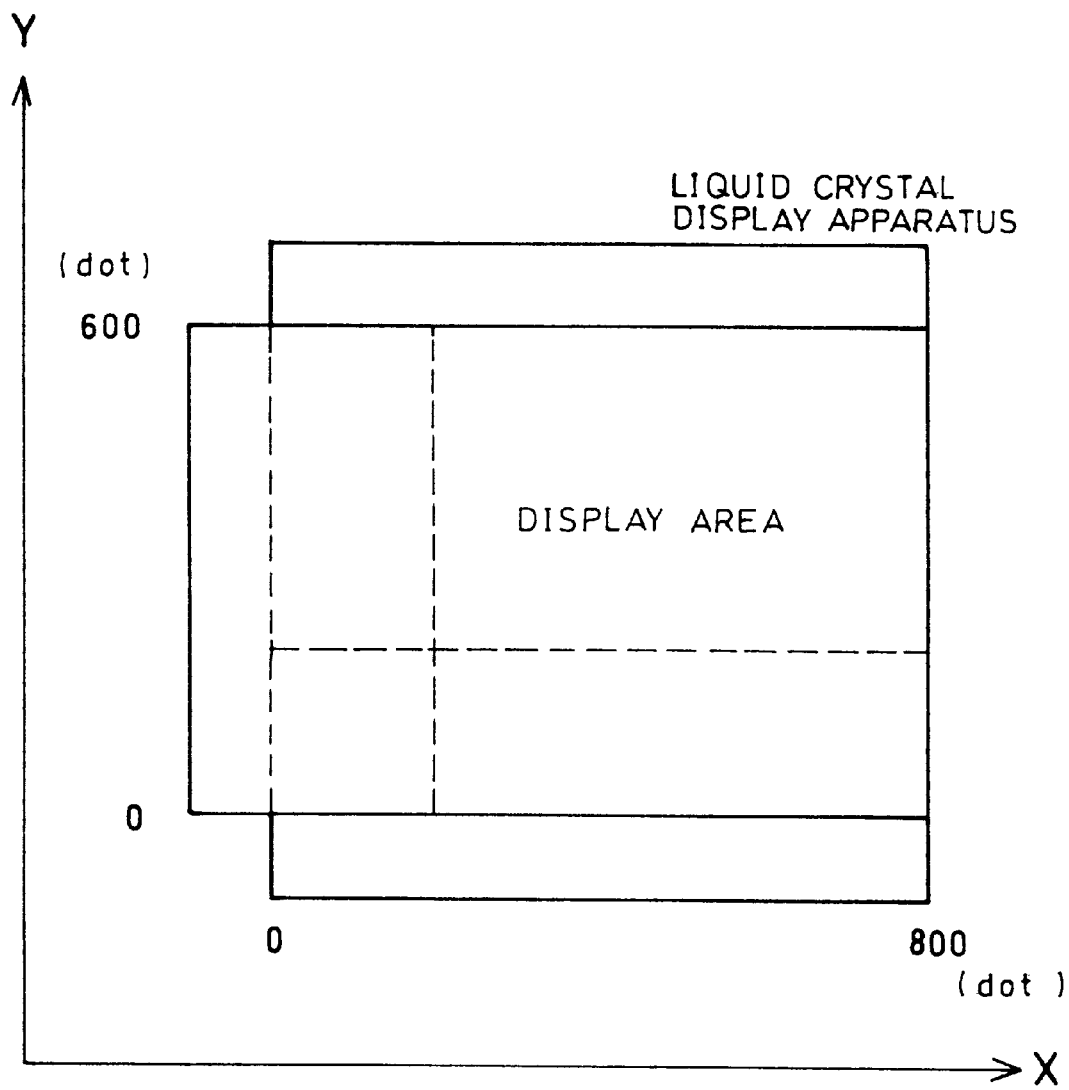

LIQUID CRYSTAL DISPLAY DEVICE HAVING DUMMY ELECTRODES WITH INTERLEAVE RATIO SAME ON ALL SIDES

FIELD OF THE INVENTION

The present invention relates to a liquid crystal display device having a dummy electrode to achieve a uniform thickness of a liquid crystal layer.

BACKGROUND OF THE INVENTION

Recently, liquid crystal display devices adopting liquid crystals as a display device have been widely used as a display medium. For example, as shown in FIG. 32, the liquid crystal display device includes an upper glass 101 having a plurality of display-use upper electrodes 103 formed on a surface thereof, a lower glass 102 having a plurality of display-use lower electrodes 104 on a surface thereof. The upper glass 101 and the lower glass 102 are formed so as to face each other in such a manner that respective electrodes cross at a right angle via a seal 105. The liquid crystal display device has a liquid crystal cell having a liquid crystal layer 106 formed by sealing liquid crystals in a space surrounded by the upper and lower glasses 101 and 102 and the seal 105.

In the described arrangement of the liquid crystal display device, the side opposite to a terminal section 104a forming side of the display-use lower electrode 104 is formed inside the seal. For this reason, an interval d2 between a display-use upper electrode 103 forming portion of the upper glass 101 and the display-use lower electrode 104 forming portion of the lower glass 102 differs from an interval di between the upper glass 101 of the display-use upper electrode 103 and the lower glass 102 of the display-use lower electrode 104 in a non-forming area. Namely, there is a difference in thickness in the liquid crystal layer 106 between the electrode forming portion and the electrode non-forming portion of the glasses 101 and 103 of the liquid crystal display device.

Such difference in thickness of the liquid crystal layer 106 causes variations in color of the display screen in an absence of an application voltage to the display-use upper electrode 103 and the display-use lower electrode 104, thereby generating variations in color of the display screen.

Recently, in the liquid crystal display device, especially, in the STN (Super Twisted Nematic) liquid crystal display device, improved display quality is strongly demanded. Especially, in the STN-type color liquid crystal display device, improvements in color variations in a vicinity of the seal in the half tone of the image display is strongly demanded.

Various techniques have been proposed to reduce color variations in a vicinity of the seal in the display area. For example, Japanese Unexamined Patent Publication No. 229234/1987 (Tokukaisho 62-229234) discloses a "liquid crystal display device" which suppresses color variations in the display screen wherein a dummy electrode having a same thickness of a display-use electrode is formed on a substrate on which the display-use electrode is not formed so as to eliminate a difference in thickness of a liquid crystal layer.

As shown in FIG. 33, Japanese Unexamined Utility Model Publication No. 85779/1989 (Jitsukaihei 1-95779) discloses a "liquid crystal display panel wherein a pattern width of the terminal sinuous section 113a of the segment electrode 113 formed on a segment electrode 111 increases as being away from a terminal section (not shown) of a common electrode substrate 112, and a pattern width of the terminal sinuous section 113a is formed between in the pattern of a narrow portion.

Furthermore, as shown in FIG. 34, Japanese Unexamined Patent Publication No. 174414/1991 (Tokukaihei 3-174414) discloses a liquid crystal display device wherein an upper dummy electrode 126 is formed in a portion where a signal electrode 123 is not formed of an upper glass 121 on a seal 125 in a circumferential portion on both sides and a lower dummy electrode 127 is formed in a portion where a scanning electrode 124 is not formed of a lower glass 122.

As shown in FIG. 35, Japanese Unexamined Patent Publication No. 211524/1989 (Tokukaihei 3-211524) discloses a liquid crystal display element wherein an upper electrode substrate 131 wherein a segment electrode 133 is formed on a surface and a lower electrode substrate 132 whereon a common electrode 134 is formed on a surface are formed so as to face the electrode forming surface, and liquid crystals are injected through a sealing opening 137 formed on the sealing opening side 136 of respective substrates 131 and 132.

However, in any of the described Gazettes, members such as the dummy pattern 114, the upper and lower dummy electrodes 126 and 127 and the dummy electrode 138, etc., are formed in a portion which affects the thickness of the liquid crystal layer on the display surface, and this suppresses a difference in thickness of the liquid crystal layer between the display area and the surrounding area of the display, thereby improving color variations in a vicinity of the seal of the display screen.

As described, liquid crystal display devices which adopt the technique disclosed in the above Gazettes have been commercialized to achieve improved color variations in a vicinity of the seal on the display screen. Such liquid crystal display devices, for example, have an arrangement shown in FIG. 36, wherein a signal electrode substrate 141 and a scanning electrode substrate 142 are formed so as to face each other via a seal 145, and a signal electrode sinuous section 143 and a scanning electrode sinuous section 144 of the scanning electrode (not shown) of the signal electrode (not shown) in a vicinity of the seal 145 formed within the display area are divided into a plurality of blocks so as to correspond to the connection terminal with the external circuit.

In the liquid crystal display device having the described arrangement, the electrode sinuous sections 143 and 144 are designed such that the electrodes on the side of the connection terminal for connection with the external circuit have a higher alignment density than that of the electrodes on the side of the display area to achieve improved color variations in a vicinity of the seal 145 of the display area.

However, in the liquid crystal display device shown in FIG. 36, the electrode sinuous sections 143 and 144 are designed so as to have a uniform resistance value of the display-use electrodes (signal electrode and scanning electrode) within a permissible range, and based on the design of the electrodes sinuous sections 143 and 144, the dummy electrode (between electrode dummy electrode and double dummy electrode) are designed. For this reason, a ratio of an area occupied by the display-use electrodes and the dummy electrodes in the seal 145, i.e., the interleaved ratio differs.

Furthermore, as shown in FIG. 15 which explains the present invention, the ratio of an overlapped area S between the display-use electrode and the double dummy electrode which face each other in the seal, i.e., an overlapped ratio also differs in four sides.

As shown in FIG. 10 which explains the present invention, in the case of adopting the color liquid crystal display device adopting the color filter layer 12, as shown in FIG. 11 which explains the present invention, a width x of the signal electrode 3 (one display-use electrode) is about ⅓ of the width (3x+2y) of the scanning electrode 4, i.e., the other display-use electrode. Here, x indicates a line width of the signal electrode 3 and y indicates a line width of the black matrix.

There, in the case of the liquid crystal display device shown in FIG. 36, both the interleaved ratio and the overlapped ratio of the display-use electrode and the dummy electrode in the seal 145 portion greatly differ between the terminal section I constituted by scanning electrode sinuous sections 144 on the scanning electrode side and the terminal section II constituted by the signal electrode sinuous section 143 on the side of the signal electrode.

In the case of the liquid crystal display device shown in FIG. 36, the liquid crystal sealing opening side electrode section 147 is formed on the side of the sealing opening 146 of the liquid crystals. In the liquid crystal sealing opening side electrode section 147, the scanning electrode on the scanning electrode substrate 142 is extended directly to the seal 145 portion, and the double dummy electrode is formed in the seal 145 portion on the signal electrode substrate 141, i.e., the counter substrate. Thus, the interleaved ratio and the overlapped ratio of the display-use electrode and the dummy electrode greatly differs between the terminal section I and the terminal section II.

Generally, the seal includes a glass bead for adjusting the thickness. Such a glass bead is hard and is not deformed with an applied pressure generated when laminating, and thus it is distinguishable from a parasitic spacer for use in determining the thickness of the liquid crystal layer in the display area. Therefore, the thickness of the liquid crystal layer in a vicinity of the seal can be adjusted by adjusting the diameter of the glass bead contained in the seal.

Specifically, as shown in FIG. 37, the glass bead 156 of the within seal spacer contained in the seal 155 sandwiched between the display-use substrates 151 and 152 is classified into three groups: (i) a glass bead 156a sandwiched between the display-use electrode 153 and the dummy electrode 154, a glass bead 156b sandwiched in a portion where only the display-use electrode 153 is formed in-between, and a glass bead 156c in a portion where either of the electrodes 153 and 154 is formed in-between. Although not shown in FIG. 37, the glass beads may be formed so as to have only the dummy electrode 154 in-between.

In view of all sides, as the glass bead 156a sandwiched between the display-use electrode 153 and the dummy electrode 154 serves as a support, the thickness of the seal 155 is determined mainly by the diameter of the glass bead 156a. However, when locally seen, in the region where the glass beads 156a, 156b and 156c exists, the respective thickness of the seal 155 are as indicated by d3, d2 and d1 (d3 >d2>d1). Namely, the glass beads 156b and 156c are in a floated state.

Therefore, as in the conventional liquid crystal display device shown in FIG. 32, the difference in the overlapped ratio of the display-use electrode and the dummy electrode which face each other in respective sides of the seal 145 causes a difference in the number of glass beads having the different diameters in the seal 145 in the sides, thereby creating a difference in thickness of the seal 145 in four sides. Therefore, variations in thickness of the liquid crystal layer occurs in the display area in a vicinity of the seal 145. As a result, color variations occur in the four sides, thereby reducing a display quality.

As described, the difference in thickness in four sides of the seal 145 makes it difficult to adjust the thickness in a vicinity of the display area central portion and the vicinity of the seal 145. Namely, only by adjusting the diameter of the glass bead contained in the seal 145, a uniform thickness of the seal 145 in the four sides cannot be achieved. As a result, a difference in brightness occurs between the central portion of the display area and the portion in a vicinity of the four sides of the seal 145, thereby reducing a display quality.

SUMMARY OF THE INVENTION

It is an object of the present invention to provide a liquid crystal display device which eliminates a difference in brightness between a central portion and a portion in a vicinity of a seal of a display area by making a thickness of the seal uniform, thereby achieving an improved display quality.

The above object of the present invention is accomplished by a liquid crystal display device which includes a pair of substrates having a plurality of display-use electrodes formed thereon; a seal for connecting the pair of substrates in such a manner that respective electrode forming surfaces face each other; a liquid crystal layer formed by sealing a liquid crystal in a space surrounded by the pair of substrates and the seal; and dummy electrodes for achieving a uniform thickness of the liquid crystal layer within a display area. In the described arrangement, the display-use electrodes and the dummy electrodes are interleaved on four sides of the seal in such a manner that an absolute value for variations in interleaved ratio on the four sides, indicative of a ratio of an area occupied by the display-use electrodes and the dummy electrodes on the seal is not more than a predetermined value.

According to the described arrangement, the display-use electrodes and the dummy electrodes which are interleaved on the four sides of the seal are formed in such a manner than an absolute value for variations in the interleaved ratio in the four sides, indicative of a ratio occupied by the display-use electrodes and the dummy electrodes on the seal is not more than a predetermined value to achieve a uniform thickness of the seal in the four sides. As this permits a reduction in variations in brightness in the four sides in a vicinity of the seal in the display area, an improved display quality can be achieved. The predetermined value may be set in a range in which a reduction in variations in brightness in the four sides of the seal can be recognized by the user when he actually observes a display area.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

BRIEF DESCRIPTION OF THE DRAWINGS

FIG. 12 is an explanatory view for comparing variations in density in the liquid crystal display device shown in FIG. 1;

DESCRIPTION OF THE EMBODIMENTS

First Embodiment

The following descriptions will explain one embodiment of the present invention. In the present embodiment, explanations will be given through the case of adopting an STN-type liquid crystal display device as a liquid crystal display device.

Figure 10:
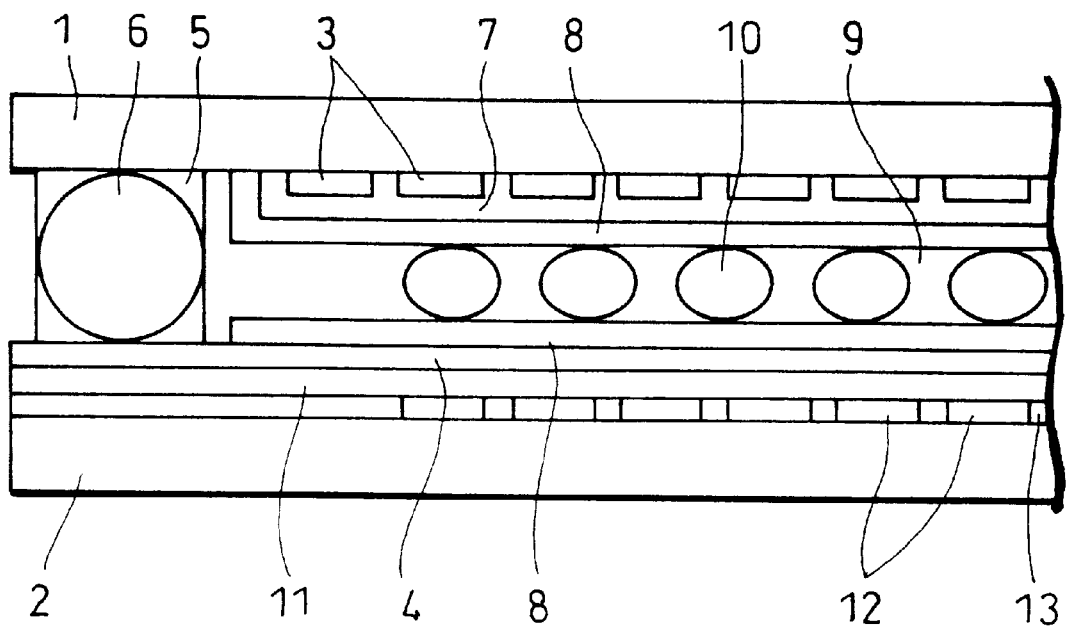
FIG. 10 is a cross-sectional view schematically showing the liquid crystal display device shown in FIG. 11.

As shown in FIG. 10, the liquid crystal display device in accordance with the present embodiment includes a liquid crystal cell having a seal 5 (sealing member) and a liquid crystal layer 9. The seal 5 is provided for connecting respective circumferences of a pair of insulating substrates (signal electrode substrate 1, 2) made of, for example, glass, so as to face each other. The liquid crystal layer 9 is formed by sealing a liquid crystal in a space surrounded by the signal electrode substrate 1, the scanning electrode substrate 2 and the seal 5.

The signal electrode substrate 1 has signal electrodes 3 formed in a stripe shape on a surface facing the scanning electrode substrate 2. The signal electrode 3 is composed of a transparent electrode made of, for example, ITO (Indium Tin Oxide) The signal electrode substrate 1 has an insulating film 7 formed so as to cover the signal electrodes 3 and an alignment film 8 laminated on the insulating film 7, for aligning liquid crystal molecules in the liquid crystal layer 9.

On the other hand, the scanning electrode substrate 2 has a color filter layer 12 formed on a surface facing the signal electrode substrate 1, and an overcoat film 11 made of transparent resin which are laminated in this order. The scanning electrode substrate 2 also has a scanning electrode 4 composed of a transparent electrode made of ITO, etc., formed in a stripe shape on the overcoat film 11 in a direction orthogonal to the signal electrodes 3, and an alignment film 8 formed so as to cover the scanning electrode 4, for aligning liquid crystal molecules in the liquid crystal layer 9.

The seal 5 includes therein a within-seal spacer 6 in substantially spherical shape made of a hard material such as glass bead, etc., and the thickness of the seal 5 is determined by a diameter of the within-seal spacer 6 in the seal 5.

The liquid crystal layer 9 includes within-cell spacers 10 composed of a substantially spherical member made of a harder material than the glass bead in the within-seal spacer 6, and the thickness of the liquid crystal layer 9 is determined by a diameter of the within-cell spacers 10.

Therefore, the thickness of the liquid crystal layer 9 of the liquid crystal cell having the described arrangement can be determined by adjusting the diameter of the within-cell spacers 10 in the liquid crystal layer 9 and the diameter of the within-seal spacer 6 in the seal 5.

Figure 11:
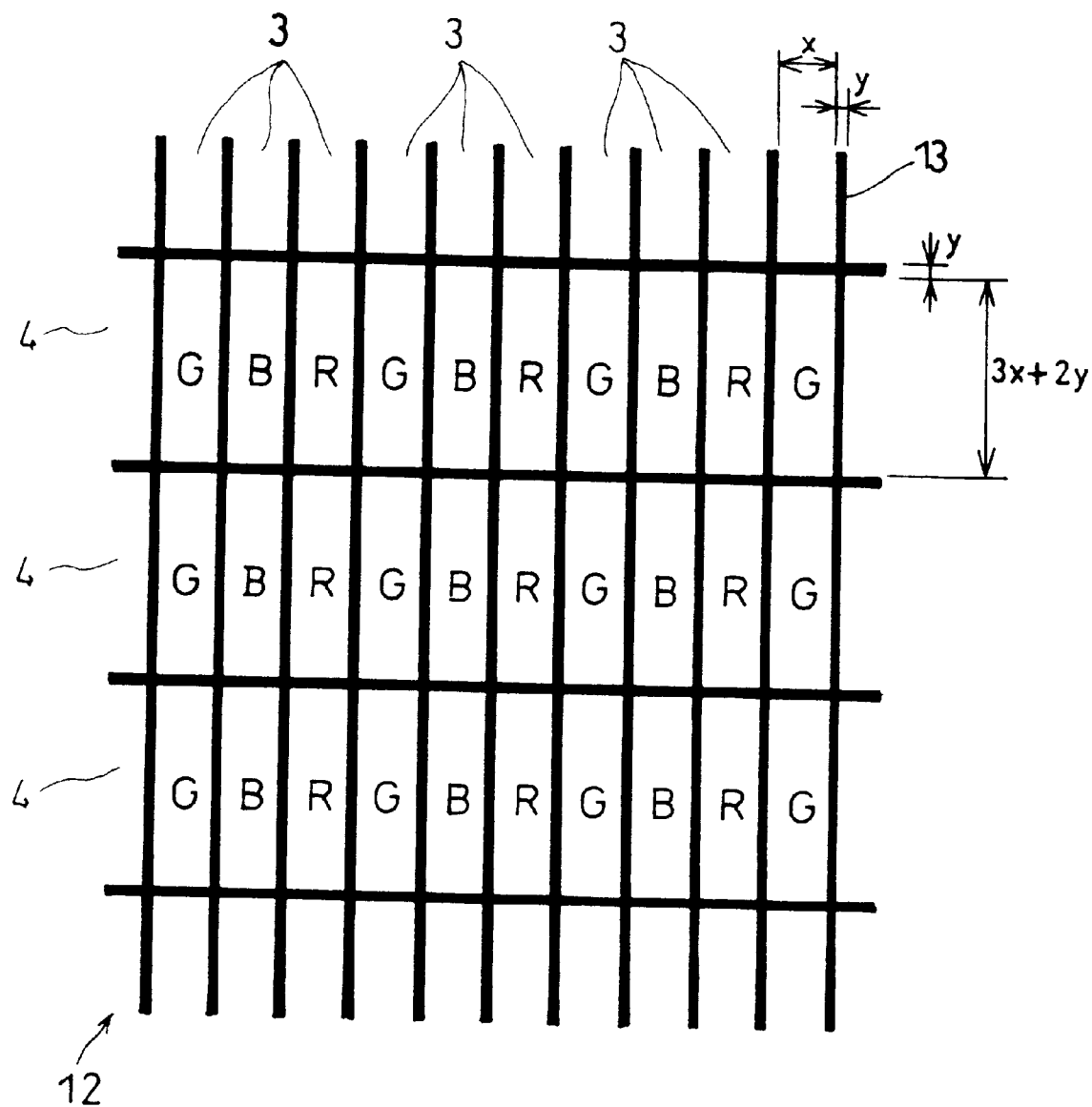
FIG. 11 is an explanatory view showing a relationship between the color filter layer and the signal electrode and the scanning electrode provided in the liquid crystal display device shown in FIG. 1.

As shown in FIG. 11, the color filter layer 12 has a stripe shape RGB pattern, and each of the R, G, and B filters is surrounded by a black matrix 13. In the present embodiment, each of these R, G, and B filters corresponds to one pixel, and adjoining R, G and B filters corresponding to three pixels correspond to one color pixel in a display area.

In the case of the color filter layer 12, the width of the scanning electrode 4 is given by 3x+2y wherein x is a width of the signal electrode 3, and y is the width of the black matrix 13. Here, the width of the signal electrode 3 is around ⅓ of the width of the scanning electrode 4.

Figure 1:
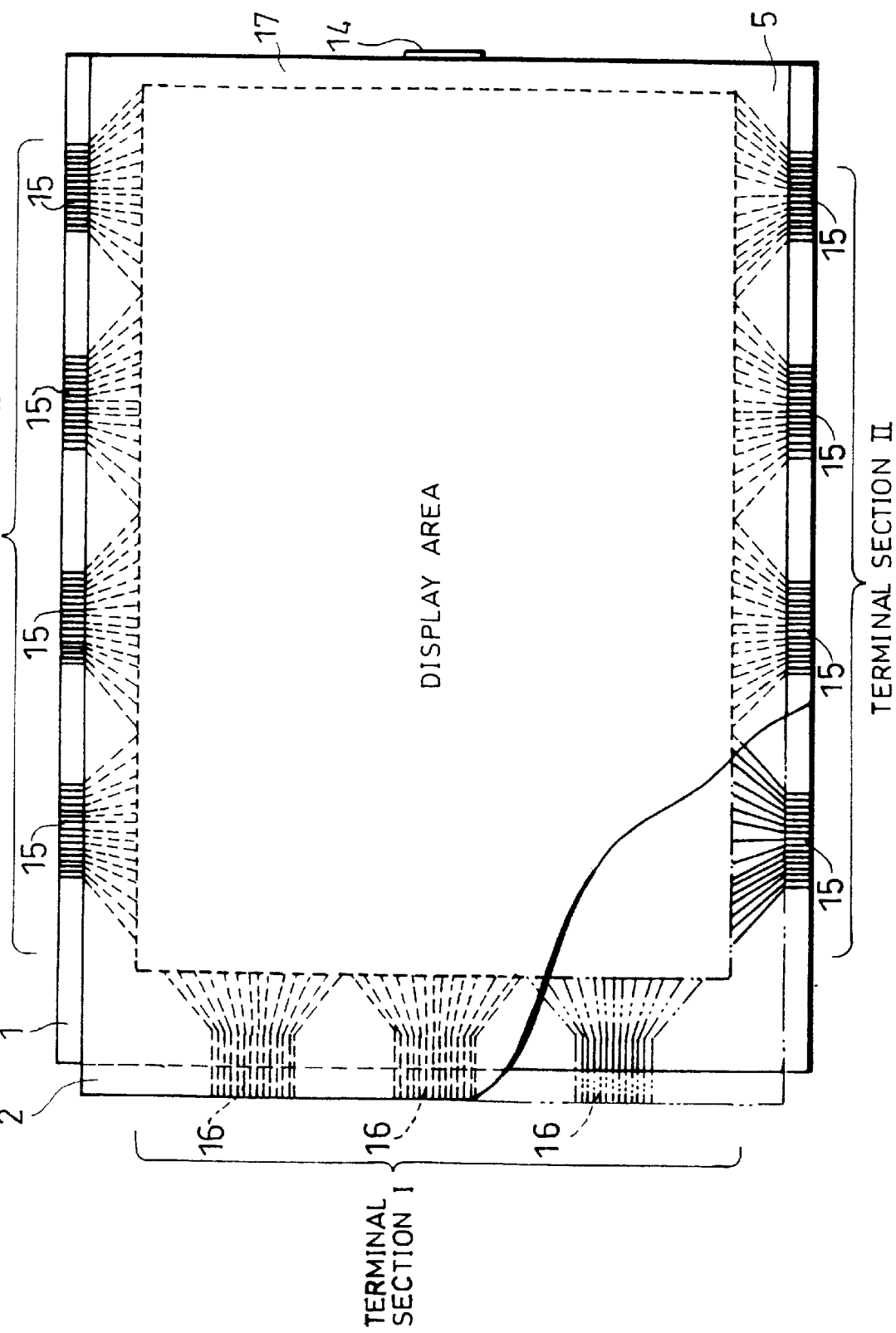
FIG. 1 is a view schematically showing a structure of a liquid crystal display device in accordance with one embodiment of the present invention.

As shown in FIG. 1, in the liquid crystal display device including the liquid crystal cell having the described arrangement, a central portion serves as a display area for displaying an image. For convenience in explanations, members such as the signal electrodes 3, the scanning electrode 4 and the pixel electrodes, etc., formed within the display area are omitted in FIG. 1.

In respective sides of the circumference portion of the display area, where the seal 5 is formed, a terminal section I for connecting the display area to an external circuit (not shown) such as a scanning electrode driving circuit, etc., terminal sections II for connecting the display area to the external circuit (not shown) such as a signal electrode driving circuit, etc., and a liquid crystal sealing opening 14 are formed respectively.

The terminal section I is composed of a plurality of scanning electrode sinuous sections 16. Each scanning electrode sinuous section 16 is constituted by situating a predetermined number of scanning electrodes 4 (FIG. 10) of the scanning electrode substrate 2 within the display area. Namely, in the terminal section I, the sinuous electrodes of the scanning electrodes 4 are formed in a form of a plurality of blocks. The structure of the scanning electrode sinuous sections 16 will be explained in detail later.

The terminal section II is composed of a plurality of signal electrode sinuous sections 15. Each signal electrode sinuous section 15 is constituted by sinuating a predetermined number of signal electrodes 3 (FIG. 10) of the signal electrode substrate 1 within the display area. The structure of the scanning electrode sinuous section 15 will be explained in detail later.

In the seal 5, a portion where the liquid crystal sealing opening 14 is formed, the scanning electrode 4 extends from the scanning area to the seal 5 so as to constitute a liquid crystal sealing opening side electrode section 17. The detailed structure of the liquid crystal sealing opening side electrode section 17 will be explained in detail later.

The respective structures of the scanning electrode sinuous sections 16, the signal electrode sinuous sections 15 and the liquid crystal sealing opening side electrode section 17 are formed respectively in the sides of the circumferential portion of the display area where the seal is formed.

Figure 2:
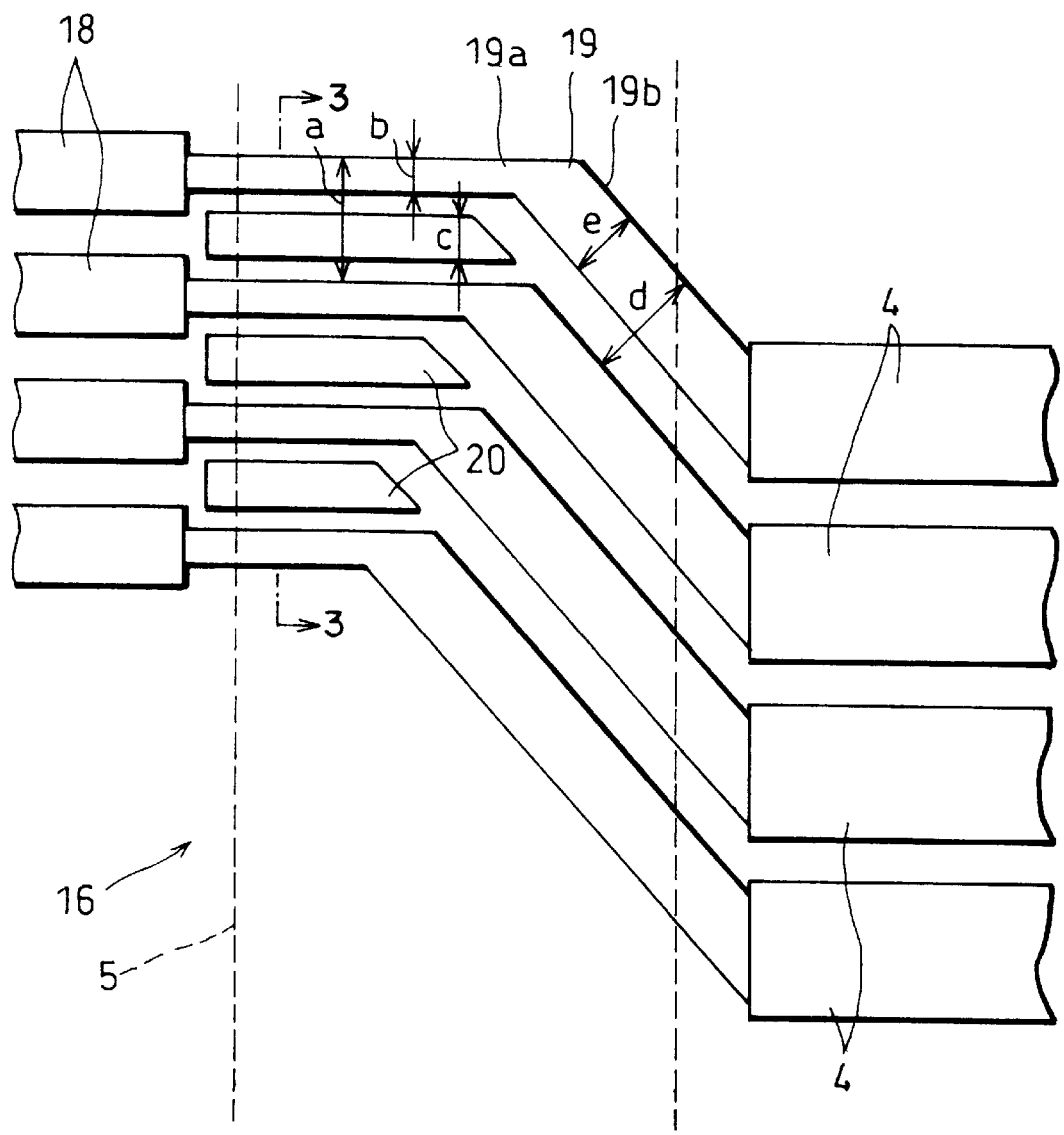
FIG. 2 is an enlarged view of essential parts of a scanning electrode sinuous section provided in the liquid crystal display device shown in FIG. 1.
Figure 8:
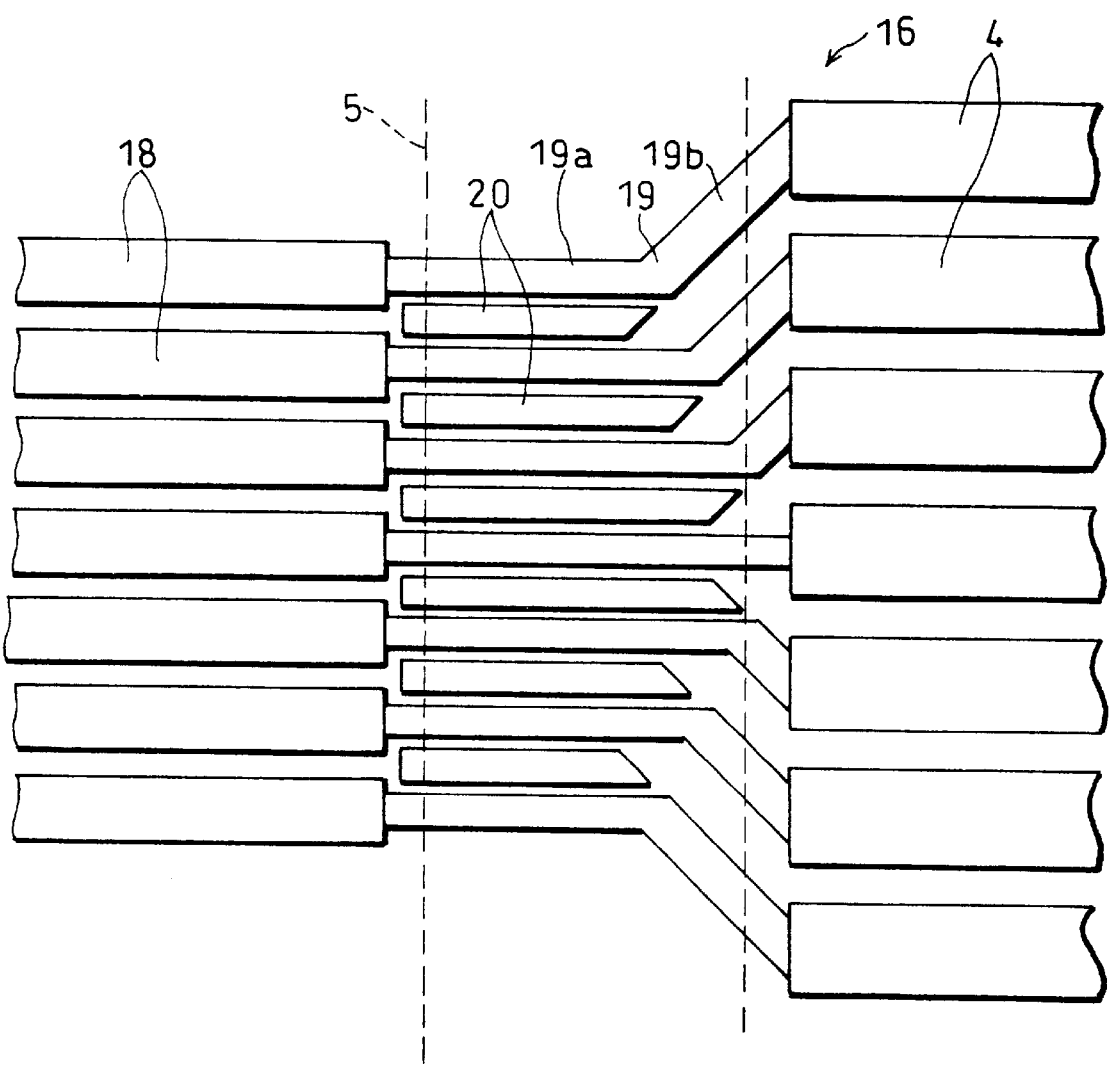
FIG. 8 is a view showing a schematic structure in a vicinity of a central portion of the scanning electrode sinuous section shown in FIG. 2.

First, the scanning electrode sinuous section 16 will be explained in reference to FIG. 2, FIG. 3 and FIG. 8. As shown in FIG. 2, the scanning electrode sinuous section 16 includes sinuous electrodes 19. Each sinuous electrode 19 electrically connects the scanning electrode 4 and the connecting terminal 18 to be connected to the external circuit.

The connection terminals 18 are placed at high density so as to correspond to TAB (Tape Automated Bonding), etc., on the side of the external circuit. Generally, the line width of the connection terminal 18 is narrower than that of the scanning electrode 4. For this reason, the sinuous electrode 19 sinuates from the scanning electrode 4 towards the connection terminal 18. The sinuous electrode 19 is composed of a linear section 19a on the side of the connection terminal 18 and an inclined section 19b on the side of the scanning electrode 4. However, as shown in FIG. 8, at the central portion of the scanning electrode sinuous section 16, the sinuous electrode 19 is composed of only a linear section 19a from the connection terminal 18 to the scanning electrode 4. The sinuous electrode 19 has a reducing ratio of the linear section 19a as it is further away from the central portion. Moreover, the sinuous electrode 19 is designed such that the width of the inclined section 19b is wider than the width of the linear section 19a in order to achieve a constant resistance value among the sinuous electrodes 19 in the scanning electrode sinuous section 16.

As described, when the sinuous electrode 19 is arranged so as to have a wider inclined section 19b than the linear section 19a, a space is formed between the sinuous electrodes 19 in the linear section 19a. Such space creates a difference in thickness of the seal 5 between the portion where the sinuous electrode 19 is formed and the portion where the sinuous electrode 19 is not formed, resulting in a non-uniform thickness of the seal 5.

In order to counteract the described problem, an electrode having the same thickness as the sinuous electrode 19 is formed as a dummy electrode in order to achieve a uniform thickness of the seal 5. As the dummy electrode is formed between the sinuous electrodes 19, the dummy electrode is hereinafter referred to as a between-electrodes dummy electrode 20. The described between-electrodes dummy electrodes 20 and the sinuous electrodes 19 are manufactured simultaneously when forming the scanning electrode 4 on the scanning electrode substrate 2.

Figure 3:
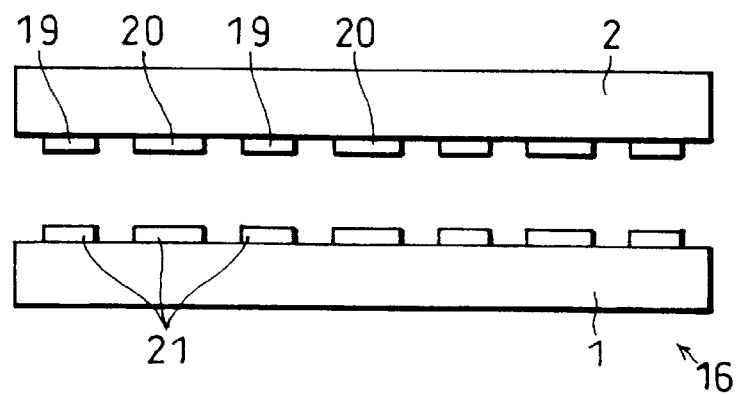
FIG. 3 is a perspective cross-sectional view taken on line A—A of the scanning electrode sinuous section shown in FIG. 1.

As shown in FIG. 3, in the scanning electrode sinuous section 16, double dummy electrodes 21 are formed on the signal electrode substrate 1 which is a counter electrode of the scanning electrode substrate 2, so as to face the sinuous electrodes 19 and the between-electrodes dummy electrodes 20. The double dummy electrode 21 is selected so as to have the same width and thickness as the sinuous electrode 19 and the between-electrodes dummy electrode 20. Therefore, the double dummy electrode 21 is omitted from FIG. 2. The double dummy electrodes 21 and the signal electrodes 3 are formed simultaneously on the signal electrode substrate 1.

The respective structures of the sinuous electrodes 19, the between-electrodes dummy electrodes 20, the double dummy electrodes 21, as well as the distance between the electrodes, etc., will be explained in detail later.

In the following explanations, the display-related electrodes including the sinuous electrode 19 on the seal 5, etc., are all referred to as display-use electrodes, and the between-electrodes dummy electrodes 20 and the double dummy electrodes 21 are all referred to as dummy electrodes.

Figure 4:
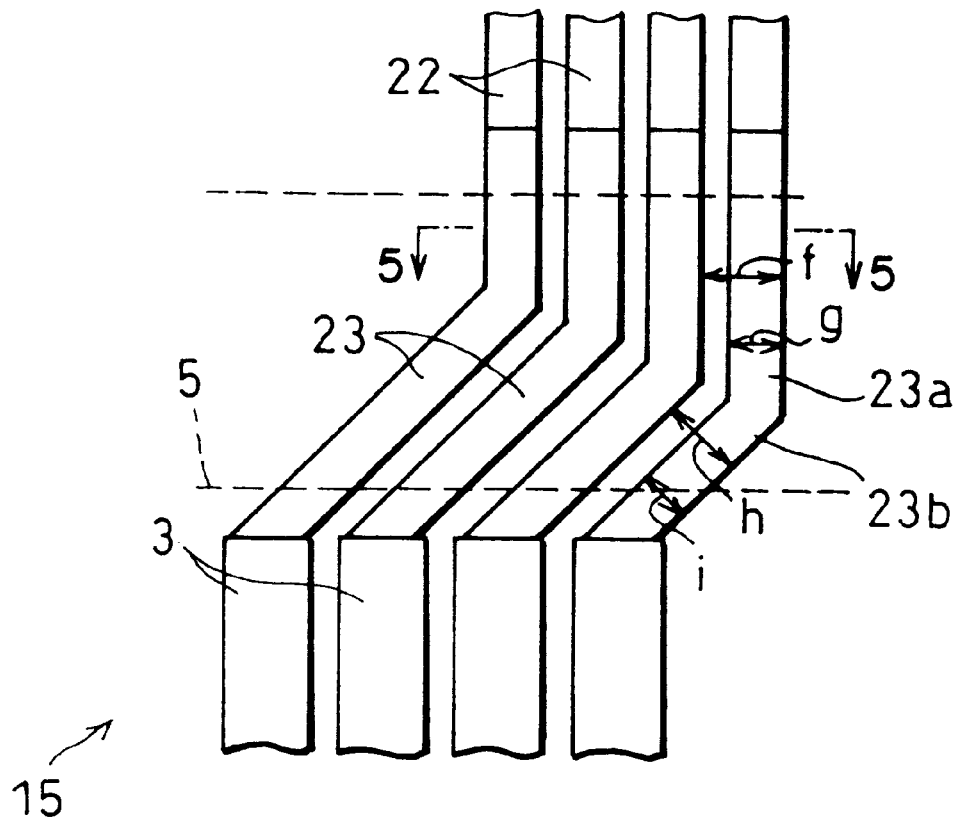
FIG. 4 is an enlarged view showing essential parts of a signal electrode sinuous section provided in the liquid crystal display device shown in FIG. 1.

Next, the signal electrode sinuous sections 15 will be explained in reference to FIG. 4 and FIG. 5. As shown in FIG. 4, the signal electrode sinuous section 15 has a sinuous electrode 23 for electrically connecting the signal electrodes 3 with the connection terminals 22 to be connected to the external circuit.

The connection terminal 22 is placed at a density corresponding to TAB, etc., on the side of the external circuit. In general, the connection terminal 22 has a narrower line width than the signal electrode 3. For this reason, the sinuous electrodes 23 are connected by sinuating from the signal electrode 3 towards the connection terminal 22.

Each sinuous electrode 23 is composed of a linear section 23a formed on the side of the connection terminal 22 and an inclined part 23b formed on the side of the signal electrode. In this case, the ratio of the linear section 23a to the inclined section 23b in the sinuous electrode 23 varies greatly as it is further away from the central portion as in the case of the scanning electrode sinuous section 16. Moreover, the sinuous electrode 23 is formed so as to have constant resistance values among the sinuous electrodes 23 within the signal electrode sinuous section 15 in such a manner than the inclined section 23b is wider than the linear section 23a.

In the case of the sinuous electrode 23, as described, the signal electrode 3 has a width of around ⅓ of that of the scanning electrode 4 (see FIG. 11). Thus, an interval between the signal electrode 3 becomes narrower than an interval between the scanning electrodes 4, and thus an interval between the sinuous electrodes 23 becomes also narrower. Therefore, between the sinuous electrodes 23, such dummy electrode as that formed between the sinuous electrodes 19 in the scanning electrode sinuous section 16 is not formed.

Figure 5:
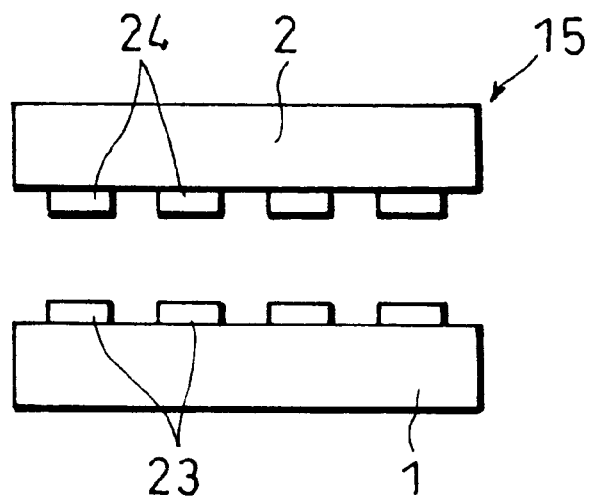
FIG. 5 is a perspective cross-sectional view taken on line B—B of a signal electrode sinuous section shown in FIG. 4.

As shown in FIG. 5, in the signal electrode sinuous section 15, the double dummy electrodes 24 are formed on the scanning electrode substrate 2 which is a counter electrode of the signal electrode substrate 1, so as to face the sinuous electrodes 23. The width and the thickness of the double dummy electrode 24 are selected to be the same as those of the electrode 23. Therefore, the double dummy electrode 24 is omitted from FIG. 4. The double dummy electrodes 24 and the scanning electrodes 4 are formed simultaneously on the scanning electrode substrate 2.

The respective line widths of the sinuous electrode 23 and the double dummy electrode 24, as well as a distance between the electrodes, etc., will be described later.

Figure 6:
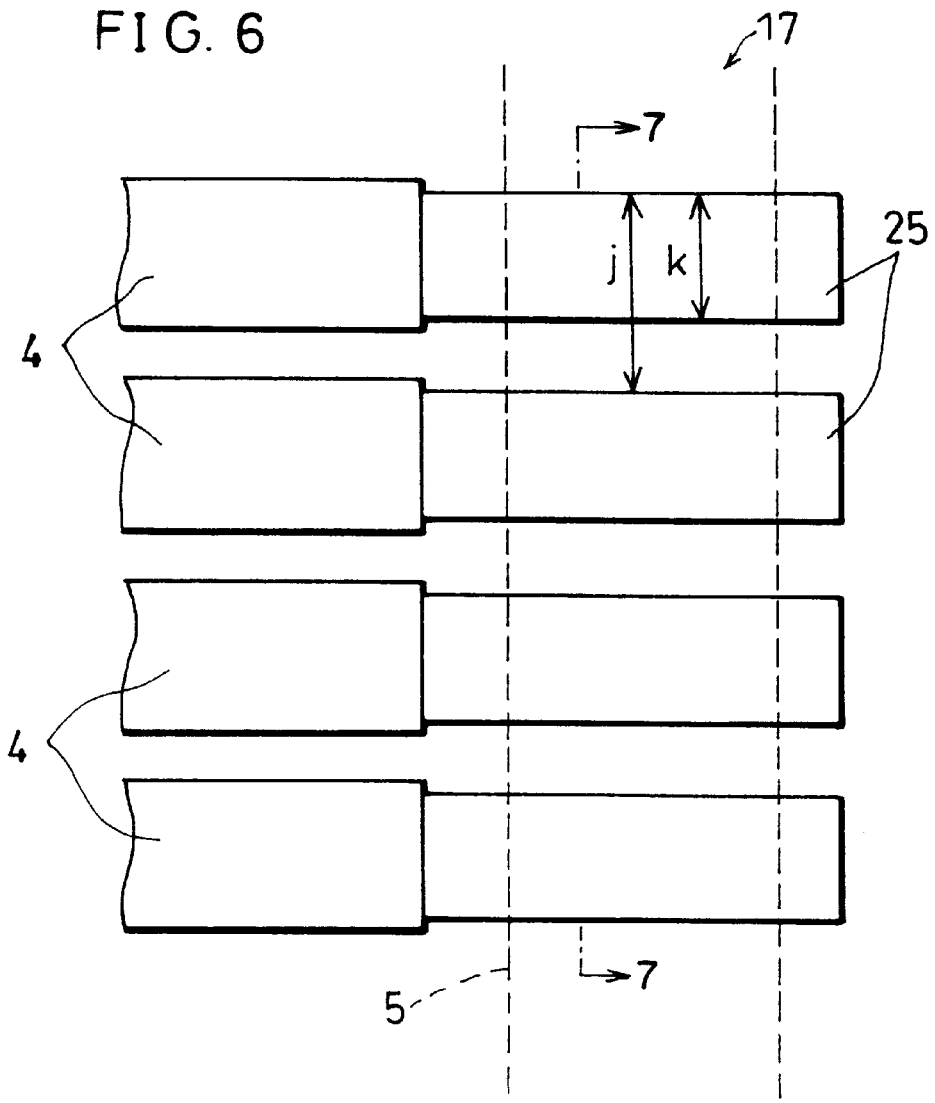
FIG. 6 is an enlarged view showing essential parts of a liquid crystal sealing opening side electrode section provided in the liquid crystal display device shown in FIG. 1.

Next, explanations will be given on the liquid crystal sealing opening side electrode section 17. As shown in FIG. 6, the liquid crystal sealing opening side electrode section 17 has an extended electrodes 25 formed so as to extend over the seal 5 from the scanning electrode 4.

The extended electrode 25 is formed so as to have a narrower linear width than that of the scanning electrode 4 in consideration of the interleaved ratio, and an overlapped ratio of the electrodes in the portion where the seal 5 is formed (to be described later. The interleaving ratio and the overlapping ratio will be described in detail later).

Figure 7:
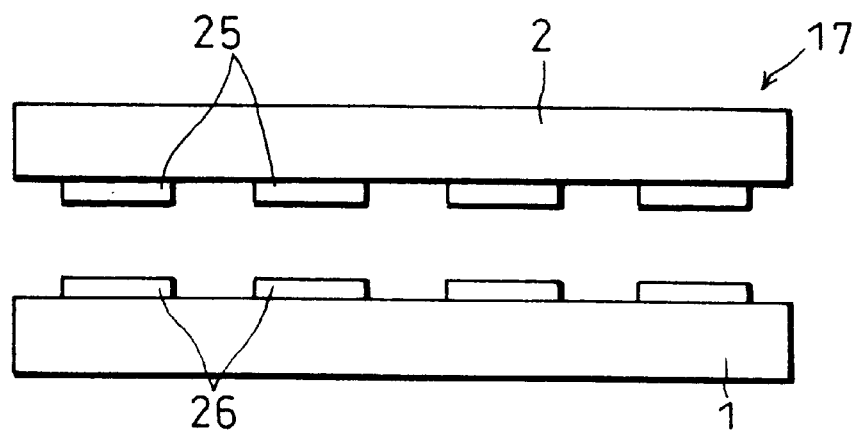
FIG. 7 is a perspective cross-sectional view taken on line C—C of the liquid crystal sealing opening side electrode section shown in FIG. 6.

As shown in FIG. 7, in the liquid crystal sealing opening side electrode section 17, double dummy electrodes 26 are formed on the signal electrode substrate 1 that is a counter substrate of the scanning electrode substrate 2, so as to face the extended electrodes 25. The double dummy electrodes 26 have the same linear width and the thickness as those of the extended electrode 25. Therefore, the double dummy electrodes 26 are omitted from FIG. 6. Additionally, the double dummy electrodes 26 and the signal electrode 3 are formed simultaneously on the signal electrode substrate 1.

The such structures and respective line widths of the extended electrode 25 and the double dummy electrode, as well as a distance between the electrodes, etc., will be explained in detail later.

In the liquid crystal cell of the liquid crystal display device having the described arrangement, the between electrode dummy electrode 20 of the scanning electrode sinuous section 15 is made of the same material (ITO) as the sinuous electrode 19. The between-electrodes dummy electrode 20 is not electrically connected to the sinuous electrode 19 on the substrate 2. Therefore, it is likely that excessive charges are stored on the between-electrodes dummy electrode 20. When storing the charges on the between-electrodes dummy electrode 20, an unnecessary voltage is applied to the sinuous electrode 19. Namely, by applying an unnecessary voltage to the scanning electrode, the display quality is lowered.

Figure 9:
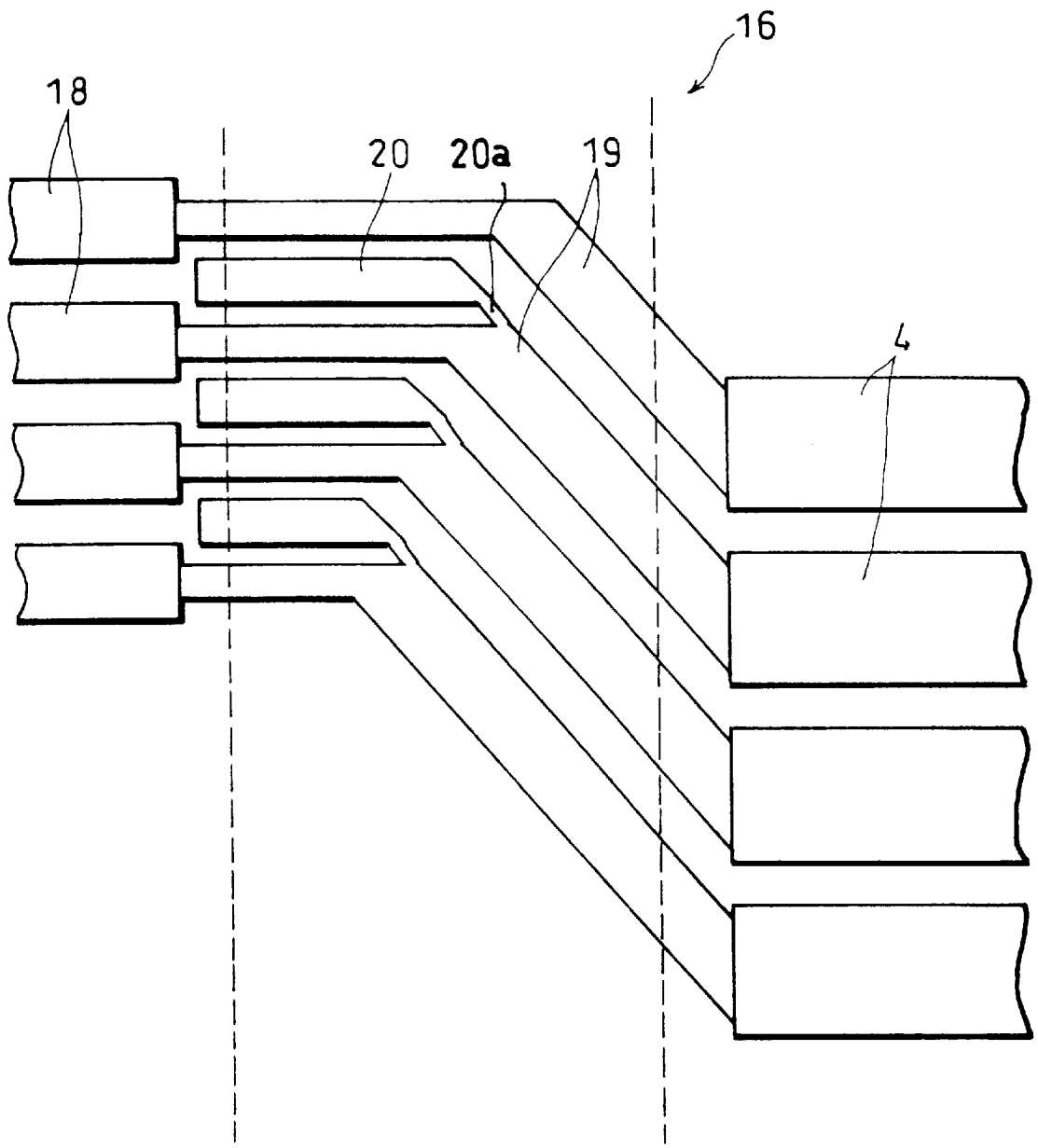
FIG. 9 is a view showing a schematic structure showing other arrangements than the scanning electrode sinuous section shown in FIG. 2.

As shown in FIG. 9, in order to counteract the described problem, the connecting section 20a which is a part of the between-electrodes dummy electrode 20 may be electrically connected to the sinuous electrode 19. In this case, as the excessive charges stored on the between-electrodes dummy electrode 20 can be released through the sinuous electrode 19, the problem of applying an excess voltage to the sinuous electrode 19 can be eliminated, thereby preventing a reduction in display quality. However, when connecting the between-electrodes dummy electrode with the sinuous electrode 19, as the area of the connecting section 20a becomes larger, the between-electrodes dummy electrodes 20 are integrally formed with the sinuous electrodes 19 and may serve as the display-use electrode. In view of the foregoing, the smaller is the line width of the connecting section 20a of the between-electrodes dummy electrode 20, the more is preferable.

In the liquid crystal display device having the described arrangement, the scanning electrode sinuous sections 16, the signal electrode sinuous sections 15 and the liquid crystal sealing opening side electrode 17 are respectively designed such that an absolute value indicative of variations in the interleaved ratio of the display-use electrodes including the sinuous electrodes 19, the sinuous electrodes 23 and the extended electrodes 25 and the dummy electrodes including the between-electrodes dummy electrodes 20, the double dummy electrodes 21, the double dummy electrodes 24 and the double dummy electrodes 26 in the four sides of the display area in the seal 5 are not more than the predetermined value. Here, the interleaved ratio suggest the ratio of an area occupied by the display-use electrodes and the dummy electrodes in the seal 5.

On the seal 5 of the scanning electrode sinuous section 16 of the terminal section I, the dummy electrodes are formed respectively on the signal electrode substrate 1 and the scanning electrode substrate 2. Here, the interleaved ratio of the dummy electrodes is set to a predetermined value as in the interleaved ratio of the scanning electrode sinuous sections 16 in the seal 5. Similarly, the dummy electrodes are formed respectively on the signal electrode substrate 1 and the scanning electrode substrate 2 between the signal electrode sinuous sections 15 of the terminal section II. Here, the interleaved ratio of the overlapped ratio of the dummy electrode are set to a predetermined value as in the interleaved ratio on the seal 5 of the signal line sinuous circuit 15.

As described, by selecting the variations in the interleaved ratio of the display-use electrodes and the dummy electrodes in the four sides on the seal 5 to be not more than a predetermined value, a substantially uniform thicknesses of the liquid crystal layer 9 can be achieved in a vicinity of the seal 5 in four sides. As a result, variations in brightness can be eliminated especially in a vicinity of the seal 5, thereby improving a display quality.

Here, the predetermined value of the interleaved ratio is set in a range of recognizing that variations in brightness in the four sides in a vicinity of the seal 5 can be recognized when the operator actually observes the display area.

As shown in FIG. 10, the thickness of the seal 5 is adjusted by the within-seal spacer 6, and only by altering the diameter of the within-seal spacer 6, the thickness of the liquid crystal layer 9 can be adjusted to the thickness of the liquid crystal layer 9. As this offers a uniform thickness in the four lines between the central portion of the liquid crystal layer 9 and the thickness of the liquid crystal layer 9 in a vicinity of the seal 5, variations in brightness between the central portion of the display area and a portion in a vicinity of the seal 5 can be eliminated, thereby achieving a still improved display quality.

Here, differences in variations in brightness of the display area between (a) the liquid crystal display device (hereinafter referred to as a uniform product) in which variations in the interleaved ratio of the display-use electrode and the dummy electrode in the four sides on the seal 5 are selected to be not more than a predetermined value and (b) a conventional liquid crystal display device (hereinafter referred to as a non-uniform product) in which variations in the interleaved ratio are not considered will be explained in reference to FIG. 12 through FIG. 14.

The variations in brightness can be determined based on the results of measuring a transmission ratio (standard average value) when performing a gradation display.

Here, the average value shown in FIG. 12 is determined to be a value obtained by measuring an average transmission ratio when performing a gray shade display at every plotted point in the figure (dotted line in the figure), at respective resolution of the display area of the liquid crystal display device of 600 dots (Y-axis) and 800 dots (X-axis), a transmission ratio (average value reference) in the gray-shade display is determined for each dot. As a result, the transmission ratio when performing the gray shade display in the direction of the wiring of the signal electrode is obtained as shown in FIG. 13, and the transmission ratio when performing a gray-shade display in the wiring direction of the scanning electrode is as shown in FIG. 14. In FIG. 13 and FIG. 14, the result of the uniform product is shown by a solid line, and the result of the non-uniform product is shown by an alternate long and short dash line.

Figure 13:
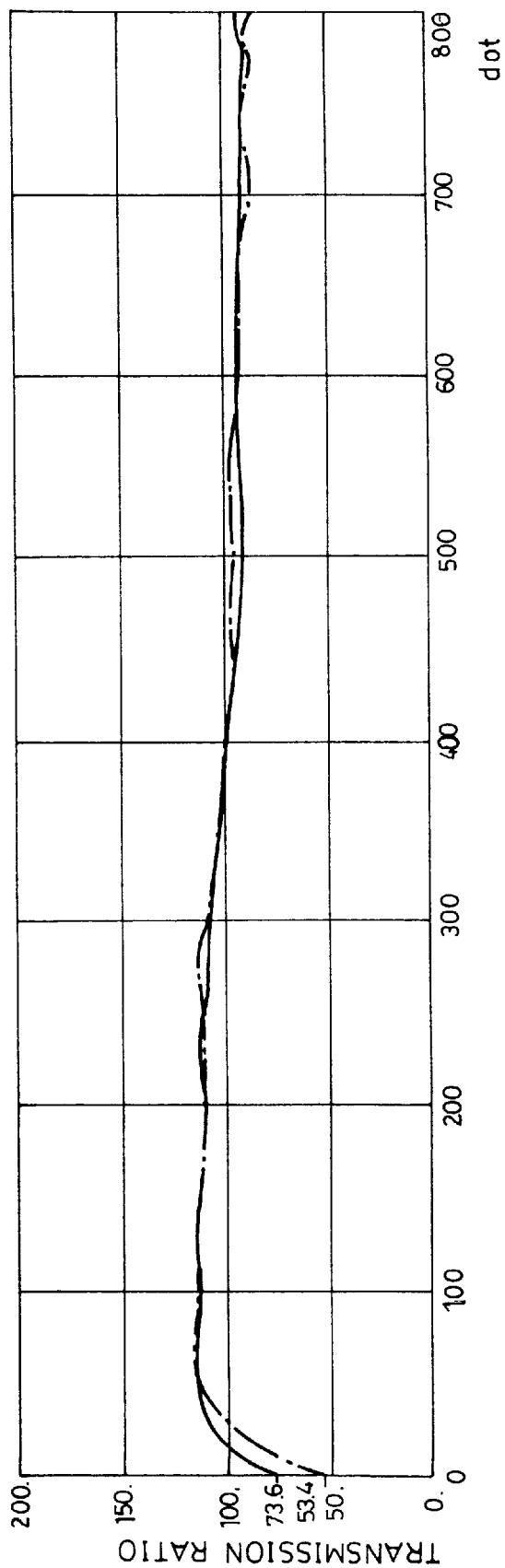
FIG. 13 is a graph showing results of measurements based on the explanatory view of FIG. 12.
Figure 14:
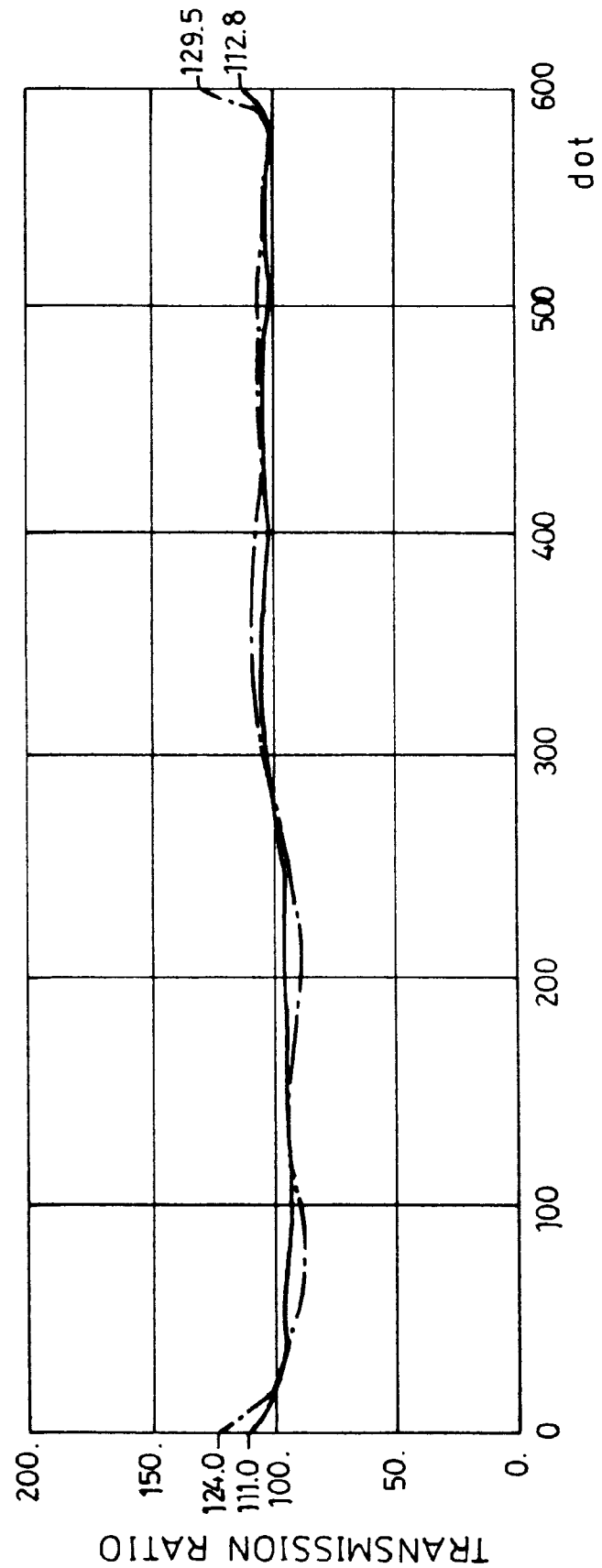
FIG. 14 is a graph showing results of measurements based on the explanatory view shown in FIG. 12.

As can be seen from FIG. 13 and FIG. 14, the uniform product has a transmission ratio which is close to the average value in a vicinity of a point (X-axis: 0, 800 dot, and Y-axis: 0, 600 dot) in the display region compared with the non-uniform product. This proves that the uniform product has smaller variations in brightness between the central portion and the portion in a vicinity of the seal 5 of the display area.

As described, in the liquid crystal display device having the described arrangement, as an absolute value of the variations in the interleaved ratio in the four sides of the seal 5 of the display area are selected to be not more than the predetermined value, compared with the conventional liquid crystal display device, variations in brightness between the central portion and the portion in a vicinity of the seal 5 of the liquid crystal area can be suppressed.

Figure 15:
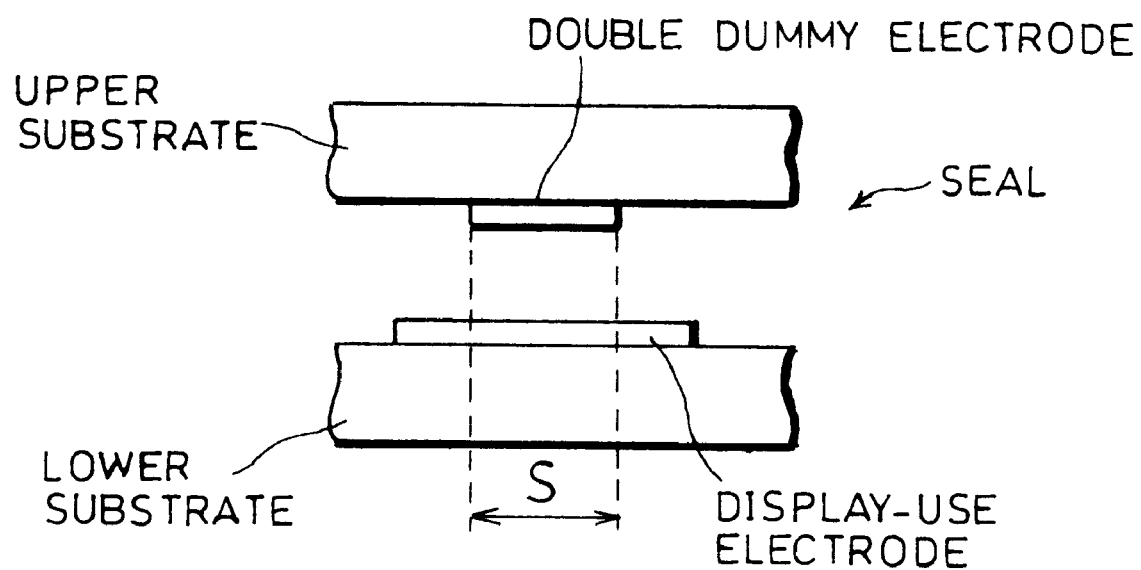
FIG. 15 is an explanatory view of an overlapped ratio.

Furthermore, in order to reduce the variations in brightness between the central portion and the portion in a vicinity of the seal 5 of the display area, as shown in FIG. 15, it is considered to eliminate not only the variations in the interleaved ratio, but also the variations in the overlapped ratio indicative of the ratio of the overlapped region S of the two electrodes which face each other in the seal 5.

In the liquid crystal display device having the described arrangement, the scanning electrode sinuous section 16, the signal electrode sinuous section 15 and the liquid crystal sealing opening side electrode 17 are respectively designed such that respective absolute values in variations in the interleaved ratio and an overlapped ratio of the display-use electrodes including the sinuous electrodes 19, the sinuous electrodes 23 and the extended electrodes 25 and the dummy electrodes including the between-electrodes dummy electrodes 20, the double dummy electrodes 21, the double dummy electrodes 24 and the double dummy electrodes 26 in the four sides of the display area in the seal 5 are not more than the predetermined value.

Additionally, the interleaved ratio of the dummy electrodes formed on the signal electrode substrate 1 and the scanning electrode substrate 2 formed on the seal 5 between the scanning electrode sinuous sections 16 in the terminal section I are also selected to be a predetermined value as in the overlapped ratio of the scanning electrode sinuous section 16 in the seal 5.

Similarly, in the seal 5 between the signal electrode sinuous sections 15 in the terminal section II, dummy electrodes are formed respectively on the signal electrode substrate 1 and the scanning electrode substrate 2. Here, the interleaved ratio and the overlapped ratio of these dummy electrodes are also set to not more than a predetermined value as in the seal 5 of the signal electrode sinuous sections 15.

As described, by designing the display-use electrodes and the dummy electrodes so as to have the interleaved ratio of the display-use electrode and the dummy electrode in the four sides of the seal 5 to be not more than a predetermined value, substantially uniform thickness of the liquid crystal layer 9 in four sides in a vicinity of the seal 5 can be obtained. As a result, variations in brightness in a vicinity of the seal 5 can be eliminated, thereby achieving an improved display quality.

Here, the predetermined value for the overlapped ratio is selected to fall in a range which permits the user to recognize that variations in brightness in four sides in a vicinity of the seal 5 is reduced when setting the display area.

Additionally, as shown in FIG. 10, by the within seal spacer 6, only the thickness of the seal 5 is adjusted, the thickness of the seal 5 can be adjusted to the thickness of the liquid crystal layer 9 only by altering the diameter of the within-seal spacer 6. As a result, a uniform thickness can be achieved throughout from the central portion of the liquid crystal layer 9 in the display area and the liquid crystal layer 9 in a vicinity of the seal 5, thereby eliminating variations in brightness between the central portion of the display area and the portion in a vicinity of the seal 5 can be eliminated, thereby achieving a still improved display quality.

The liquid crystal display device having the described arrangement has a color filter layer 12 in a stripe shape, and a display-use electrode corresponding to the color filter layer 12.

Therefore, by arranging the display-use electrodes in accordance with the color filter layer 12, for example, the display-use electrode is arranged so as to include the scanning electrode 4 formed on the scanning electrode substrate 2 and the signal electrodes 3 formed on the signal electrode substrate 1, and the electrode pitch of the signal electrode 3 is formed so as to be ⅓ of the electrode pitch of the scanning electrode 4. As a result, in the display-use electrodes, the signal electrode 3 has a line width of around ⅓ of the line width of the scanning electrode 4, thereby creating a difference between an overlapped ratio of the display-use electrodes and the dummy electrodes on the seal 5 where the signal electrodes 3 are formed and an overlapped ratio of the display-use electrodes and the dummy electrodes on the seal 5 where the scanning electrodes 4 are formed.

However, as the display-use electrode and the dummy electrode are selected so as to have an absolute value indicative of variations in the overlapped ratio in the four sides of the seal 5of not more than a predetermined value, variations in brightness due to differences in the overlapped ratio can be reduced. Therefore, even in the liquid crystal display device having the stripe-shaped color filter layer 12, a difference in brightness on an entire display area can be reduced, thereby achieving an excellent display quality.

Additionally, in the case of adopting the STN-type liquid crystal display device as the liquid crystal display device, there exist large variations in characteristics with respect to a difference in cell thickness, and for example, when the thickness of the liquid crystal layer is changed by 0.05 μm, variations in brightness occur.

However, as the display-use electrodes and the dummy electrodes are arranged such that respective absolute values in variations of the overlapping ratio in the four sides of the seal 5 are not more than a predetermined value, variations in brightness caused by a difference in the overlapped ratio can be reduced. Therefore, even in the STN-type liquid crystal display device, as a difference in brightness can be reduced in an entire display area, an excellent display quality can be achieved.

Here, differences in variations in brightness of the display area between (a) the liquid crystal display device (hereinafter referred to as a uniform product) in which variations in the interleaved ratio and the overlapped ratio of the display-use electrode and the dummy electrode in the four sides on the seal 5 are selected to be not more than a predetermined value and (b) a conventional liquid crystal display device (hereinafter referred to as a non-uniform product) in which variations in the interleaved ratio and the overlapped ratio are not considered will be explained in reference to FIG. 12, FIG. 16 and FIG. 17.

The variations in brightness can be determined based on the results of the measurements of a ratio of transmission (standard average value) when performing a gray shade display.

Here, the average value indicated in FIG. 12 is determined to be a value obtained by measuring an average transmission ratio when performing a gray shade display at every plotted point in the figure (dotted line in the figure), at respective resolution of the display area of the liquid crystal display device of 600 dots (Y-axis) and 800 dots (X-axis), a transmission ratio (average value reference) in the gray-shade display is determined for each dot. The results are as shown in the graphs of FIG. 16 and FIG. 17. In the graphs, the result of the uniform product is shown by a solid line, while the non-uniform product is shown by an alternate long and short dash line.

Figure 16:
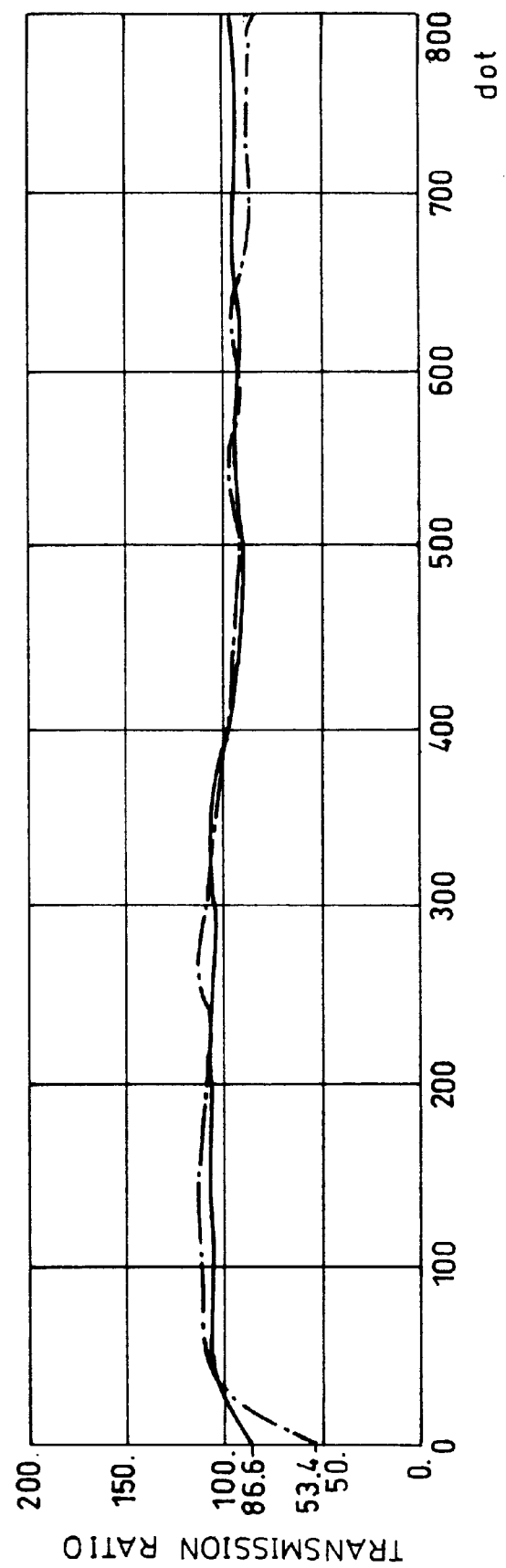
FIG. 16 is a graph showing results of measurements based on the explanatory views of FIG. 12 through FIG. 15.
Figure 17:
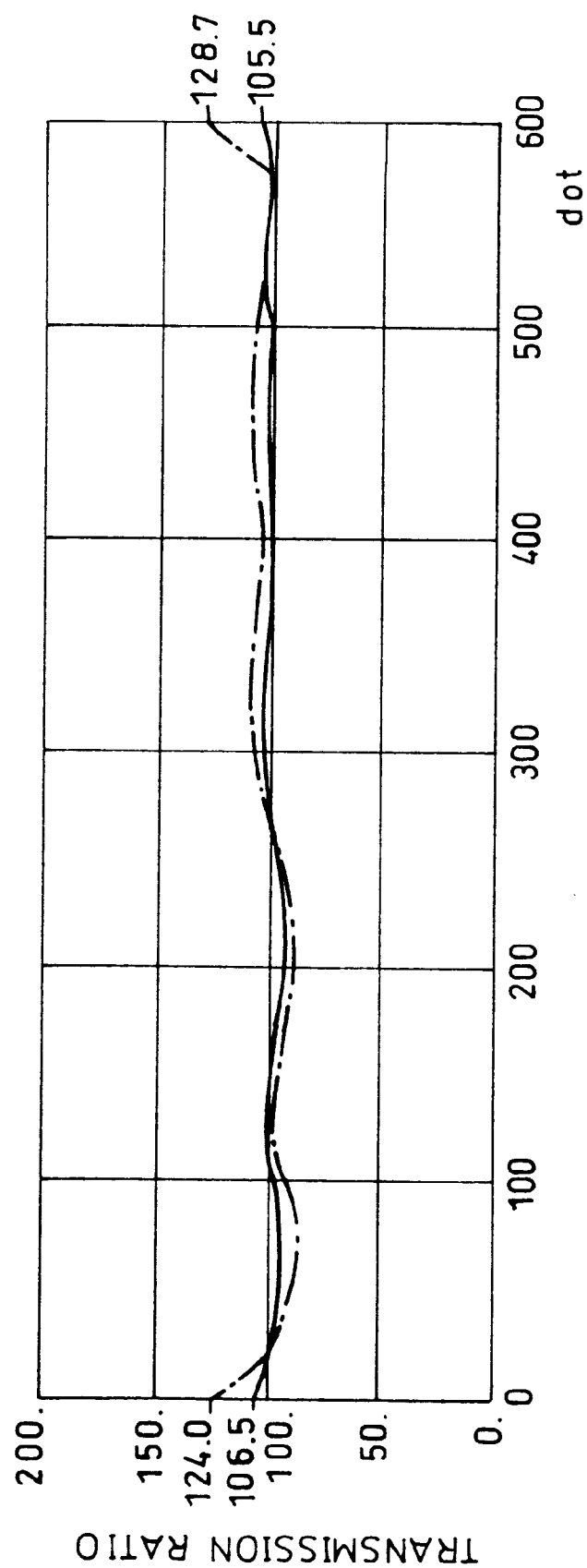
FIG. 17 is a graph showing results of measurements based on the explanatory views of FIG. 12 through FIG. 15.

As can be seen from FIG. 16 and FIG. 17, the uniform product has a transmission ratio which is close to the average value in a vicinity of a point (X-axis: 0, 800 dot, and Y-axis: 0, 600 dot) in the display region compared with the non-uniform product. This proves that the uniform product has smaller variations in brightness between the central portion and the portion in a vicinity of the seal 5 of the display area.

In the liquid crystal display device having the described arrangement, examples are given respectively for the case (1) where variations in only the interleaved ratio are set to be substantially uniform in the four sides of the seal 5 and the case (2) where variations in both interleaved ratio and overlapped ratio are set to be substantially uniform in the four sides.

First, explanations will be given through the case where variations in only the interleaved ratio is set substantially uniform in the liquid crystal display device having the arrangement shown in FIG. 1 in reference to FIG. 1 through FIG. 7.

In the present embodiment, the interleaved ratio is defined to be a ratio of an area occupied by the electrodes in the seal 5; however, for the simplification of the design, the interleaved ratio is defined to be "line width of the electrode/electrode pitch" in this example, as well as in the following embodiments. Further, based on the above-defined interleaved ratio, the signal electrode sinuous section 15, the scanning electrode sinuous section 16 and the liquid crystal sealing opening side electrode section 17 are designed.

First, in the case of the scanning electrode sinuous section 16, the sinuous electrode 19 is designed so as to have an electrode pitch a of the linear line 19a of 0.2000 mm, a line width b of the linear section 19a of 0.0665 mm, a line width c of the between-electrodes dummy electrode 20 of 0.0886 mm, an electrode pitch d of the sinuous electrode 19 of 0.1530 mm, and a line width e of the inclined section 19b of 0.1187 mm, and the double dummy electrode 21 shown in FIG. 3 is designed so as to have respective same line widths and electrode pitches as those of the corresponding sinuous electrode 19 and the between-electrodes dummy electrode 20.

First, in the case of the signal electrode sinuous section 15, as shown in FIG. 4, the sinuous electrode 23 is designed so as to have an electrode pitch f of the linear line 23a of 0.0710 mm, an electrode pitch h of the inclined section 23b of 0.0695 mm, a line width i of the inclined section 23b of 0.0539 mm, and the double dummy electrode 24 shown in FIG. 5 is designed so as to have the same respective line widths and electrode pitches as those of the corresponding sinuous electrodes 23.

Lastly, as shown in FIG. 6, in the case of the liquid crystal sealing opening side electrode section 17, the extended electrode 25 is designed so as to have an electrode pitch k of 0.2730 mm, and a line width j of 0.1331 mm, and the double dummy electrodes 26 shown in FIG. 7 are designed so as to have same electrode pitch and a line width as those of the extended electrodes 25. Here, the line width of the scanning electrode 4 is selected to be 0.253 mm.

In the following explanations, the display-related electrode including the sinuous electrode 19, etc., on the seal 5 are referred to as display-use electrodes, and the between-electrodes dummy electrodes (between-lines dummy electrodes) 20 and the double dummy electrodes 21 are referred to as dummy electrodes.

The interleaved ratio of the display-use electrodes and the dummy electrodes in the liquid crystal display device shown in FIG. 1 including the signal electrode sinuous section 15, the scanning electrode sinuous section 16 and the liquid crystal sealing opening side electrode section 17 having the described arrangements are as shown in Table 1.

TABLE 1

|  |  | DISPLAY-USE ELECTRODE · BETWEEN-LINES ELECTRODE · EXTENDED ELECTRODE |  |
| --- | --- | --- | --- |
| TERMINAL SECTION I | LINEAR SECTION | 0.0665/0.2000*100 = 33.250% (DISPLAY-USE ELECTRODE) + 0.0886/0.2000*100 = 44.300% (BETWEEN-LINES DUMMY ELECTRODE) = 77.550% | |
|  | INCLINED SECTION | 0.1187/0.1530*100 = 77.582% (DISPLAY-USE ELECTRODE) | |
| TERMINAL SECTION II | LINEAR SECTION | 0.0551/0.0710*100 = 77.606% (DISPLAY-USE ELECTRODE) | |
|  | INCLINED SECTION | 0.0539/0.0695*100 = 77.554% (DISPLAY-USE ELECTRODE) | |
| INJECTION OPENING |  | 0.2118/0.2730*100 = 77.582% (EXTENDED ELECTRODE) | |
|  |  | DOUBLE DUMMY ELECTRODE | INTERLEAVED RATIO |
| TERMINAL SECTION I | LINEAR SECTION | 0.0665/0.2000*100 = 33.250% + 0.0886/0.2000*100 = 44.300% = 77.550% | 155.100% |
|  | INCLINED SECTION | 0.1187/0.1530*100 = 77.582% | 155.164% |
| TERMINAL SECTION II | LINEAR SECTION | 0.0551/0.0710*100 = 77.606% | 155.212% |
|  | INCLINED SECTION | 0.0539/0.0695*100 = 77.554% | 155.108% |
| INJECTION OPENING |  | 0.2118/0.2730*100 = 77.582% | 155.164% |

The injection opening corresponds to the liquid crystal sealing opening side electrode section 17.

As can be seen from Table 1, the interleaved ratios of the display-use electrodes and the dummy electrodes on the seal 5 are selected to be substantially uniform in the four sides in the circumference portion of the display area of the liquid crystal display device.

Then, an STN-type color liquid crystal display device is prepared using the signal electrode substrate 1 and the scanning electrode substrate 2 including the described display-use electrodes and the dummy electrodes. The resulting STN-type color liquid crystal display device show a uniform brightness in the four sides of the circumferential portion of the display area. Furthermore, by adjusting the diameter of the within-seal spacer 7 contained in the seal 5, the brightness in a vicinity of the seal 5 in the display area in the four sides can be adjusted to the brightness of the central portion of the display area.

Moreover, the interleaved ratio of the dummy electrodes provided in a space on the seal 5 between the signal electrode sinuous section 15 and the between the scanning electrode sinuous sections 16 in the terminal sections I and II respectively are adjusted to be uniform in four sides in accordance with the interleaved ratio of the display-use electrodes and the dummy electrodes of the signal electrode sinuous section 15 and the scanning electrode sinuous section 16, and the interleaved ratio of the dummy electrodes of the liquid crystal sealing opening side electrode section 17.

The explanations will be given through the case where variations in the interleaved ratio and the overlapped ratio are selected to be substantially uniform in the four sides of the seal 5 in the liquid crystal display device having the arrangement shown in FIG. 1.

As described, the interleaved ratio is defined to be the ratio of an area occupied by the electrodes in the seal 5. The overlapped ratio is defined to a ratio of an overlapped area S between the two electrodes which face each other as shown in FIG. 15.

However, for the simplification of the design, the interleaved ratio is defined to be the "line width of the electrode/ electrode pitch", and the overlapped ratio is defined to be the "line width of one of the electrodes, which has a narrower line width/electrode pitch". Further, based on the above-defined interleaved ratio and the overlapped ratio, the scanning electrode sinuous section 16 and the liquid crystal sealing opening side electrode section 17 are designed.

In respective electrode sinuous sections, the double dummy electrodes are formed on the substrates which face each other so as to be overlapped with the electrode sinuous sections. The dummy electrodes are formed also between the terminal groups of the terminal sections I·II so as to have a constant interleaved ratio and the overlapped ratio.

As shown in FIG. 11, the terminal section II has connection terminals three times as many as the that of the terminal section I. Therefore, the width of the display-use electrode which extends from the terminal section II is around ⅓ of the width of the display-use electrode which extends from the terminal section I, and the pitch of the sinuous electrode 15 in the terminal section II is formed narrower than the pitch of the terminal section I. Therefore, although the between-electrodes dummy electrode 20 is formed between the sinuous electrodes 19 of the scanning electrode sinuous section 16 of the terminal section I, the between-electrodes dummy electrode is not formed in the sinuous electrodes 23 of the signal electrode sinuous section 16 in the terminal section II.

In order to select the interleaved ratio of the electrode of the seal 4 to be substantially the same as other sides, the liquid crystal sealing opening side electrode section 17 is designed such that a width between the electrodes of the display-use electrode and the dummy electrode of the seal 5 portion is reduced.

First, as shown in FIG. 2, in the case of the scanning electrode sinuous section 16, the sinuous electrode 19 is selected to have an electrode pitch a of the linear section 19a of 0.2000 mm, a line width b of the linear section 19a of 0.0665 mm, and the between-electrodes dummy electrode 20 is designed so as to have a line width c of 0.0886 mm, an electrode pitch d of the inclined section 19b of the sinuous electrode 19 of 0.1530 mm, and a line width e of the inclined section 19b of 0.1187 mm, and further, the double dummy electrode 21 shown in FIG. 3 is designed so as to have the same line width of an electrode pitch as those of the corresponding sinuous electrode 19 and the between-electrodes dummy electrode 20.

Next, in the case of the signal electrode sinuous section 15, as shown in FIG. 4, the sinuous electrode 23 is designed so as to have an electrode pitch f of the linear section 23a of 0.0710 mm, a line width g of the linear section 23a of 0.0551 mm, and an electrode pitch h of the inclined section 23b of the sinuous electrode 23 of 0.0695 mm, and a line width i of the inclined section 23b of 0.0539 mm, and the double dummy electrode 24 shown in FIG. 5 is designed so as to have the same line width and electrode pitch as those of the sinuous electrode 23 corresponding to the double dummy electrode 24.

Lastly, in the case of the liquid crystal sealing opening side electrode 17, as shown in FIG. 6, the extended electrode 25 is designed so as to have an electrode pitch j of 0.2730 mm, and a line width k of 0.2118 mm, and that the double dummy electrode 26 shown in FIG. 7 is designed so as to have the same the electrode pitch and the line width as those of the extended electrode 25.

The interleaved ratio and the overlapped ratio of the display-use electrode and the dummy electrode in the liquid crystal display device shown in FIG. 1 including the scanning electrode sinuous section 16, the signal electrode sinuous section 15 and the liquid crystal sealing opening side electrode section 17 are as shown in Table 2.

as to have a uniform wiring resistance of the display-use electrode in the four sides.

Then, an STN-type color liquid crystal display device is prepared using the signal electrode substrate 1 and the scanning electrode substrate 2 having the described display-use electrodes and the dummy electrodes. The resulting STN-type color liquid crystal display device shows a uniform brightness in four sides of the circumferential portion of the display area. Furthermore, by adjusting the diameter of the glass beads of the within seal spacer 6 contained in the seal 5, the brightness in a vicinity of the seal in the display area in all four sides can be adjusted to the brightness of the central portion of the display area.

Moreover, the interleaved ratio and the overlapped ratio of the dummy electrodes provided in spaces on the seal 5 between the scanning electrode sinuous sections 16 and the signal electrode sinuous sections 15 are adjusted to be uniform in four sides in accordance with the interleaved ratio and the overlapped ratio of the display-use electrodes and the dummy electrodes in the scanning electrode sinuous sections 16 and the signal electrode sinuous sections 15 as well as the interleaved ratio and the overlapped ratio of the dummy electrodes of the liquid crystal sealing opening side electrode 17.

Second Embodiment

The following descriptions will explain another embodiment of the present invention. Here, members having the same functions as those of the aforementioned embodiment

TABLE 2

| | | DISPLAY-USE ELECTRODE · BETWEEN-LINES ELECTRODE · EXTENDED ELECTRODE |
|---|---|---|
| TERMINAL SECTION I | LINEAR SECTION | 0.0665/0.2000*100 = 33.250% (DISPLAY-USE ELECTRODE) + 0.0886/0.2000*100 = 44.300% (BETWEEN-LINES DUMMY ELECTRODE) = 77.550% |
| | INCLINED SECTION | 0.1187/0.1530*100 = 77.582% (DISPLAY-USE ELECTRODE) |
| TERMINAL SECTION II | LINEAR SECTION | 0.0551/0.0710*100 = 77.606% (DISPLAY-USE ELECTRODE) |
| | INCLINED SECTION | 0.0539/0.0695*100 = 77.554% (DISPLAY-USE ELECTRODE) |
| INJECTION OPENING | | 0.2118/0.2730*100 = 77.582% (EXTENDED ELECTRODE) |

| | | DOUBLE DUMMY ELECTRODE | INTER-LEAVED RATIO | OVER-LAPPED RATIO |
|---|---|---|---|---|
| TERMINAL SECTION I | LINEAR SECTION | 0.0665/0.2000*100 = 33.250% + 0.0886/0.2000*100 = 44.300% = 77.550% | 155.100% | 33.250% + 44.300% = 77.550% |
| | INCLINED SECTION | 0.1187/0.1530*100 = 77.582% | 155.164% | 77.582% |
| TERMINAL SECTION II | LINEAR SECTION | 0.0551/0.0710*100 = 77.606% | 155.212% | 77.606% |
| | INCLINED SECTION | 0.0539/0.0695*100 = 77.554% | 155.108% | 77.554% |
| INJECTION OPENING | | 0.2118/0.2730*100 = 77.582% | 155.164% | 77.582% |

The injection opening corresponds to the liquid crystal sealing opening side electrode section 17.

As can be seen from Table 2, the interleaved ratio of the display-use electrodes and the dummy electrodes on the seal 5 in the sides along the circumference section of the display area of the liquid crystal display device are substantially the same. In this case, the interleaved ratio indicates the sum of the interleaved ratio of the display-use electrodes and the between-electrodes dummy electrodes, and the interleaved ratio of the double dummy electrodes. Here, it is designed so will be designated by the same reference numerals, and thus the descriptions thereof shall be omitted here.

Figure 18:
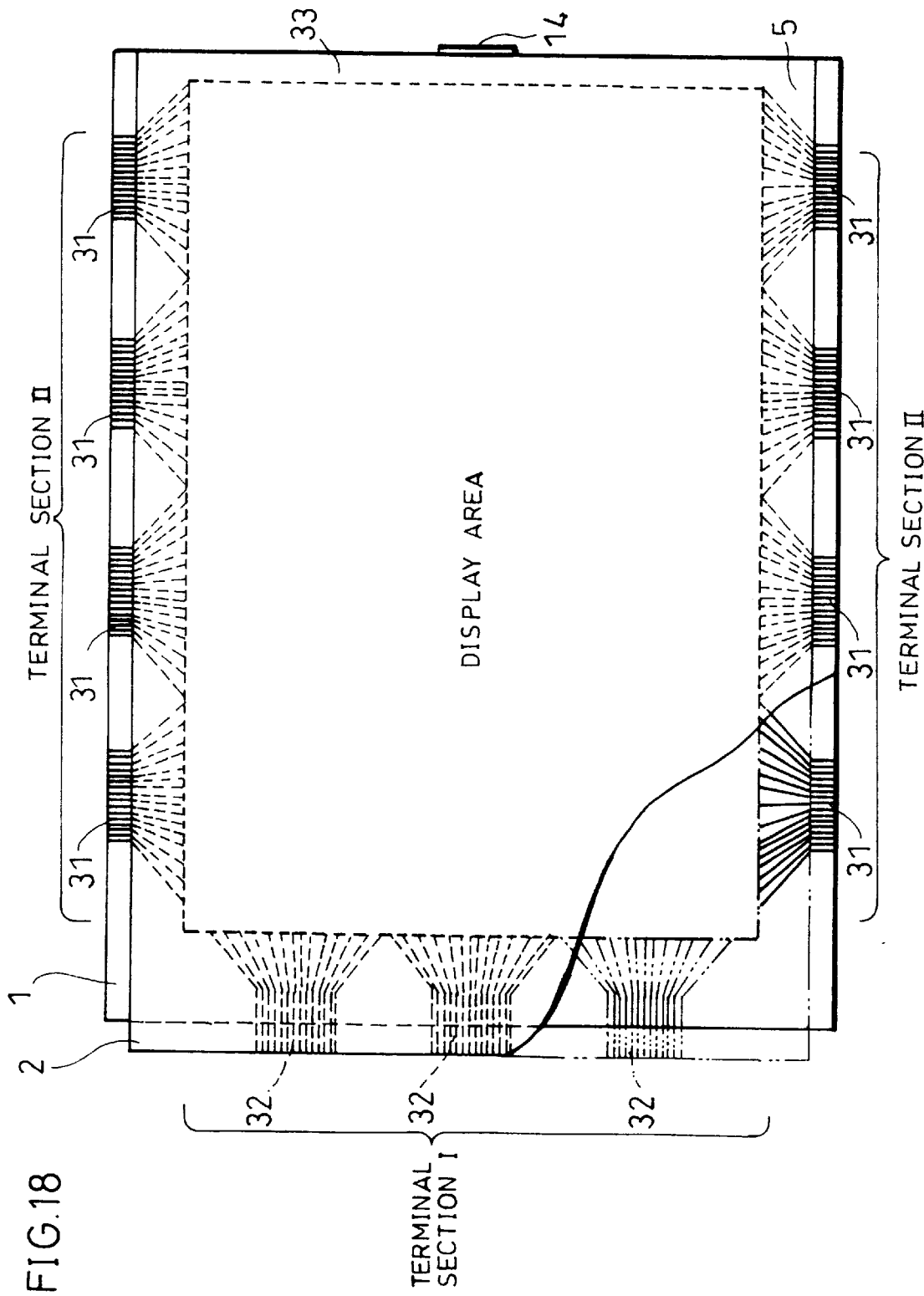
FIG. 18 is a view schematically showing a structure of the liquid crystal display device in accordance with other embodiments of the present invention.

As shown in FIG. 18, the liquid crystal display device in accordance with the present embodiment includes scanning electrode sinuous sections 32, signal electrode sinuous sections 31, and a liquid crystal sealing opening side electrode section 33 in replace of the scanning electrode sinuous sections 16, the signal electrode sinuous sections 15 and the liquid crystal sealing opening side electrode 17 adopted in the liquid crystal display device of the first embodiment.

Figure 19:
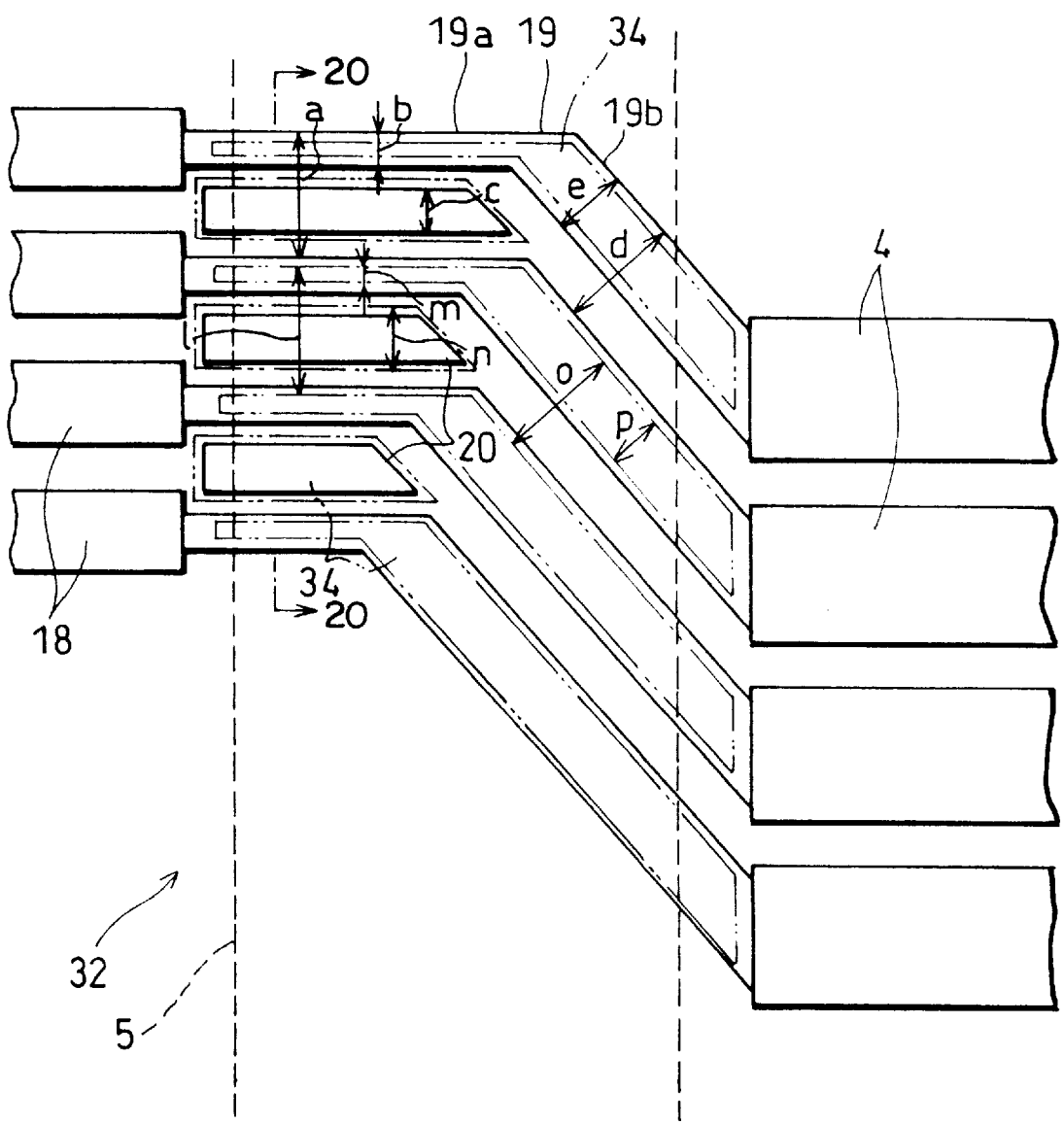
FIG. 19 is an enlarged view showing essential parts of the scanning electrode sinuous section provided in the liquid crystal display device shown in FIG. 18.
Figure 20:
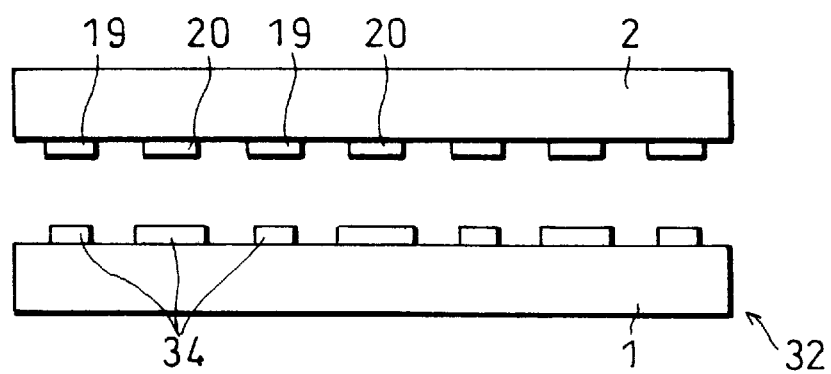
FIG. 20 is a perspective cross-sectional view taken on line D—D of the scanning electrode sinuous section shown in FIG. 19.

As shown in FIG. 19 and FIG. 20, the scanning electrode sinuous section 32 is arranged such that the double dummy electrode 34 is formed on the signal electrode substrate 1 so as to face the sinuous electrode 19 and the between-electrodes dummy electrode 20 in such a manner that the portion facing the sinuous section 19 has a smaller line width by a predetermined value, and the portion facing the between-electrodes dummy electrode 20 has a larger line width by a predetermined value.

Figure 21:
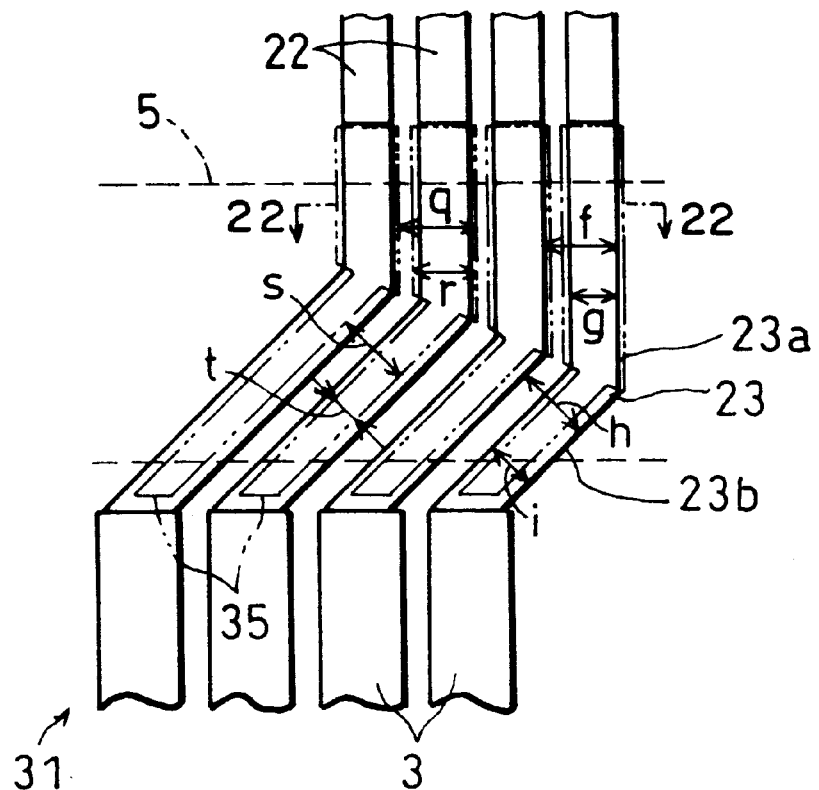
FIG. 21 is an enlarged view showing essential parts of the scanning electrode sinuous section shown in FIG. 18.
Figure 22:
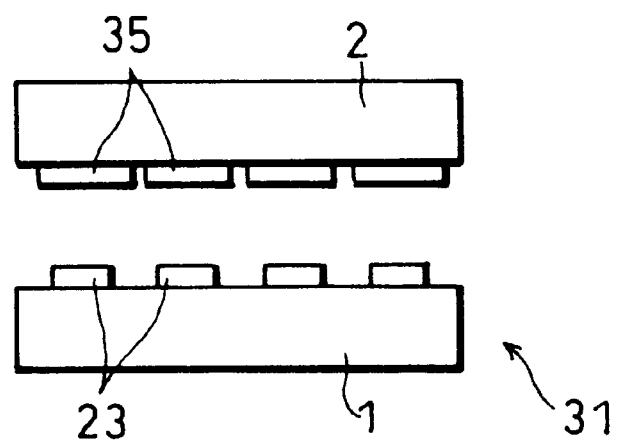
FIG. 22 is a perspective cross-sectional view take on line E—E of the signal electrode sinuous section shown in FIG. 21.

On the other hand, as shown in FIG. 21 and FIG. 22, the signal electrode sinuous section 31 is arranged such that double dummy electrodes 35 are formed on the signal electrode substrate 2 so as to face the sinuous electrodes 23 so as to have a smaller line width than that of the sinuous electrode 23 by a predetermined value.

Figure 23:
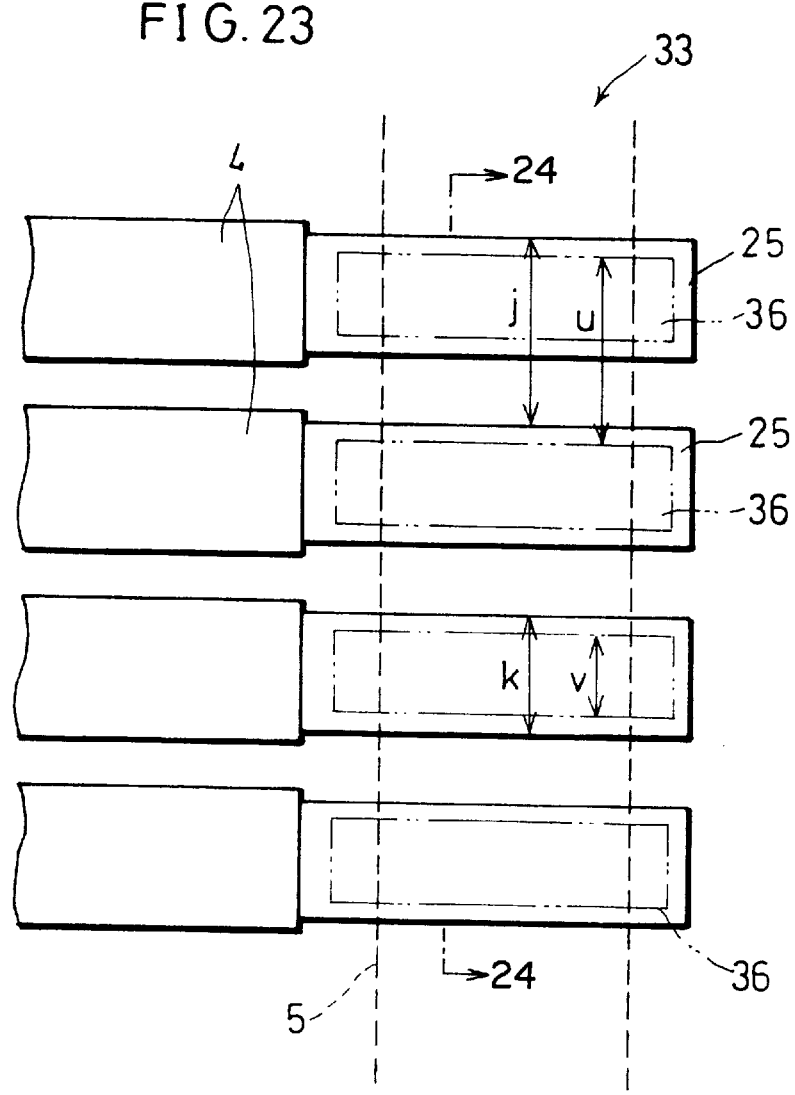
FIG. 23 is an enlarged view showing essential parts of the liquid crystal sealing opening side electrode section provided in the liquid crystal display device shown in FIG. 18.
Figure 24:
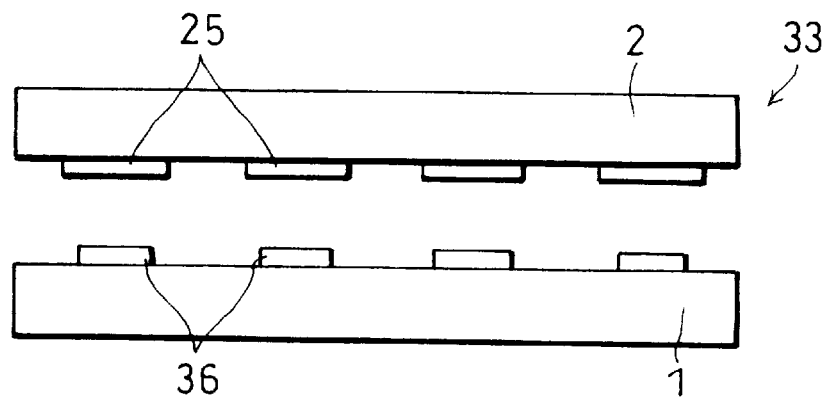
FIG. 24 is a perspective cross-sectional view taken on line F—F of the liquid crystal sealing opening side electrode section shown in FIG. 23.

Furthermore, as shown in FIG. 23 and FIG. 24, the liquid crystal sealing opening side electrode 33 is arranged such that the line width of the double dummy electrodes 36 formed on the signal electrode substrate 1 so as to face the extended electrode 25 are smaller than the line width of the extended electrode 36 by a predetermined value.

The arrangement of the present embodiment differs from that of the first embodiment in that the line width of the double dummy electrode differs from the line width of the counter electrode. Namely, the sinuous electrode 19, the sinuous electrode 23, and the extended electrode 25 which serve as the display-use electrode have different line width from that of the double dummy electrodes 34, 35 and 36 which serve as the between-electrodes dummy electrode 20.

This is to have the wiring resistance of the electrode wiring section, the interleaved ratio and the overlapped ratio in respective predetermined ranges. By selecting the double dummy electrodes to have slightly different line width from that of respective counter electrodes, even if upper and lower substrates are slightly displaced when connecting them together, the effects as achieved by providing the dummy electrodes do not change. Such difference in line width creates a margin when laminating the upper and lower substrates. As a result, a slight displacement occurred when laminating the upper and lower substrates can be absorbed, thereby achieving an improved yield of the liquid crystal display device.

Additionally, the predetermined value is not particularly limited, and can be selected as desired as long as the margin can be ensured, in consideration of the interleaved ratio and the overlapped ratio of the display-use electrode and the dummy electrode in the seal 5.

In the present embodiment, by arranging the display-use electrodes and the dummy electrodes so as to have variations in the interleaved ratio and the overlapped ratio of the display-use electrodes and the dummy electrodes in the four sides in the seal 5 to be not more than a predetermined value, a uniform thickness of the liquid crystal layer 9 can be achieved in a vicinity of the seal 5. As a result, as the variations in the circumstance portion in a vicinity of the seal 5 can be eliminated, thereby achieving an improved display quality.

With respect to the scanning electrode sinuous section 32, the signal electrode sinuous section 31 and the liquid crystal sealing opening side electrode section 33, the interleaved ratio and the overlapped ratio of the display-use electrodes and the dummy electrodes in the seal 5 will be explained in detail.

First, explanations will be given through the case where variations in only the interleaved ratio in four sides of the seal 5 are made substantially uniform in the liquid crystal display device having the arrangement shown in FIG. 18. For convenience in explanations, the same legends are used for the electrode pitch and the line width as those used in the first embodiment.

In this example, explanations will be given on variations in the interleaved ratio of the display-use electrodes and the dummy electrodes in the seal 5 with respect to the first electrode sinuous sections 31, the scanning electrode sinuous sections 32 and the liquid crystal sealing opening side electrode section 33. Here, the interleaved ratio is defined to be a ratio of an area occupied by the electrodes in the seal 5. However, for the simplification of the design, the interleaved ratio is defined to be the "line width of the electrode/electrode pitch" in this example, as well as in the following embodiments. Further, based on the above-defined interleaved ratio, the signal electrode sinuous sections 15, the scanning electrode sinuous sections 31, the scanning electrode sinuous sections 32 and the liquid crystal sealing opening side electrode section 33 are designed.

First, in this case of the scanning electrode sinuous section 32, as shown in FIG. 19 and FIG. 20, the sinuous electrode 19 is designed so as to have an electrode pitch a of the linear line 19a of 0.2000 mm, a line width b of the linear section 19a of 0.0636 mm, a line width c of the between-electrodes dummy electrode 20 of 0.0936 mm, an electrode pitch d of the inclined section 19b of 0.1559 mm, and a line width e of the inclined section 19b of 0.1226, and the double dummy electrode 34 is designed so as to have an electrode pitch l corresponding to the linear section 19a of the sinuous electrode 19 of 0.2000 mm, a line width m corresponding to the linear section 19a of 0.0436 mm, a line width n corresponding to the between-electrodes dummy electrode 20 of 0.0575 mm, the electrode pitch o corresponding to the inclined section 19b of the sinuous electrode 19 of 0.1559 mm, and a line width p corresponding to the inclined section 19b of 0.0788 mm.

Next, in the case of the signal electrode sinuous section 31, as shown in FIG. 21 and FIG. 22, the sinuous electrode 23 is designed so as to have an electrode pitch f of the linear section 23a of 0.0710 mm, a line width g of the liner section 23a of 0.0559 mm, an electrode pitch h of the inclined section 23b of 0.0707 mm, and a line width i of the inclined section 23b of 0.0557 mm, and a double dummy electrode 35 is designed so as to have an electrode pitch q corresponding to the linear section 23a of the sinuous electrode 23 of 0.0710 mm, a line width r corresponding to the linear section 29a of 0.0359 mm, the electrode pitch s corresponding to the inclined section 23b of the sinuous electrode 23 of 0.0707 mm, and a line width t of the double dummy electrode 35 corresponding to the inclined section 23b of 0.0357 mm.

Lastly, in the case of the liquid crystal sealing opening side electrode section 33, as shown in FIG. 23 and FIG. 24, the extended electrode 25 is designed so as to have an electrode pitch k of 0.2970 mm, and a line width j of the extended electrode 25 of 0.2335 mm, and the double dummy electrode 36 is designed so as to have an electrode pitch u of 0.2970 mm, and a line width v of the double dummy electrode 36 of 0.1501 mm. Here, the line width of the scanning electrode 4 is selected to be 0.279 mm.

In the liquid crystal display device shown in FIG. 18 including the signal electrode sinuous sections 31, the scanning electrode sinuous sections 32 and the liquid crystal sealing opening side electrode section 33 having the described arrangement, the interleaved ratio of the display-use electrode and the dummy electrode is as shown in Table 3.

TABLE 3

|  |  | DISPLAY-USE ELECTRODE · BETWEEN-LINES ELECTRODE · EXTENDED ELECTRODE |  |
|---|---|---|---|
| TERMINAL SECTION I | LINEAR SECTION | 0.0636/0.2000*100 = 31.800% (DISPLAY-USE ELECTRODE) + 0.0936/0.2000*100 = 46.800% (BETWEEN-LINES DUMMY ELECTRODE) = 78.600% |  |
|  | INCLINED SECTION | 0.1226/0.1559*100 = 78.640% (DISPLAY-USE ELECTRODE) |  |
| TERMINAL SECTION II | LINEAR SECTION | 0.0559/0.0710*100 = 78.732% (DISPLAY-USE ELECTRODE) |  |
|  | INCLINED SECTION | 0.0557/0.0707*100 = 78.784% (DISPLAY-USE ELECTRODE) |  |
| INJECTION OPENING |  | 0.2335/0.2970*100 = 78.620% (EXTENDED ELECTRODE) |  |
|  |  | DOUBLE DUMMY ELECTRODE | INTERLEAVED RATIO |
| TERMINAL SECTION I | LINEAR SECTION | 0.0436/0.2000*100 = 21.800% + 0.0575/0.2000*100 = 28.750% = 50.550% | 129.150% |
|  | INCLINED SECTION | 0.0788/0.1559*100 = 50.545% | 129.185% |
| TERMINAL SECTION II | LINEAR SECTION | 0.0359/0.0710*100 = 50.563% | 129.295% |
|  | INCLINED SECTION | 0.0357/0.0707*100 = 50.495% | 129.297% |
| INJECTION OPENING |  | 0.1501/0.2970*100 = 50.593% | 129.159% |

The injection opening corresponds to the liquid crystal sealing opening side electrode section 33.

As can be seen from Table 3, the interleaved ratio of the display-use electrodes and the dummy electrodes on the seal 5 in the sides of the circumference portion of the display area of the liquid crystal display device are substantially uniform. In this case, the interleaved ratio indicates a sum of the interleaved ratio of the display-use electrodes and the between-electrodes dummy electrode and the interleaved ratio of the double dummy electrodes. Here, it is designed so as to have a uniform wiring resistance of the display-use electrodes in the four sides.

Then, an STN-type color liquid crystal display device is prepared using the signal electrode substrate 1 and the scanning electrode substrate 2 having the described display-use electrodes and the dummy electrodes. The resulting STN-type color liquid crystal display device show a uniform brightness in the four sides of the circumference portion of the display area. Furthermore, by adjusting the diameter of the within-seal spacer 7 contained in the seal 5, the brightness in a vicinity of the seal 5 in the display area in the four sides can be all adjusted to the brightness of the central portion of the display area.

Moreover, the interleaved ratio of the dummy electrodes provided in spaces on the seal 5 between the signal electrode sinuous sections 31 and between the scanning electrode sinuous sections 32 in the terminal sections I and II are adjusted to be uniform in four sides in accordance with the interleaved ratio of the display-use electrodes and the dummy electrodes of the signal electrode sinuous sections 31 and the scanning electrode sinuous sections 32, and the interleaved ratio of the dummy electrodes of the liquid crystal sealing opening side electrode section 33.

The interleaved ratio shows the value on design, and, in practice, when connecting the signal electrode substrate 1 and the scanning electrode substrate 2 together, the interleaved ratio of the display-use electrodes and the dummy electrodes may vary during the manufacturing process, such as etching, etc.

In the present embodiment, the interleaved ratio of the display-use electrodes and the dummy electrodes is measured after the liquid crystal display device has been manufactured. The above measurement is performed with respect to three liquid crystal display devices prepared under conditions shown in Table 3 respectively. The results of the measurement are as shown in Tables 4–6.

TABLE 4

|  |  | DISPLAY-USE ELECTRODE · BETWEEN-LINES ELECTRODE · EXTENDED ELECTRODE |
|---|---|---|
| TERMINAL SECTION I | LINEAR SECTION | 0.0667/0.2011*100 = 33.2% (DISPLAY-USE ELECTRODE) + 0.0966/0.2011*100 = 48.0% (BETWEEN-LINES DUMMY ELECTRODE) = 81.2% |
|  | INCLINED SECTION | 0.1220/0.1576*100 = 77.4% (DISPLAY-USE ELECTRODE) |
| TERMINAL SECTION II | LINEAR SECTION | 0.0540/0.0690*100 = 78.3% (DISPLAY-USE ELECTRODE) |
|  | INCLINED SECTION | 0.0544/0.0697*100 = 78.0% (DISPLAY-USE ELECTRODE) |

TABLE 4-continued

| | | | |
|---|---|---|---|
| INJECTION OPENING | | 0.2349/0.2993*100 = 78.5% (EXTENDED ELECTRODE) | |

| | | DOUBLE DUMMY ELECTRODE | INTERLEAVED RATIO |
|---|---|---|---|
| TERMINAL SECTION I | LINEAR SECTION | 0.0430/0.2005*100 = 21.4% +<br>0.0565/0.2005*100 = 28.2% = 49.6% | 130.8% |
| | INCLINED SECTION | 0.0747/0.1540*100 = 48.5% | 125.9% |
| TERMINAL SECTION II | LINEAR SECTION | 0.0377/0.0725*100 = 52.0% | 130.3% |
| | INCLINED SECTION | 0.0377/0.0708*100 = 53.2% | 131.2% |
| INJECTION OPENING | | 0.1510/0.3002*100 = 50.3% | 128.8% |

The injection opening corresponds to the liquid crystal sealing opening side electrode section 33.

TABLE 5

| | | DISPLAY-USE ELECTRODE · BETWEEN-LINES ELECTRODE · EXTENDED ELECTRODE |
|---|---|---|
| TERMINAL SECTION I | LINEAR SECTION | 0.0628/0.2011*100 = 31.2% (DISPLAY-USE ELECTRODE) +<br>0.0934/0.2011*100 = 46.4%<br>(BETWEEN-LINES DUMMY ELECTRODE) = 77.6% |
| | INCLINED SECTION | 0.1223/0.1564*100 = 78.2% (DISPLAY-USE ELECTRODE) |
| TERMINAL SECTION II | LINEAR SECTION | 0.0551/0.0707*100 = 77.9% (DISPLAY-USE ELECTRODE) |
| | INCLINED SECTION | 0.0538/0.0702*100 = 76.6% (DISPLAY-USE ELECTRODE) |
| INJECTION OPENING | | 0.2320/0.2991*100 = 77.6 % (EXTENDED ELECTRODE) |

| | | DOUBLE DUMMY ELECTRODE | INTERLEAVED RATIO |
|---|---|---|---|
| TERMINAL SECTION I | LINEAR SECTION | 0.0436/0.2022*100 = 21.6% +<br>0.0583/0.2022*100 = 28.8% = 50.4% | 128.0% |
| | INCLINED SECTION | 0.0791/0.1591*100 = 49.7% | 127.9% |
| TERMINAL SECTION II | LINEAR SECTION | 0.0354/0.0696*100 = 50.9% | 128.8% |
| | INCLINED SECTION | 0.0345/0.0692*100 = 49.9% | 126.5% |
| INJECTION OPENING | | 0.1522/0.2991*100 = 50.9% | 128.5% |

The injection opening corresponds to the liquid crystal sealing opening side electrode section 33.

TABLE 6

| | | DISPLAY-USE ELECTRODE · BETWEEN-LINES ELECTRODE · EXTENDED ELECTRODE |
|---|---|---|
| TERMINAL SECTION I | LINEAR SECTION | 0.0625/0.2015*100 = 31.0% (DISPLAY-USE ELECTRODE) +<br>0.0923/0.2015*100 = 45.8%<br>(BETWEEN-LINES DUMMY ELECTRODE) = 76.8% |
| | INCLINED SECTION | 0.1223/0.1549*100 = 79.0% (DISPLAY-USE ELECTRODE) |
| TERMINAL SECTION II | LINEAR SECTION | 0.0544/0.0701*100 = 77.6% (DISPLAY-USE ELECTRODE) |
| | INCLINED SECTION | 0.0544/0.0708*100 = 76.8% (DISPLAY-USE ELECTRODE) |
| INJECTION OPENING | | 0.2327/0.2979*100 = 78.1% (EXTENDED ELECTRODE) |

TABLE 6-continued

|  |  | DOUBLE DUMMY ELECTRODE | INTERLEAVED RATIO |
| --- | --- | --- | --- |
| TERMINAL SECTION I | LINEAR SECTION | 0.0412/0.2023*100 = 20.4% + 0.0552/0.2023*100 = 27.3% = 47.7% | 124.5% |
|  | INCLINED SECTION | 0.0757/0.1549*100 = 48.9% | 127.9% |
| TERMINAL SECTION II | LINEAR SECTION | 0.0341/0.0708*100 = 48.2% | 128.8% |
|  | INCLINED SECTION | 0.0344/0.0692*100 = 49.7% | 126.5% |
| INJECTION OPENING |  | 0.1490/0.2968*100 = 50.2% | 128.3% |

The injection opening corresponds to the liquid crystal sealing opening side electrode section 33.

As can be seen from Tables 4–6, the liquid crystal display device shows greater variations in the interleaved ratio of the display-use electrode and the dummy electrode in the four sides compared with those of the liquid crystal display device prepared under the conditions shown in Table 3. However, the variations in the interleaved ratio in the display area shown in Tables 4–6 cause a difference in brightness but within a permissible level. Namely, in the liquid crystal display device prepared based on the conditions of the design shown in Table 3, although variations occur in the interleaved ratio of the display-use electrodes and the dummy electrodes in the four sides of the seal 5, variations in brightness in a vicinity of the central portion of the display area and a portion in a vicinity of the seal 5 can be reduced within a permissible range.

Here, the closer is the variations in the interleaved ratio in the four sides of the seal 5 to 0%, the better is the display quality. However, from the results shown in Tables 4–6, as long as the variations in the interleaved ratio in the four sides of the seal 5 are within a range of ±5%, the display quality of a desirable level can be achieved. Further, if the variations in the interleaved ratio is within a range of ±3%, a still improved display quality can be achieved, and if the display quality can be suppressed within a range of ±1%, a high quality display without a difference in variations in thickness in the four sides can be achieved.

Therefore, in the described arrangement of the present embodiment, it is desirable that a predetermined value for the variations in the interleaved ratio in the four sides is within a range of ±5%, and more preferably within a range of ±1%. Further, by setting the predetermined value in the described range, the variations in the absolute value indicative of the interleaved ratio can be suppressed below the predetermined value, thereby achieving a substantially uniform thickness of the seal 5 in the four sides.

As described, the variations in the interleaved ratio are determined by the manufacturing process including the etching process, etc. Therefore, by improving the etching precision when forming members including the display-use electrodes, the dummy electrodes, etc., to reduce the variations caused by the etching process, it becomes possible to reduce the variations to almost 0%, and a still improved display quality can be achieved.

Next, explanations will be given through the case where the interleaved ratio and the overlapped ratio are made substantially uniform in four sides of the seal 5 will be explained with respect to the liquid crystal display device having the arrangement shown in FIG. 18.

As described, the interleaved ratio is defined to be the ratio of the area occupied by the electrodes in the seal 5. The overlapped ratio is defined to be the ratio of the overlapped area S of the two electrodes which oppose to each other as shown in FIG. 15.

In this example, the interleaved ratio and the overlapped ratio of the display-use electrodes and the dummy electrodes in the seal 5 will be explained with respect to the scanning electrode sinuous sections 32, the signal electrode sinuous sections 31 and the liquid crystal sealing opening side electrode section 33. For the simplification of the design, the interleaved ratio is defined to be the "line width of the electrode/electrode pitch" in this example, as well as in the following embodiments. Further, based on the above-defined interleaved ratio and the overlapped ratio, the signal electrode sinuous section 32, the scanning electrode sinuous section 31 and the liquid crystal sealing opening side electrode section 33 are designed.

In respective electrode sinuous section, the double dummy electrodes are formed on the substrates which face each other so as to be overlapped with the electrode sinuous section. Furthermore, the dummy electrodes are formed in the terminal groups of the terminal sections I and II in order to achieve the constant interleaved ratio and the overlapped ratio.

The arrangement of the present embodiment differs from that of the first embodiment in that the line width of the double dummy electrode differs from the line width of the counter electrode in order to achieve the wiring resistance of the electrode section, the interleaved ratio and the overlapped ratio within the predetermined ranges.

Then, as shown in FIG. 11, the terminal section II has connection terminals three times as many as that of the terminal section I. Then, the width of the display-use electrode extending from the terminal section II is around ⅓ of the width of the display-use electrode extending from the terminal section I, and the sinuous electrode 31 of the terminal section II is formed so as to have a smaller pitch than that of the terminal section I. Therefore, although the between electrode dummy electrodes 20 are formed between the sinuous electrodes 19 of the scanning electrode sinuous sections 32 of the terminal section II, the electrode dummy electrodes are not formed between the sinuous electrodes 23 of the signal electrode sinuous section 31 of the terminal section II.

Additionally, in the liquid crystal sealing opening side electrode 33, the electrode width of the display-use electrode and the dummy electrode in the portion where the seal 5 is formed is made narrower so as to have substantially the same interleaved ratio of the electrodes in the seal 5 as those in the other sides.

First, in the case of the scanning electrode sinuous section 32, as shown in FIG. 19 and FIG. 20, the sinuous electrode 19 is designed so as to have an electrode pitch a of the linear section 19a of 0.1800 mm, a line width c of the between-electrodes dummy electrode 20 of 0.0536 mm, an electrode pitch d of the inclined section 19b of 0.1520 mm, and a line width e of the inclined section 19b of 0.1320 mm, and the double dummy electrode 34 is designed so as to have an electrode pitch 1 corresponding to the linear section 19a of 0.1800 mm, a line width m of the corresponding linear section 19a of 0.1800 mm, a line width m of the corresponding linear section 19a of 0.0492 mm, a line width n of the corresponding between-electrodes dummy electrode 20 of 0.0700 mm, an electrode pitch c corresponding to the inclined section 19b of the sinuous electrode 19 of 0.1520 mm, and a line width p of the corresponding inclined section 19b of 0.0869 mm.

Next, in the case of the signal electrode sinuous section 31, as shown in FIG. 21 and FIG. 22, the sinuous electrode 23 is designed so as to have an electrode pitch f of the linear section 23a of 0.700 mm, a line width g of the linear section 23a of 0.0400 mm, an electrode pitch h of the inclined section 23b of 0.0642 mm, and a line width i of the inclined section 23b of 0.0492 mm, and the double dummy electrode 35 is designed so as to have an electrode pitch q corresponding to the linear section 23a of the sinuous electrode 23 of 0.0700 mm, a line width r corresponding to the linear section 29a of 0.0536 mm, an electrode pitch s corresponding to the inclined section 23b of the sinuous electrode 23 of 0.0642 mm, a line width t corresponding to the inclined section 23b of 0.0367 mm.

Lastly, in the case of the liquid crystal sealing opening side electrode section 33, as shown in FIG. 23 and FIG. 24, the extended electrode is designed so as to have an electrode pitch j of 0.2400 mm, a line width k of 0.2084 mm, and the double dummy electrode 36 is designed so as to have an electrode pitch u of 0.2400 mm, and a line width v of 0.1371 mm.

In the liquid crystal display device shown in FIG. 18 including the scanning electrode sinuous sections 32, the signal electrode sinuous sections 31 and the liquid crystal sealing opening side electrode section 33 having the described arrangement, the interleaved ratio and the overlapped ratio of the display-use electrodes and the dummy electrodes are as shown in Table 7.

TABLE 7

| | | DISPLAY-USE ELECTRODE · BETWEEN-LINES ELECTRODE · EXTENDED ELECTRODE |
|---|---|---|
| TERMINAL SECTION I | LINEAR SECTION | 0.0864/0.1800*100 = 47.990% (DISPLAY-USE ELECTRODE) + 0.0536/0.1800*100 = 29.780% (BETWEEN-LINES DUMMY ELECTRODE) = 77.770% |
| | INCLINED SECTION | 0.1320/0.1520*100 = 86.840% (DISPLAY-USE ELECTRODE) |
| TERMINAL SECTION II | LINEAR SECTION | 0.0400/0.0700*100 = 57.140% (DISPLAY-USE ELECTRODE) |
| | INCLINED SECTION | 0.0492/0.0642*100 = 76.640% (DISPLAY-USE ELECTRODE) |
| INJECTION OPENING | | 0.2084/0.2400*100 = 86.840% (EXTENDED ELECTRODE) |

| | | DOUBLE DUMMY ELECTRODE | INTERLEAVED RATIO | OVERLAPPED RATIO |
|---|---|---|---|---|
| TERMINAL SECTION I | LINEAR SECTION | 0.0492/0.1800*100 = 27.360% (DISPLAY-USE ELECTRODE) + 0.0700/0.1800*100 = 38.850 (BETWEEN-LINES DUMMY ELECTRODE) = 66.210% | 143.980% | 27.360% + 29.780% = 57.140% |
| | INCLINED SECTION | 0.0869/0.1520*100 = 57.140% | 143.980% | 57.140% |
| TERMINAL SECTION II | LINEAR SECTION | 0.0536/0.0700*100 = 76.640% | 133.780% | 57.140% |
| | INCLINED SECTION | 0.0367/0.0642*100 = 57.140% | 133.780% | 57.140% |
| INJECTION OPENING | | 0.1371/0.2400*100 = 57.140% | 143.980% | 57.140% |

The injection opening corresponds to the liquid crystal sealing opening side electrode section 33.

As can be seen from Table 7, the interleaved ratio and the overlapped ratio of the display-use electrodes and the dummy electrodes on the seal 5 in sides of the circumference section of the display area of the liquid crystal display device are substantially uniform. In this case, the interleaved ratio indicates the sum of the interleaved ratio of the display-use electrodes and the between-electrodes dummy electrodes, and the interleaved ratio of the double dummy electrodes. Here, it is designed so as to have a uniform wiring resistance of the display-use electrode in the four sides.

Then, an STN-type color liquid crystal display device is prepared using the signal electrode substrate 1 and the scanning electrode substrate 2 having the display-use electrodes and the dummy electrodes respectively. The resulting STN-type color liquid crystal display device shows a uniform brightness in four sides along the circumference portion of the display area. Furthermore, by adjusting the diameter of the glass beads contained in the within seal spacer 7 in the seal 5, the brightness in a vicinity of the seal 5 of the display area in the four sides can be adjusted to the brightness of the central portion of the display area.

Moreover, the interleaved ratio and the overlapped ratio of the dummy electrodes provided in a space on the seal 5 between the scanning electrode sinuous sections 32 and the signal electrode sinuous sections 31 are adjusted to be uniform in the four sides in accordance with the interleaved ratio and the overlapped ratio of the display-use electrodes and the dummy electrodes in the scanning electrode sinuous section 32 and the signal electrode sinuous section 31, as well as the interleaved ratio and the overlapped ratio of the display-use electrodes and the dummy electrodes of the liquid crystal sealing opening side electrode 43.

Here, the interleaved ratio shows the value on design, and, in practice, when laminating the signal electrode substrate 1 and the scanning electrode substrate 2, the interleaved ratio of the display-use electrodes 1 and the dummy electrodes 2 may slightly vary during the manufacturing process including the etching process, etc.

In the present embodiment, the interleaved ratio and the overlapped ratio of the display-use electrodes and the dummy electrodes are measured after the liquid crystal display device has been manufactured. The above measurement is performed with respect to two liquid crystal display devices prepared under conditions shown in Table 2 respectively. The results of measurement are as shown in Tables 8 and 9.

TABLE 8

| | | DISPLAY-USE ELECTRODE · BETWEEN-LINES ELECTRODE · EXTENDED ELECTRODE |
|---|---|---|
| TERMINAL SECTION I | LINEAR SECTION | 0.0895/0.1811*100 = 47.764% (DISPLAY-USE ELECTRODE) + 0.0566/0.1811*100 = 31.253% (BETWEEN-LINES DUMMY ELECTRODE) = 79.017% |
| | INCLINED SECTION | 0.1326/0.1537*100 = 86.272% (DISPLAY-USE ELECTRODE) |
| TERMINAL SECTION II | LINEAR SECTION | 0.0419/0.0720*100 = 58.194% (DISPLAY-USE ELECTRODE) |
| | INCLINED SECTION | 0.0469/0.0632*100 = 74.209% (DISPLAY-USE ELECTRODE) |
| INJECTION OPENING | | 0.2098/0.2423*100 = 86.587% (EXTENDED ELECTRODE) |

| | | DOUBLE DUMMY ELECTRODE | INTER-LEAVED RATIO | OVER-LAPPED RATIO |
|---|---|---|---|---|
| TERMINAL SECTION I | LINEAR SECTION | 0.0498/0.1805*100 = 25.928% + 0.0710/0.1805*100 = 39.335% = 65.263% | 144.280% | 25.928% + 31.253% = 57.181% |
| | INCLINED SECTION | 0.0828/0.1501*100 = 55.163% | 141.435% | 55.163% |
| TERMINAL SECTION II | LINEAR SECTION | 0.0554/0.0715*100 = 77.483% | 135.677% | 60.187% |
| | INCLINED SECTION | 0.0387/0.0643*100 = 60.187% | 134.396% | 57.187% |
| INJECTION OPENING | | 0.1380/0.2432*100 = 56.743% | 143.330% | 56.743% |

The injection opening corresponds to the liquid crystal sealing opening side electrode section 33.

TABLE 9

| | | DISPLAY-USE ELECTRODE · BETWEEN-LINES ELECTRODE · EXTENDED ELECTRODE |
|---|---|---|
| TERMINAL SECTION I | LINEAR SECTION | 0.0856/0.1811*100 = 47.267% (DISPLAY-USE ELECTRODE) + 0.0534/0.1811*100 = 29.486% (BETWEEN-LINE DUMMY ELECTRODE) = 76.753% |
| | INCLINED SECTION | 0.1317/0.1525*100 = 86.361% (DISPLAY-USE ELECTRODE) |
| TERMINAL SECTION II | LINEAR SECTION | 0.0392/0.0697*100 = 56.241% (DISPLAY-USE ELECTRODE) |
| | INCLINED SECTION | 0.0473/0.0637*100 = 74.254% (DISPLAY-USE ELECTRODE) |
| INJECTION OPENING | | 0.2069/0.2421*100 = 85.461% (EXTENDED ELECTRODE) |

| | | DOUBLE DUMMY ELECTRODE | INTER-LEAVED RATIO | OVER-LAPPED RATIO |
|---|---|---|---|---|
| TERMINAL | LINEAR | 0.0492/0.1822*100 = 27.003% + | 142.614% | 27.003% + |

TABLE 9-continued

| | | | | |
|---|---|---|---|---|
| SECTION I | SECTION | 0.0708/0.1822*100 = 38.858% = 65.861% | | 29.486% = 56.489% |
| | INCLINED SECTION | 0.0872/0.1552*100 = 56.186% | 142.547% | 56.186% |
| TERMINAL SECTION II | LINEAR SECTION | 0.0531/0.0686*100 = 77.405% | 133.646% | 57.241% |
| | INCLINED SECTION | 0.0355/0.0627*100 = 56.619% | 130.876% | 56.619% |
| INJECTION OPENING | | 0.1372/0.2421*100 = 56.671% | 142.132% | 56.671% |

The injection opening corresponds to the liquid crystal sealing opening side electrode section 33.

As can be seen from Tables 8 and 9, the liquid crystal display device shows greater variations in the overlapped ratio of the display-use electrodes and the dummy electrodes in the four sides compared with those of the liquid crystal display device prepared under the conditions shown in Table 7. However, the variations in the overlapped ratio in the four sides in the display area shown in Tables 8 and 9 cause a difference in brightness but within a permissible level. Namely, in the liquid crystal display device prepared based on the conditions shown in Table 7, although variations occur in the overlapped ratio of the display-use electrodes and the dummy electrodes in four sides oh the seal 5, variations in brightness in a vicinity of the central portion of the display area and a vicinity of the seal 5 due to the variations in the overlapped ratio can be reduced to a permissible level.

Here, the closer is the variations in the overlapped ratio in the four sides of the seal 5 to 0%, the better is the display quality. However, from the results shown in Tables 8 and 9, as long as the variations in the overlapped ratio in the four sides of the seal 5 are within a range of ±5%, a good display quality can be achieved. Further, if the variations in the overlapped ratio can be suppressed within a range of ±3%, a still improved quality can be achieved, and if the display quality can be suppressed within a range of ±1%, a high quality display without a difference in variations in the thickness in the four sides can be achieved.

For the described reason, in the arrangement of the present embodiment, it is desirable that a predetermined value indicative of variations in the interleaved ratio in the four sides is within a range of ±5%, and more preferably within a range of ±1%. By setting the predetermined value indicative of the variations in the overlapped ratio in the four sides and forming the display-use electrodes and the dummy electrodes so as to have the variations in overlapped ratio in the four sides of the seal 5 of not more than the predetermined value, the display-use electrodes and the dummy electrodes serve as a support in the seal 5, and thus offers a substantially constant ratio of the glass beads in the within-seal spacers 6 which determine the thickness of the seal 5 in four sides. As a result, variations in the brightness in the four sides in a vicinity of the seal 5 of the display area can be suppressed, and an improved display quality can be achieved.

Furthermore, by arranging the display-use electrodes and the dummy electrodes formed in the four sides of the seal 5 so as to suppress the variations in absolute values indicative of the interleaved ratio within a range of ±10%, on the seal 5, variations in the ratio of the area where the glass beads in the within-seal spacers 6 are sandwiched between the display-use electrodes and the dummy electrodes, the area where the glass beads are sandwiched between the portion where either the display-use electrodes or the dummy electrodes exist, and the area where the glass beads are sandwiched in the portion where neither of the electrodes exist can be suppressed to be not more than a predetermined value. Therefore, a substantially uniform thickness of the seal 5 can be achieved in the four sides. As a result, variations in the brightness in the four sides in a vicinity of the seal 5 of the display area can be suppressed to be not more than the predetermined value, thereby achieving an improved display quality.

As described, variations in the interleaved ratio and the overlapped ratio are determined by the manufacturing process including the etching process, etc., as described above. Therefore, by improving the precision in the etching process when forming the display-use electrodes and the dummy electrodes and reducing variations caused by etching, the variations in the interleaved ratio and the overlapped ratio can be suppressed to almost 0%, thereby achieving a still improved display quality.

Third Embodiment

The following descriptions will explain still another embodiment of the present invention. Here, for convenience in explanations, members having the same functions as those of the aforementioned embodiments will be designated by the same reference numerals, and thus the descriptions thereof shall be omitted here.

Figure 25:
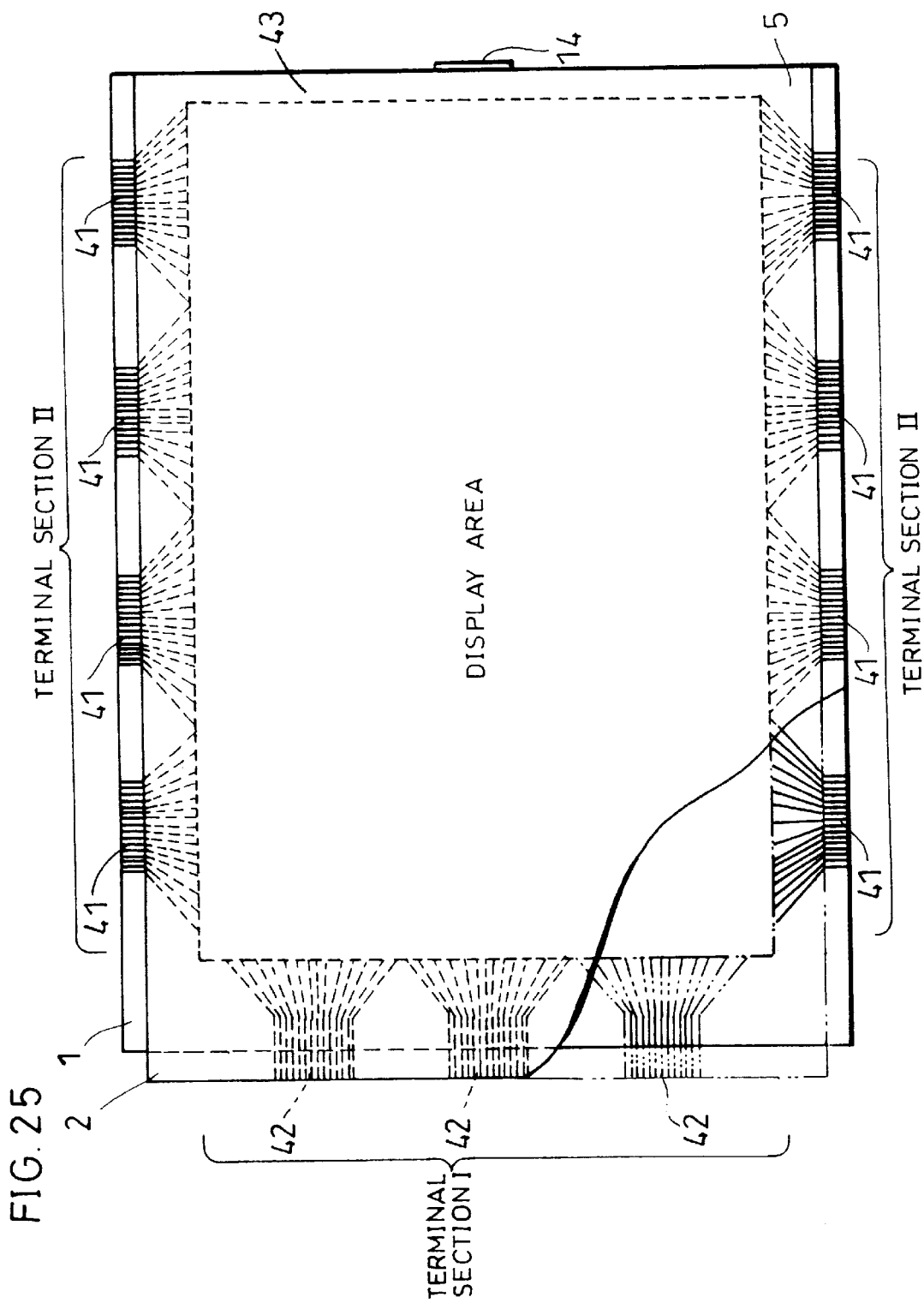
FIG. 25 is a view showing a schematic structure of the liquid crystal display device in accordance with still another embodiment of the present invention.

As shown in FIG. 25, the liquid crystal display device in accordance with the present embodiment includes signal electrode sinuous sections 41 and scanning electrode sinuous section 41 and a liquid crystal sealing opening side electrode section 43 as a sinuous section of signal electrodes 3 formed on a signal electrode substrate 1 respectively in replace of the signal electrode sinuous sections 31, the scanning electrode sinuous section 32 and the liquid crystal sealing opening side electrode section 33.

Figure 26:
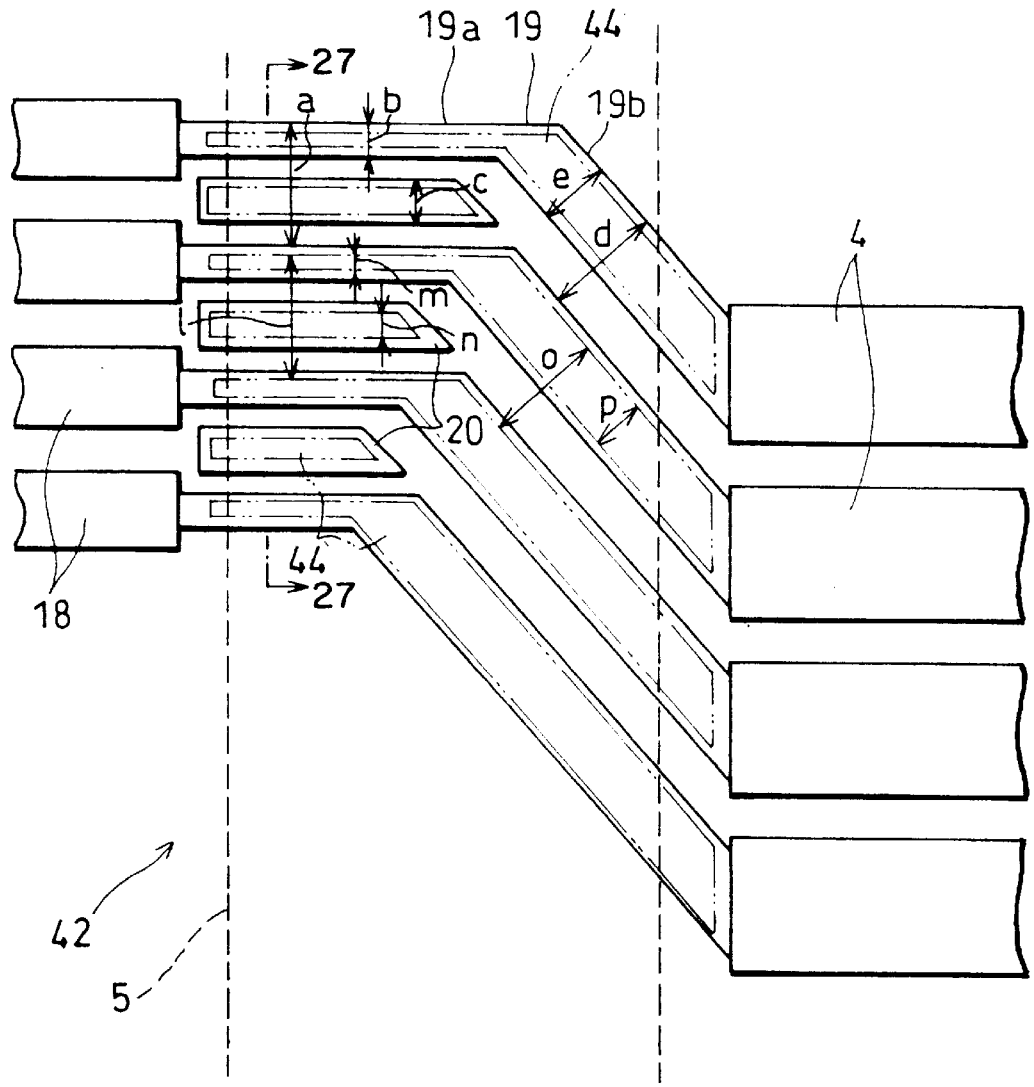
FIG. 26 is an enlarged view showing essential parts of the scanning electrode sinuous section provided in the liquid crystal display device shown in FIG. 25.
Figure 27:
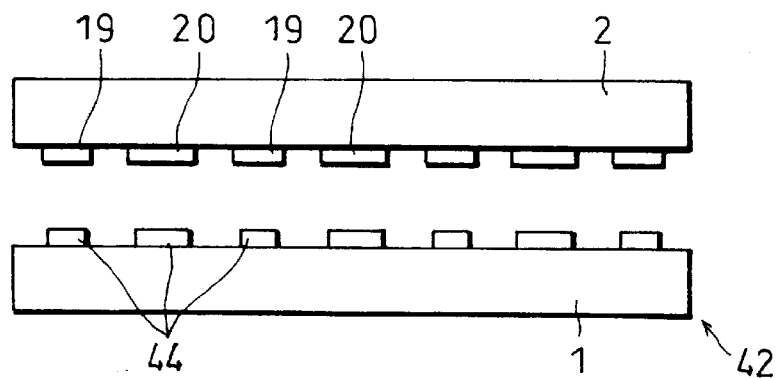
FIG. 27 is a perspective cross-sectional view taken on line G—G of the scanning electrode sinuous section shown in FIG. 26.

As shown in FIG. 26 and FIG. 27, the scanning electrode sinuous section 42 is arranged such that double dummy electrodes 44 are formed on the signal electrode substrate 1 so as to face the sinuous electrodes 19 and the between-electrodes dummy electrodes 20. The line width of each double dummy electrode 44 is formed narrower by a value both value both in the portion facing the sinuous sections 19 and the portion facing the between-electrodes dummy electrode 20.

Figure 28:
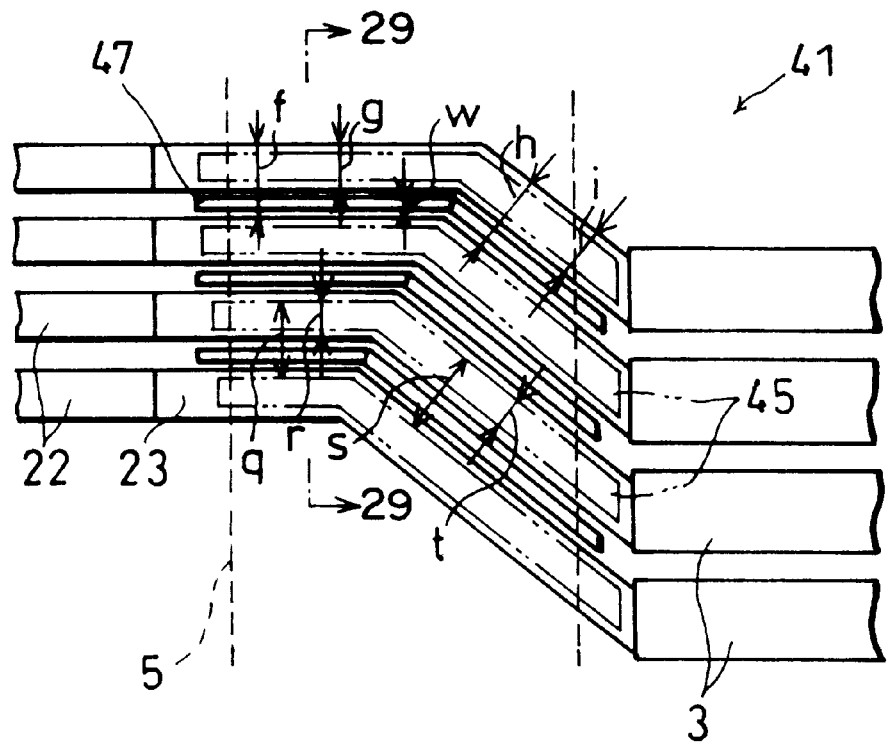
FIG. 28 is an enlarged view showing essential parts of the signal electrode sinuous section provided in the liquid crystal display device shown in FIG. 25.
Figure 29:
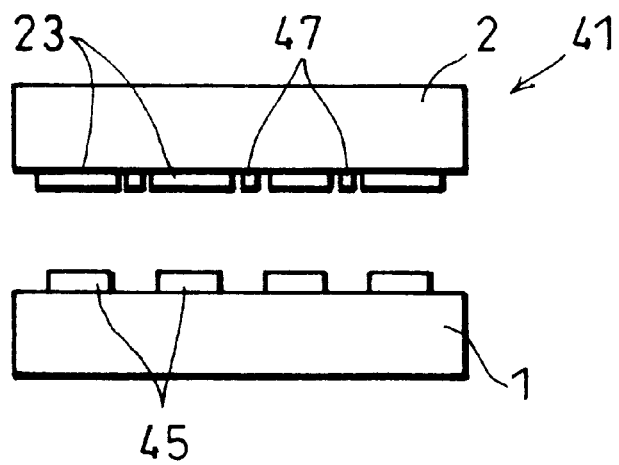
FIG. 29 is a perspective cross-sectional view taken on line H—H of the signal electrode sinuous section shown in FIG. 28.

On the other hand, as shown in FIG. 28 and FIG. 29, the signal electrode sinuous section 41 is arranged such that double dummy electrodes 45 are formed on the signal electrode substrate 2 so as to face the sinuous electrodes 23.

The line width of the double dummy electrode 45 is formed narrower by a predetermined value than that of the sinuous electrodes 23.

As described, the signal electrode sinuous section 41 basically has the same structure as the signal electrode sinuous section 31 of the second embodiment except that between-electrode dummy electrodes 47 are formed along a space between the sinuous electrodes 23 formed on the substrate 1.

The between-electrodes dummy electrode 47 is formed so as not to contact the sinuous electrodes 23 and is formed so as to have the same thickness as the sinuous electrode 23.

The line width and the length, etc., of the between-electrodes dummy electrode 47 are determined in consideration of the interleaved ratio of the display use-electrodes and the dummy electrodes in the four sides of the seal 5. Therefore, in the present embodiment, by forming the between-electrode dummy electrodes 47 between the sinuous electrodes 23, which are not included in the sinuous section 31 of the second embodiment, the line width of the display-use electrodes and the dummy electrodes, etc., in the scanning electrode sinuous section 42 shown in FIG. 26 and FIG. 27 and the liquid crystal sealing opening side electrode section 43 shown in FIG. 30 are adjusted in order to suppress the variations in the interleaved ratio of the display-use electrodes and the dummy electrodes 47 in the four sides of the seal 5.

Figure 30:
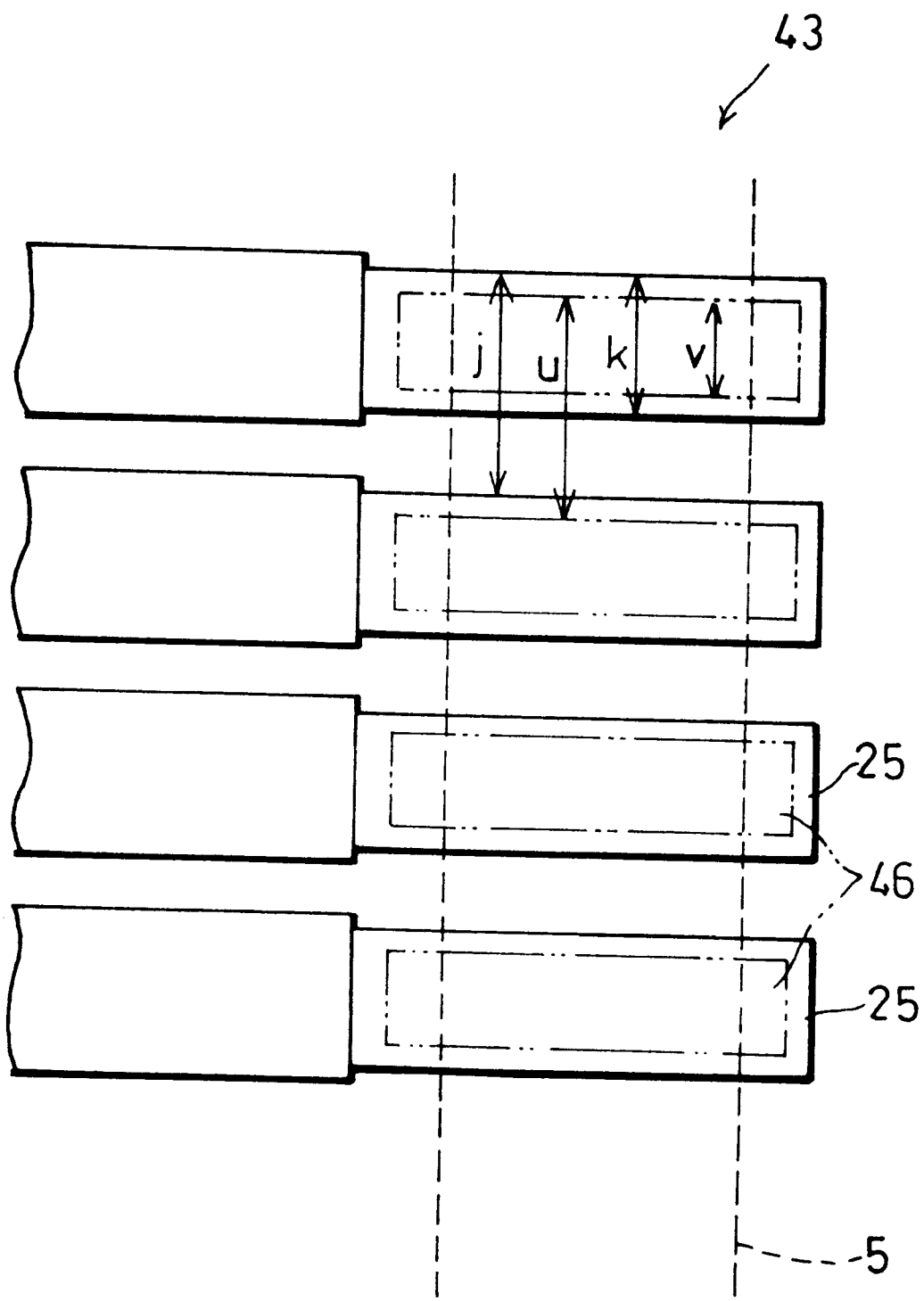
FIG. 30 is an enlarged view showing essential parts of the liquid crystal sealing opening side electrode section provided in the liquid crystal display device shown in FIG. 25.

As shown in FIG. 30, the liquid crystal sealing opening side electrode section 43 is arranged such that the line width of the double dummy electrodes 46 formed on the signal electrode substrate 1 facing the extended electrode 25 is narrower than the line width of the extended electrode 25 by a predetermined value.

As in the arrangement of the second embodiment, the arrangement of the present embodiment differs from that of the first embodiment in that the line width of the double dummy electrodes differs from the line width of the counter electrodes, in order to suppress the wiring resistance of the electrode sinuous section and the interleaved ratio and the overlapped ratio to be not more than a predetermined value.

In the present embodiment, by arranging the display-use electrodes and the dummy electrodes so as to have variations in the interleaved ratio and the overlapped ratio of the display-use electrodes and the dummy electrodes in the four sides of the seal 5 of not more than a predetermined value, the thickness of the liquid crystal layer 9 in a vicinity of the seal 5 can be made substantially uniform as achieved from the aforementioned arrangements of the first and second embodiments. As a result, variations in brightness in a vicinity of the seal 5 can be eliminated, thereby achieving an improved display quality.

The interleaved ratio and the overlapped ratio of the display-use electrodes and the dummy electrodes in the seal 5 with respect to the signal electrode sinuous sections 41, the scanning electrode sinuous sections 42 and the liquid crystal sealing opening side electrode 43 will be explained in detail.

First, explanations will be given through the case where variations in only the interleaved ratio in the four sides of the seal 5 are made substantially uniform in the liquid crystal display device having the arrangement shown in FIG. 25. For convenience in explanations, the same legends are used for the electrode pitches and the line width as those used in the first and second embodiments.

In this example, explanations will be given on variations in the interleaved ratio of the display-use electrodes and the dummy electrodes in the seal 5 with respect to the signal electrode sinuous sections 41, the scanning electrode sinuous sections 42 and the liquid crystal sealing opening side electrode section 43. In the present embodiment, the interleaved ratio is defined to be a ratio of an area occupied by the electrodes in the seal 5. However, for the simplification of the design, the interleaved ratio is defined to be the "line width of the electrode/electrode pitch" in this example, as well as in the following embodiments. Further, based on the above-defined interleaved ratio, the signal electrode sinuous sections 41, the scanning electrode sinuous sections 42 and the liquid crystal sealing opening side electrode section 43 are designed.

First, in the case of the scanning electrode sinuous section 42, as shown in FIG. 26 and FIG. 27, the sinuous electrode 19 is designed so as to have an electrode pitch a of the linear section 19a of 0.2200 mm, a line width b of the linear section 19a of 0.0377 mm, a line width c of the between-electrodes dummy electrode 20 of 0.1523 mm, an electrode pitch d of the inclined section 19b of 0.1210 mm, and a line width e of the inclined section 19b of 0.1060 mm, and the double dummy electrode 44 is designed so as to have an electrode pitch l corresponding to the linear section 19a of the sinuous electrode 19 of 0.2200 mm, a line width m corresponding to the linear section 19a of 0.0177 mm, a line width n corresponding to the between-electrodes dummy electrode 20 of 0.0277 mm, an electrode pitch o of the double dummy electrode 44 corresponding to the inclined section 19b of the sinuous electrode 19 of 0.1210 mm, a line width p corresponding to the inclined section 19b of 0.0235 mm.

Next, in the case of the signal electrode sinuous section 41, as shown in FIG. 28 and FIG. 29, the sinuous electrode 23 is designed so as to have an electrode pitch f of the linear section 23a of 0.0860 mm, and a line width g of the linear section 23a of 0.0400 mm, the between-electrodes dummy electrode 47 is designed so as to have a line width w of 0.0160 mm, the sinuous electrode 23 is designed so as to have an electrode pitch h of the inclined section 23b of 0.0735 mm, and a line width i of the inclined section 23b of 0.0585 mm, and the double dummy electrode 45 is designed so as to have an electrode pitch q corresponding to the linear section 23a of the sinuous electrode 23 of 0.0860 mm, a line width r corresponding to the linear section 29a of 0.0360 mm, an electrode pitch s corresponding to the inclined section 23b of the sinuous electrode 23 of 0.0735 mm, and a line width t of the double dummy electrode 45 corresponding to the inclined section 23b of 0.0202 mm.

Lastly, in the case of the liquid crystal sealing opening side electrode section 44, as shown in FIG. 30, the extended electrode 25 is designed so as to have an electrode pitch k of 0.3495 mm, and a line width j of 0.3018 mm, and the double dummy electrode 36 is designed so as to have an electrode pitch u of 0.3495 mm, and a line width v of the double dummy electrode 36 of 0.0721 mm. Here, the line width of the scanning electrode 4 is selected to be 0.3295 mm.

In the liquid crystal display device shown in FIG. 18 including the signal electrode sinuous sections 43, the scanning electrode sinuous sections and the liquid crystal sealing opening side electrode section 44 having the described arrangement, interleaved ratio of the display-use electrodes the dummy electrodes is as shown in Table 10.

TABLE 10

|  |  | DISPLAY-USE ELECTRODE · BETWEEN-LINES DUMMY ELECTRODE · EXTENDED ELECTRODE |
|---|---|---|
| TERMINAL SECTION I | LINEAR SECTION | 0.0377/0.2200*100 = 17.136% (DISPLAY-USE ELECTRODE) + 0.1523/0.2200*100 = 69.227% (BETWEEN-LINES DUMMY ELECTRODE) = 86.363% |
|  | INCLINED SECTION | 0.1060/0.1210*100 = 87.603% (DISPLAY-USE ELECTRODE) |
| TERMINAL SECTION II | LINEAR SECTION | 0.0400/0.0860*100 = 46.512% (DISPLAY-USE ELECTRODE) + 0.0160/0.0860*100 = 18.605% (BETWEEN-LINES DUMMY ELECTRODE) = 65.117% |
|  | INCLINED SECTION | 0.0585/0.0735*100 = 79.592% (DISPLAY-USE ELECTRODE) |
| INJECTION OPENING |  | 0.3018/0.3495*100 = 86.352% (EXTENDED ELECTRODE) |

|  |  | DOUBLE DUMMY ELECTRODE | INTERLEAVED RATIO |
|---|---|---|---|
| TERMINAL SECTION I | LINEAR SECTION | 0.0177/0.2200*100 = 8.056% + 0.0277/0.2200*100 = 12.568% = 20.624% | 106.987% |
|  | INCLINED SECTION | 0.0235/0.1210*100 = 19.372% | 106.975% |
| TERMINAL SECTION II | LINEAR SECTION | 0.0360/0.0860*100 = 41.860% | 106.977% |
|  | INCLINED SECTION | 0.0202/0.0725*100 = 27.389% | 106.981% |
| INJECTION OPENING |  | 0.0721/0.3495*100 = 20.630% | 106.982% |

The injection opening corresponds to the liquid crystal sealing opening side electrode section 43.

As can be seen from Table 10, the interleaved ratio of the display-use electrodes and the dummy electrodes on the seal 5 in four sides of the circumference portion of the display area of the liquid crystal display device are substantially the same. In this case, the interleaved ratio indicates a sum of the interleaved ratio of the display-use electrodes and the between-electrodes dummy electrodes and the interleaved ratio of the double dummy electrodes. Here, it is designed so as to have a uniform wiring resistance of the display-use electrode in the four sides.

Then, an STN-type color liquid crystal display device is prepared using the signal electrode substrate 1 and the scanning electrode substrate 2 having the described display-use electrode and the dummy electrode. The resulting STN-type color liquid crystal display device shows a uniform brightness in the four sides of the circumference portion of the display area. Furthermore, by adjusting the diameter of the within-seal spacer 7 in the seal 5, the brightness in a vicinity of the seal 5 in the display area in the four sides can be all adjusted to the brightness of the central portion of the display area.

Moreover, the interleaved ratio of the dummy electrodes provided in a space on the seal 5 between the signal electrode sinuous sections 42 and the scanning electrode sinuous sections 41 in the terminal sections I and II respectively are adjusted to be uniform in four sides in accordance with the interleaved ratio of the display-use electrodes and the dummy electrodes of the scanning electrode sinuous sections 43 and the signal electrode sinuous sections 41, and the interleaved ratio of the dummy electrodes of the liquid crystal sealing opening side electrode section 43.

In the case where variations in the interleaved ratio and the overlapped ratio are made substantially uniform will be explained with respect to the liquid crystal display device having the arrangement shown in FIG. 25. In the case where the variations in the interleaved ratio are made uniform, explanations have been given through the liquid crystal display device adopting the signal electrode sinuous section 41 shown in FIG. 28 and FIG. 29. In this example, however, explanations will be given through the case of the liquid crystal display device adopting the signal electrode sinuous section 41' shown in FIG. 31 in replace of the signal electrode sinuous section 41.

Figure 31:
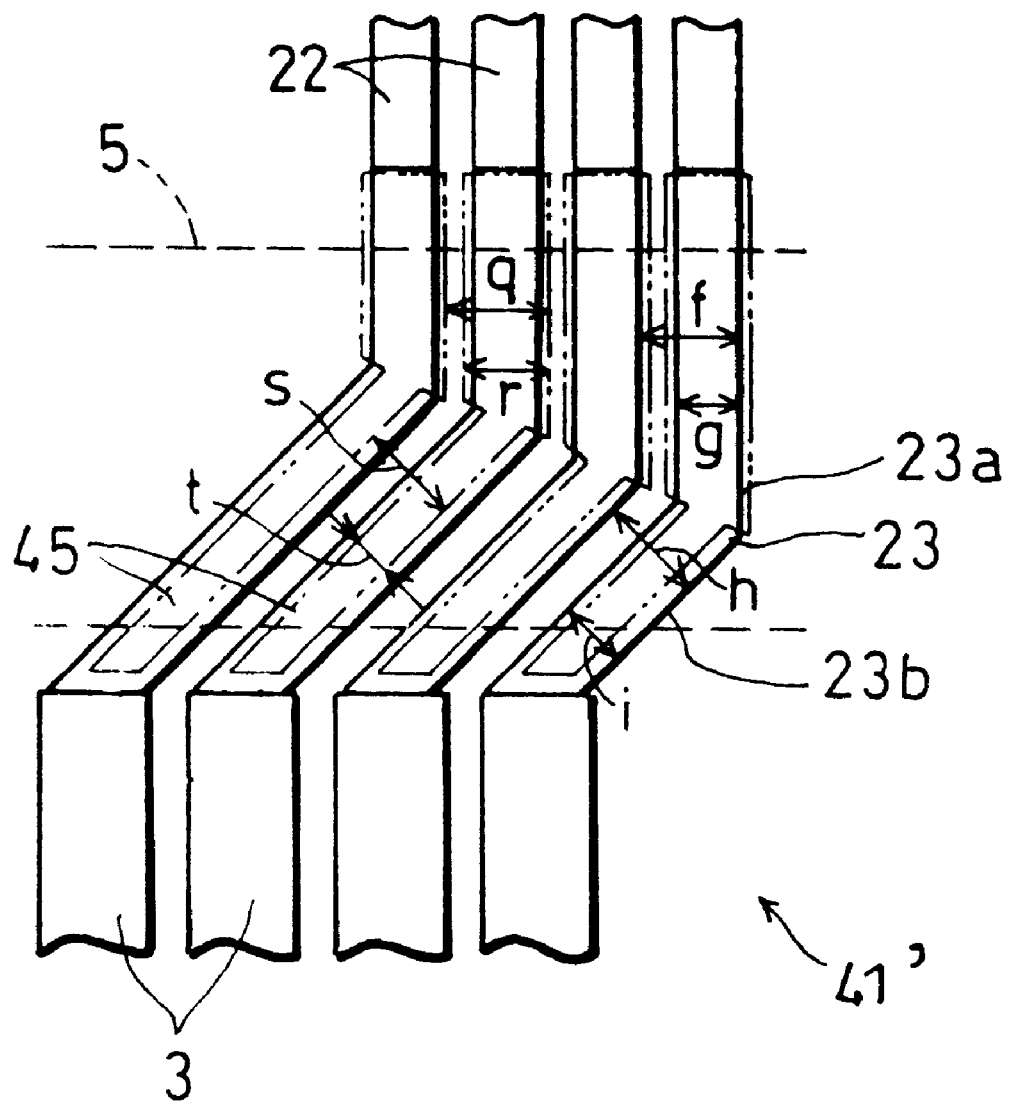
FIG. 31 is an enlarged view showing essential parts of the signal electrode sinuous section provided in the liquid crystal display device shown in FIG. 25.
Figure 32:
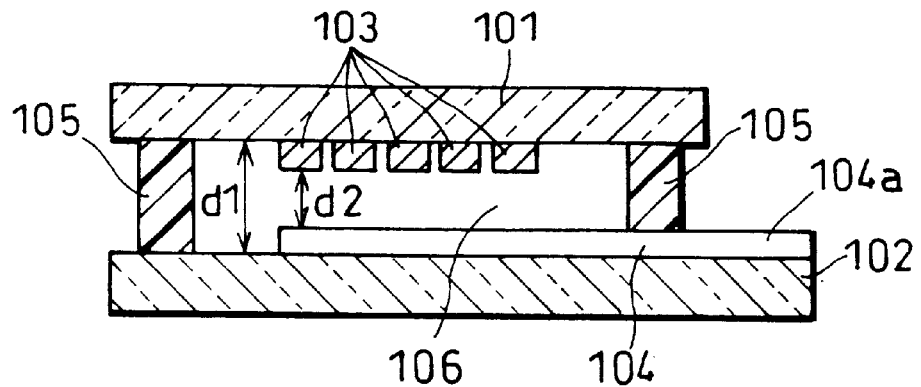
FIG. 32 is a cross-sectional view schematically showing a conventional liquid crystal display device.
Figure 33:
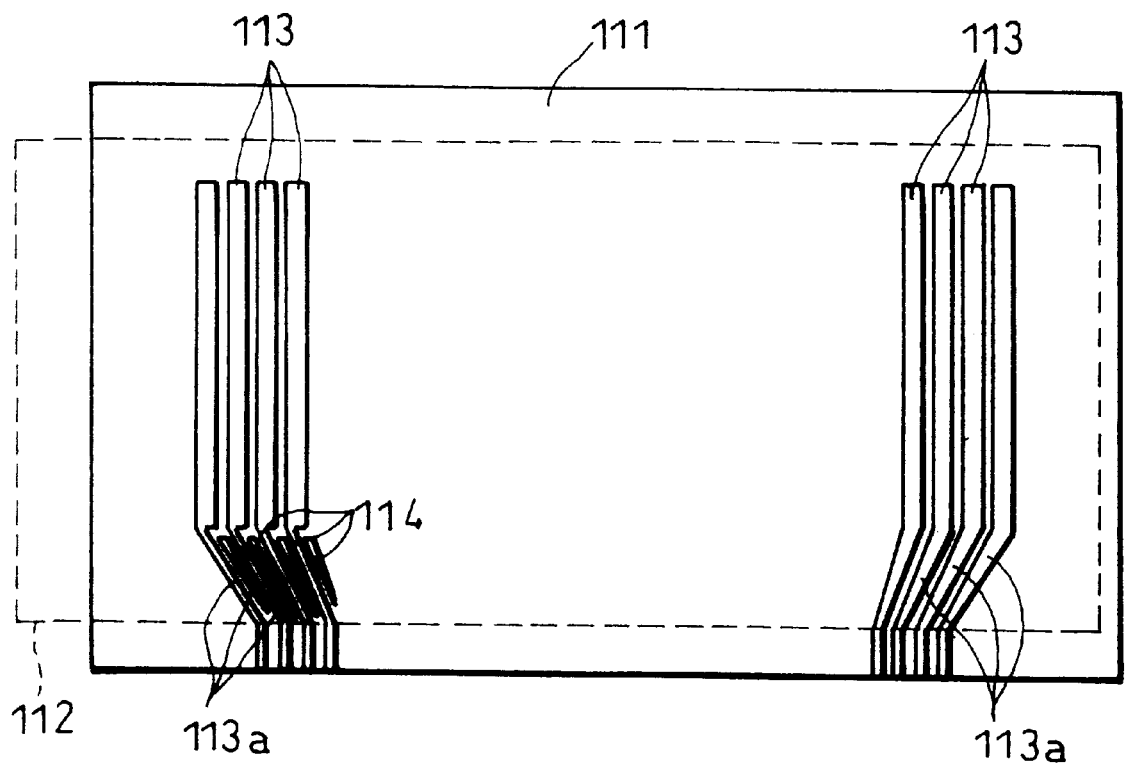
FIG. 33 is a view schematically showing a structure of another conventional liquid crystal display device.
Figure 34:
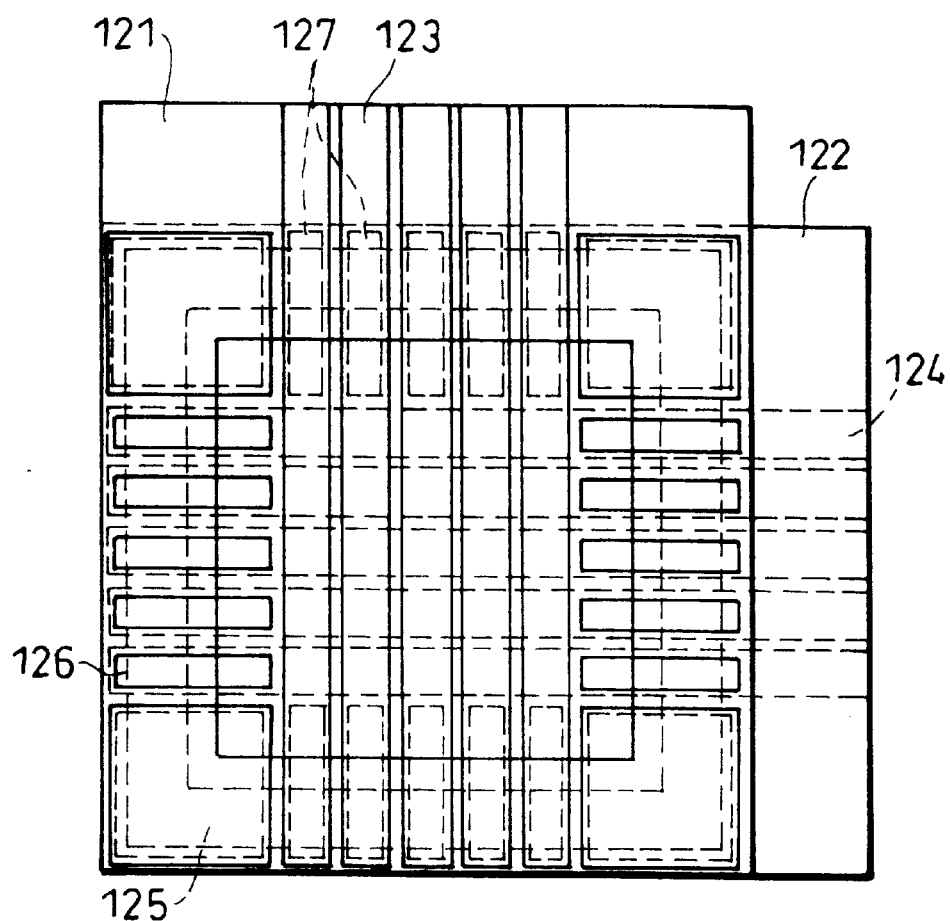
FIG. 34 is a view schematically showing a structure of still another conventional liquid crystal display device
Figure 35:
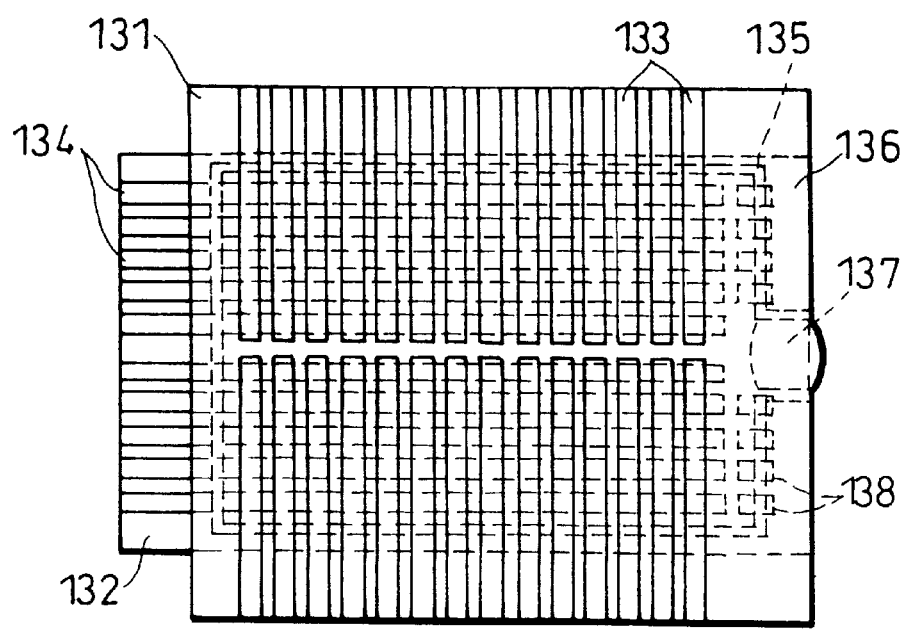
FIG. 35 is a view schematically showing a structure of yet still another conventional liquid crystal display device.

As shown in FIG. 31, the signal electrode sinuous section 41' has an arrangement in an absence of the between-electrodes dummy electrodes different from the signal electrode sinuous section 41 shown in FIG. 29.

Therefore, in this example, the interleaved ratio and the overlapped ratio in the display-use electrodes and the dummy electrodes in the seal 5 in the scanning electrode sinuous section 42, the signal electrode sinuous section 41' (FIG. 31), and the liquid crystal sealing opening side electrode section 43 will be explained.

As in the aforementioned first and second embodiments, for the simplification of the design, the interleaved ratio is defined to be the "line width of the electrode/electrode pitch", and the overlapped ratio is defined to be the "line width of one of the electrodes, which has a narrower line width/electrode pitch". Further, based on the above-defined interleaved ratio and the overlapped ratio, the scanning electrode sinuous sections 42, the signal electrode sinuous sections 41' (FIG. 31) and the liquid crystal sealing opening side electrode section 43 are designed.

In respective electrode sinuous section, the double dummy electrodes are formed on the substrates which face each other so as to be overlapped with the electrode sinuous section. The dummy electrodes are formed also between the terminal groups of the terminal sections I·II so as to have uniform interleaved ratio and the overlapped ratio.

The present embodiment has the arrangement same as that of the second embodiment and different from the first embodiment in that the double dummy electrode is designed so as to have a different line width from that of the counter electrode to have the wiring resistance, the interleaved ratio and the overlapped ratio of the electrode sinuous section in a predetermined range.

As shown in FIG. 11, the terminal section II has connection terminals three times as many as the that of the terminal section 1. Therefore, the width of the display-use electrode which extends from the terminal section II is around ⅓ of the width of the display-use electrode which extends from the terminal section I, and the pitch of the sinuous electrode 15 of the terminal section II is formed smaller than the pitch of the terminal section I. Therefore, although the between-electrodes dummy electrode 20 is formed between the sinuous electrodes 19 of the scanning electrode sinuous section 32 in the terminal section I, the between-electrodes dummy electrode is not formed in the sinuous electrodes 23 of the signal electrode sinuous section 31 in the terminal section II.

Additionally, in the liquid crystal sealing opening side electrode 33, the electrode width of the display-use electrode and the dummy electrode in the portion where the seal 5 is formed is made narrower so as to have substantially the same interleaved ratio of the electrodes in the seal 5 as those in the other sides.

First, in the case of the scanning electrode sinuous section 42, as shown in FIG. 26 and FIG. 27, the sinuous electrode 19 is selected to have an electrode pitch a of the linear section 19a of 0.2400 mm, a line width b of the linear section 19a of 0.0476 mm, and a line width c of the between-electrodes dummy electrode 20 of 0.1524 mm, an electrode pitch d of the inclined section 19b of the sinuous electrode 19 of 0.1413 mm, and a line width e of the inclined section 19b of 0.1183 mm, and further, the double dummy electrode 44 is designed so as to have an electrode pitch l corresponding to the linear section 19a of the inclined section 19 of 0.2400 mm, a line width m corresponding to the linear section 19a of 0.0319 mm, a line width n corresponding to the between-electrodes dummy electrode 20 of 0.0797 mm, an electrode pitch o corresponding to the inclined section 19b of the sinuous electrode 19 of 0.1431 mm, and a line width p corresponding to the inclined section 19b of 0.657 mm.

Next, in the case of the signal electrode sinuous section 41, as shown in FIG. 31, the sinuous electrode 23 is designed so as to have an electrode pitch f of the linear section 23a of 0.0860 mm, a line width g of the linear section 23a of 0.0400 mm, and an electrode pitch h of the inclined section 23b of 0.0732 mm, and a line width i of the inclined section 23b of 0.0572 mm, and the double dummy electrode 45 is designed so as to have an electrode pitch q corresponding to the linear section 23a of the sinuous section 23 of 0.0860 mm, a line width r corresponding to the linear section 29a of 0.0672 mm, an electrode pitch s corresponding to the inclined section 23b of the include electrode 23 of 0.0732 mm, and a line width t corresponding to the inclined section 23b of 0.0340 mm.

Lastly, in the case of the liquid crystal sealing opening side electrode section 43, as shown in FIG. 30, the extended electrode 25 is designed so as to have an electrode pitch j of 0.3510 mm, and a line width k of 0.2939 mm, and the double dummy electrode 46 is designed so as to have an electrode pitch u of 0.3510 mm, a line width v of 0.1633 mm.

The interleaved ratio and the overlapped ratio of display-use electrode and the dummy electrode in liquid crystal display device shown in FIG. 25 including the scanning electrode sinuous section 42, signal electrode sinuous section 41' and the fluid crystal sealing opening side electrode section 43 are as shown in Table 11.

TABLE 11

| | | DISPLAY-USE ELECTRODE · BETWEEN-LINE DUMMY ELECTRODE · EXTENDED ELECTRODE |
|---|---|---|
| TERMINAL SECTION I | LINEAR SECTION | 0.0476/0.2400*100 = 19.840% (DISPLAY-USE ELECTRODE) + 0.1524/0.2400*100 = 63.100% (BETWEEN-LINES DUMMY ELECTRODE) = 83.340% |
| | INCLINED SECTION | 0.1183/0.1413*100 = 83.720% (DISPLAY-USE ELECTRODE) |
| TERMINAL SECTION II | LINEAR SECTION | 0.0400/0.0860*100 = 46.510% (DISPLAY-USE ELECTRODE) |
| | INCLINED SECTION | 0.0572/0.0732*100 = 78.140% (DISPLAY-USE ELECTRODE) |
| INJECTION OPENING | | 0.2939/0.3510*100 = 83.720% (EXTENDED ELECTRODE) |

| | | DOUBLE DUMMY ELECTRODE | INTER-LEAVED RATIO | OVER-LAPPED RATIO |
|---|---|---|---|---|
| TERMINAL SECTION I | LINEAR SECTION | 0.0319/0.2400*100 = 13.290% + 0.0797/0.2400*100 = 33.220% = 46.510% | 129.850% | 13.290% + 33.220% = 46.510% |
| | INCLINED SECTION | 0.0657/0.1413*100 = 46.510% | 130.230% | 46.510% |
| TERMINAL SECTION II | LINEAR SECTION | 0.0672/0.0860*100 = 78.140% | 124.650% | 46.510% |
| | INCLINED SECTION | 0.0340/0.0732*100 = 77.510% | 124.650% | 46.510% |
| INJECTION OPENING | | 0.1633/0.3510*100 = 77.510% | 130.230% | 46.510% |

The injection opening corresponds to the liquid crystal sealing opening side electrode section 43.

As can be seen from Table 11, the interleaved ratio of the display-use electrode and the dummy electrode on the seal 5 in the sides of the circumference portion of the display area of the liquid crystal display device are substantially the same. In this case, the interleaved ratio indicates the sum of the interleaved ratio of the display-use electrodes and the between-electrodes dummy electrodes, and the interleaved ratio of the double dummy electrodes. Here, it is designed so as to have a uniform wiring resistance of the display-use electrode in the four sides.

Then, an STN-type color liquid crystal display device is prepared using the signal electrode substrate 1 and the scanning electrode substrate 2 including the display-use electrodes and the dummy electrodes having the described arrangement. The resulting STN-type color liquid crystal display device shows a uniform brightness. Furthermore, by adjusting the diameter of the glass beads of the within-seal spacer 6 contained in the seal 5four sides along the circumferential portion of the display area of, the brightness in a vicinity of the seal in the display area in all four sides can be adjusted to the brightness of the central portion of the display area.

Moreover, the interleaved ratio and the overlapped ratio of the dummy electrodes provided in a space on the seal 5 between the scanning electrode sinuous sections 42 and the signal electrode sinuous sections 41' are adjusted to be uniform in the four sides in accordance with the interleaved ratio and the overlapped ratio of the display-use electrodes and the dummy electrodes in the scanning electrode sinuous section 42 and the signal electrode sinuous section 41', as well as the interleaved ratio of the display-use electrode and the dummy electrode of the liquid crystal sealing opening side electrode 43.

In each of the described first through third embodiments, explanations have a constant pitch of the electrode in the electrode sinuous section. However, if it is arranged so as to have equal variations in the interleaved ratio of the display-use electrode and the dummy electrodes in the four sides of the seal 5, it is not necessarily to have a constant pitch, and the same effects can be achieved irrespectively of variations in the pitch.

The following descriptions will describe the liquid crystal display device designed without considering the interleaved ratio and the dummy electrode in the four sides in the seal 5 will be explained as comparative examples corresponding to the described first through third embodiments.

Comparative Example

In this comparative examples, the respective designs for the scanning electrode sinuous sections 144, the signal electrode sinuous sections 143 and the liquid crystal sealing opening side electrode section 147 will be explained in the liquid crystal display device shown in FIG. 36. The scanning electrode sinuous sections 144, the signal electrode sinuous section 143 and the liquid crystal sealing opening side electrode section 147 respectively have the same arrangement as the Example 2, so as to have different electrode pitches and the line widths. However, explanations of each member are given in reference to FIG. 19, FIG. 21 and FIG. 23 of the second embodiment.

First, in the case of the scanning electrode sinuous section 144, as shown in FIG. 19, the sinuous electrode 19 is designed so as to have an electrode pitch a of the linear section 19a of 0.2000 mm, a line width b of the linear section 19a of 0.0745 mm, a line width c of the between-electrodes dummy electrode 20 of 0.0993 mm, an electrode pitch d of the inclined section 19b of 0.1530 mm, and a line width e of the inclined section 19 of 0.1380 mm, and the double dummy electrode 34 is designed so as to have an electrode pitch l corresponding to the linear section 19a of the sinuous electrode 19 of 0.2000 mm, a line width m of the corresponding linear section 19a of 0.0545 mm, a line width n corresponding between-electrodes dummy electrode 20 of 0.0793 mm, an electrode pitch o corresponding to the inclined section 19b of the sinuous electrode 19 of 0.2000 mm, and a line width p the corresponding inclined section 19b of 0.1180 mm.

Next, in the case of the signal electrode sinuous section 143, as shown in FIG. 21, the sinuous electrode 23 is designed so as to have an electrode pitch f of the linear section 23a of 0.0710 mm, a line width g of the linear section 23a of 0.0416 mm, an electrode pitch h of the inclined section 23b of 0.0695 mm, and a line width i of the inclined section 23b of 0.0544 mm, an electrode pitch q of the double dummy electrode 34 corresponding to the linear section 29a of 0.0710 mm, a line width r of the double dummy electrode 34 corresponding to the linear section 29a of 0.0216 mm, an electrode pitch s of the double dummy electrode 34 corresponding to the inclined section 23b of the sinuous section 23 of 0.0695 mm, and a line width t corresponding to the inclined section 23n of 0.0344 mm.

Lastly, in the case of the liquid crystal sealing opening side electrode section 147, as shown in FIG. 23, the extended electrode 25 is designed so as to have an electrode pitch j of 0.2730 mm, a line width k of 0.2530 mm, and the double dummy electrode 36 is designed so as to have an electrode pitch u of 0.2730 mm, and a line width v of 0.2330 mm.

Figure 36:
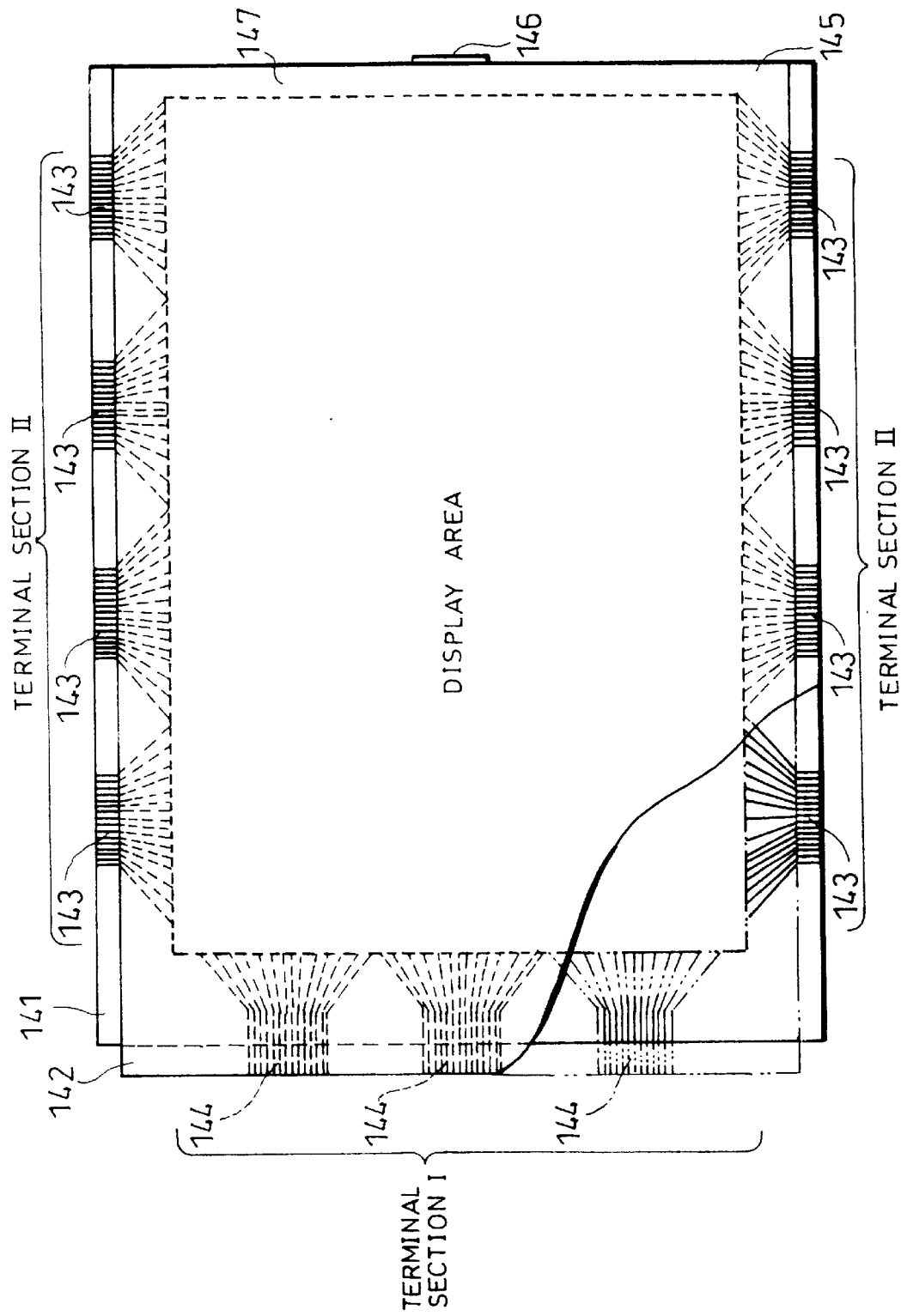
FIG. 36 is a view schematically showing a structure of yet still another conventional liquid crystal display device.
Figure 37:
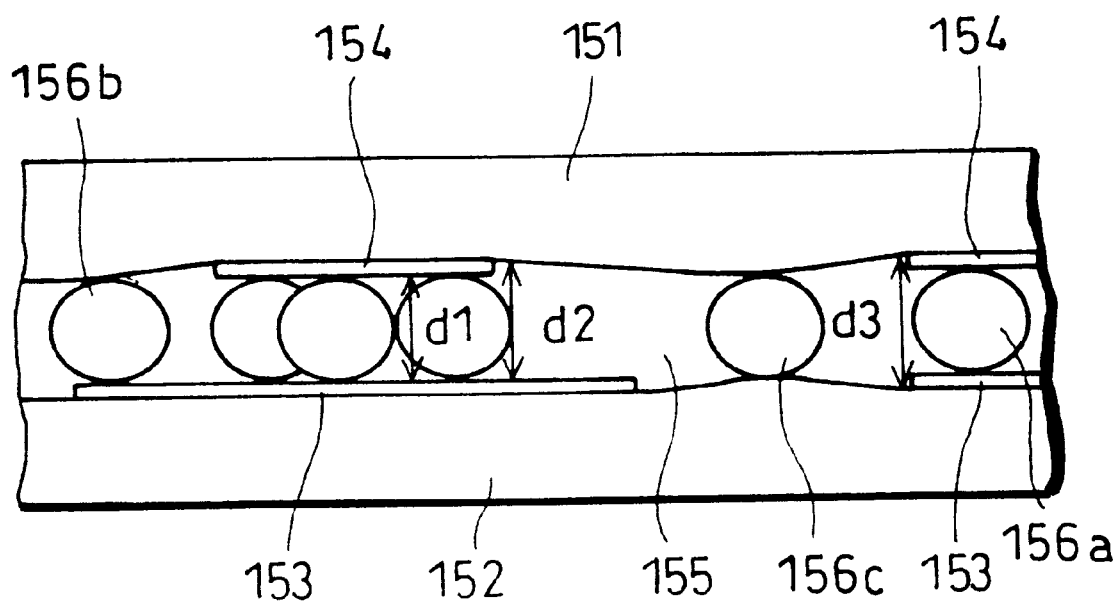
FIG. 37 is a cross-sectional view schematically showing a seal port ion in the conventional liquid crystal display device.

The interleaved ratio and the overlapped ratio of the display-use electrodes and the dummy electrodes in the liquid crystal display device shown in FIG. 36 including the scanning electrode sinuous sections 144, the signal electrode sinuous section 143 and the liquid crystal sealing opening side electrode section 147 are as shown in Table 12.

TABLE 12

| | | DISPLAY-USE ELECTRODE · BETWEEN-LINES DUMMY ELECTRODE · EXTENDED ELECTRODE |
|---|---|---|
| TERMINAL SECTION I | LINEAR SECTION | 0.0475/0.2000*100 = 37.267% (DISPLAY-USE ELECTRODE) + 0.0993/0.2000*100 = 49.662% (BETWEEN-LINES DUMMY ELECTRODE) = 83.928% |
| | INCLINED SECTION | 0.1380/0.1530*100 = 90.928% (DISPLAY-USE ELECTRODE) |
| TERMINAL SECTION II | LINEAR SECTION | 0.0416/0.0710*100 = 58.592% (DISPLAY-USE ELECTRODE) |
| | INCLINED SECTION | 0.0544/0.0695*100 = 78.273% (DISPLAY-USE ELECTRODE) |
| INJECTION OPENING | | 0.2530/0.2730*100 = 92.670% (EXTENDED ELECTRODE) |

TABLE 12-continued

|  |  | DOUBLE DUMMY ELECTRODE | INTER-LEAVED RATIO | OVER-LAPPED RATIO |
|---|---|---|---|---|
| TERMINAL SECTION I | LINEAR SECTION | 0.0545/0.2000*100 = 27.250% + 0.0793/0.2000*100 = 39.650% = 66.900% | 153.828% | 27.250% + 39.650% = 66.900% |
|  | INCLINED SECTION | 0.1180/0.2000*100 = 59.000% | 149.928% | 59.000% |
| TERMINAL SECTION II | LINEAR SECTION | 0.0216/0.0710*100 = 30.423% | 89.015% | 30.423% |
|  | INCLINED SECTION | 0.0344/0.0695*100 = 49.496% | 127.769% | 49.496% |
| INJECTION OPENING |  | 0.2330/0.2730*100 = 85.350% | 178.020% | 85.350% |

The injection opening corresponds to the liquid crystal sealing opening side electrode section 147.

As can be seen from Table 12, variation s occur in the interleaved ratio and the overlapped ratio of the of the display-use electrodes and the dummy electrodes on the seal 5 in the four sides of the circumference portion of the display area of the liquid crystal display device. In this case, the interleaved ratio indicates a sum of the interleaved ratio of the display-use electrodes and the between-electrodes dummy electrodes and the interleaved ratio of the double dummy electrodes. Here, it is designed so as to have a uniform wiring resistance of the display-use electrode in the four sides.

Then, an STN-type color liquid crystal display device is prepared using the substrates 141 and 142 including the display-use electrodes and the dummy electrodes having the described arrangements. The resulting STN-type color liquid crystal display device shows a non-uniform brightness in the four sides of the circumference portion in a vicinity of the seal 145 of the display area, although the upper side and the lower side show uniform brightness. Furthermore, by adjusting the diameter of the within-seal spacer 7 in the seal 5, the brightness in a vicinity of the seal 5 in the display area in the four sides cannot be adjusted to the brightness of the central portion of the display area.

Therefore, like the present invention, by arranging the display-use electrodes and the dummy electrodes so as to have variations in the interleaved ratio and the overlapped ratio of the display-use electrodes and the dummy electrodes in the seal S of not more than a predetermined value, a substantially uniform thickness of the liquid crystal layer between the central portion and the portion in a vicinity of the seal of the display area can be achieved. As this permits variations in brightness caused by the difference in the thickness of the liquid crystal layer to be eliminated, an improved display quality can be achieved.

In the described preferred embodiments, explanations have been given through the TN-type liquid crystal display devices as an example of liquid crystal display devices for which a narrow margin, high display quality, high speed response, high precision, and narrow frame which are the characteristics of the liquid crystals. However, applications of the present invention are not limited to the STN-type color liquid crystal display device, and can be applied to other liquid crystal display devices, such as TN-type liquid crystal display devices.

Similarly, although in the described embodiments, explanations have been given through the case where both the interleaved ratio and the overlapped ratio have variations in a predetermined range, by arranging at least the overlapped ratio has variations within a predetermined range, the ratio of the glass beads which serve as a support in the seal and thus determines the thickness of the seal can be made substantially uniform, thereby achieving a substantially uniform thickness of the seal in the four sides. As this permits variations in the brightness in the four sides in a vicinity of the seal of the display area to be reduced, an improved display quality can be achieved.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A liquid crystal display device, comprising:

a pair of substrates having a plurality of display-use electrodes formed thereon;

a seal for connecting said pair of substrates in such a manner that respective electrode forming surfaces face each other;

a liquid crystal layer formed by sealing a liquid crystal in a space surrounded by said pair of substrates and said seal;

dummy electrodes for achieving a uniform thickness of the liquid crystal layer within a display area;

wherein said display-use electrodes and said dummy electrodes are interleaved on each side of said seal, each side having an interleaved ratio representative of a ratio of an area occupied by said display use electrodes and said dummy electrodes in said each side to the entire seal area; and wherein said display-use electrodes and dummy electrodes on each side are interleaved such that the interleaved ratio for each side of said seal is substantially the same as the interleaved ratio for each other side of the seal, thereby making the thickness of said seal in each side substantially uniform, and so as to reduce the variation in brightness of the display area in the vicinity of each side of the seal.

2. The liquid crystal display device as set forth in claim 1, wherein:

said plurality of display-use electrodes includes at least one electrode sinuous section in at least one side of said seal, each electrode sinuous section including blocks of display-use electrodes so as to correspond to connection terminals for connection with external circuits;

each display-use electrode of each electrode sinuous section in said at least one side is formed in such a manner that an area on a side of said connection terminals for connection with external circuits has a higher alignment density than that of the display area; and the interleaved ratio of said display-use electrode and dummy electrode in said one side having said electrode sinuous section is a sum of the interleaved ratio of said display-use electrodes and said dummy electrodes on said seal that are parallel to said display-use electrodes in the display area and said connection terminals and the interleaved ratio of other portions of the said display-use electrodes and dummy electrodes on said seal.

3. The liquid crystal display device as set forth in claim 1, wherein:

said dummy electrodes includes between-electrodes dummy electrodes formed between said display-use electrodes and double dummy electrodes formed on one of said pair of substrates, which face the other substrate on which said display-use electrodes and said between-electrodes dummy electrodes are formed, and said double dummy electrodes are formed so as to face said display-use electrodes and said between-electrodes dummy electrodes.

4. The liquid crystal display device as set forth in claim 3, wherein:

said double dummy electrodes are formed so as to have a smaller width than that of said display-use electrodes and said between-electrodes dummy electrodes.

5. The liquid crystal display device as set forth in claim 3, wherein:

the interleaved ratio of said display-use electrodes and said dummy electrodes is a sum of an interleaved ratio of said display-use electrodes and said between-electrodes dummy electrodes and an interleaved ratio of said double dummy electrodes.

6. The liquid crystal display device as set forth in claim 1, wherein:

an interleaved ratio of said display-use electrodes and said dummy electrodes is a ratio of a width of electrodes with respect to a pitch of forming said display-use electrodes and said dummy electrodes.

7. The liquid crystal display device as set forth in claim 1, further comprising:

stripe-shaped color filters, wherein said display-use electrodes are formed in accordance with said color filters.

8. A liquid crystal display device, comprising:

a pair of substrates having formed thereon a plurality of display-use electrodes;

a seal for connecting said pair of substrates in such a manner that respective electrode forming surfaces face each other;

a liquid crystal layer formed by sealing liquid crystals in a space surrounded by said pair of substrates and said seal;

dummy electrodes for achieving a uniform thickness of said liquid crystal layer in a display areas;

wherein said display-use electrodes and said dummy electrodes are interleaved on each side of said seal, each side having an overlapped ratio representative of a ratio of an overlapped area of said display use electrodes and said dummy electrodes which face each other in said each side to the entire seal area; and wherein said display-use electrodes and dummy electrodes on each side are interleaved such that the overlapped ratio for each side of said seal is substantially the same as the overlapped ratio for each other side of said seal and so as to reduce the variation in brightness of the display area in the vicinity of each side of the seal.

9. The liquid crystal display device as set forth in claim 8, wherein:

said plurality of display-use electrodes includes at least one electrode sinuous section in at least one side of said seal, each electrode sinuous section including blocks of display-use electrodes so as to correspond to connection terminals to be connected to external circuits;

each display-use electrode of each electrode sinuous section of said at least one side is formed in such a manner that an area on a side of said connection terminals for connection with external circuits has a higher alignment density than that of the display area; and the overlapped ratio of said display-use electrodes and said dummy electrodes in said one side having said electrode sinuous section is a sum of the overlapped ratio of said display-use electrodes and said dummy electrodes on said seal that are parallel to said display-use electrodes in said display area and to said connection terminals and an overlapped ratio of ather portions of said display-use electrodes and said dummy electrodes on said seal.

10. The liquid crystal display device as set forth in claim 8, wherein:

said dummy electrodes includes between-electrodes dummy electrodes formed between said display-use electrodes and double dummy electrodes formed on one of said pair of substrates, which face the other substrate on which said display-use electrodes and said between-electrodes dummy electrodes are formed, and said double dummy electrodes are formed so as to face said display-use electrodes and said between-electrodes dummy electrodes.

11. The liquid crystal display device as set forth in claim 10, wherein:

said double dummy electrodes are formed so as to have a smaller width than that of said display-use electrodes and said between-electrodes dummy electrodes.

12. The liquid crystal display device as set fourth in claim 10, wherein:

wherein said overlapped ratio of said display-use electrodes and said double electrodes and an overlapped ratio of said between-electrodes dummy electrodes and said double dummy electrodes.

13. The liquid crystal display device as set forth in claim 8, wherein:

the overlapped ratio of said display-use electrodes and said dummy electrodes is a ratio of a width corresponding to a pitch of the overlapped area of said display-use electrodes and said dummy electrodes which face each other.

14. The liquid crystal display device as set forth in claim 8, wherein:

said display-use electrodes and said dummy electrodes are interleaved on each side of said seal, each side having an interleaved ratio representative of a ratio of an area occupied by said display use electrodes and said dummy electrodes in said each side to the entire seal area; and said display-use electrodes and dummy electrodes on each side are interleaved such that the interleaved ratio for each side of said seal is substantially the same as the interleaved ratio for each other side of the seal, thereby making the thickness of said seal in each side uniform, and so as to reduce the variation in brightness of the display area in the vicinity of each side of the seal.

15. The liquid crystal display device as set forth in claim 8, further comprising:

stripe-shaped color filters, wherein said display-use electrodes are formed in accordance with said color filters.

* * * * *